(12) United States Patent
Takeuchi

(10) Patent No.: US 11,464,098 B2
(45) Date of Patent: Oct. 4, 2022

(54) CONTROL DEVICE, CONTROL METHOD AND ILLUMINATION SYSTEM

(71) Applicant: SONY CORPORATION, Tokyo (JP)

(72) Inventor: Yuichiro Takeuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 86 days.

(21) Appl. No.: 16/478,925

(22) PCT Filed: Dec. 11, 2017

(86) PCT No.: PCT/JP2017/044398
§ 371 (c)(1),
(2) Date: Jul. 18, 2019

(87) PCT Pub. No.: WO2018/142771
PCT Pub. Date: Aug. 9, 2018

(65) Prior Publication Data
US 2019/0387151 A1    Dec. 19, 2019

(30) Foreign Application Priority Data
Jan. 31, 2017 (JP) .............................. JP2017-015634

(51) Int. Cl.
*H05B 47/17* (2020.01)
*H04N 5/235* (2006.01)
(Continued)

(52) U.S. Cl.
CPC ........... *H05B 47/17* (2020.01); *H04N 5/2351* (2013.01); *H04N 5/2354* (2013.01); *H05B 45/20* (2020.01);
(Continued)

(58) Field of Classification Search
CPC ...... H05B 47/17; H05B 45/20; H05B 47/105; H05B 47/165; H04N 5/2351; H04N 5/2354; H04N 5/23245; H04N 5/23293
(Continued)

(56) References Cited

U.S. PATENT DOCUMENTS 7,850,338 B1 * 12/2010 Messina ............... H04N 5/2354
362/235
2011/0074752 A1 * 3/2011 Kikuchi ............... H04N 5/2354
345/207
(Continued)

FOREIGN PATENT DOCUMENTS

JP   2005-251508 A   9/2005
JP   2008/071662   *  3/2008   ............. H05B 37/02
(Continued)

OTHER PUBLICATIONS

International Search Report and Written Opinion of PCT Application No. PCT/JP2017/044398, dated Jan. 23, 2018, 10 pages of ISRWO.

*Primary Examiner* — Lin Ye
*Assistant Examiner* — Chan T Nguyen
(74) *Attorney, Agent, or Firm* — Chip Law Group

(57) ABSTRACT

It is possible to further improve convenience of a user. Provided is a control device including an illumination condition deciding unit that decides illumination conditions which are conditions for controlling emission lights from respective light emission points for an illuminating device which includes a plurality of the light emission points arranged in a planar shape and emits an illumination light as the emission lights of the respective light emission points are controlled, in which the illumination condition deciding unit automatically decides the illumination conditions on the basis of predetermined information.

20 Claims, 47 Drawing Sheets

(51) Int. Cl.
  *H05B 45/20* (2020.01)
  *H05B 47/105* (2020.01)
  *H05B 47/165* (2020.01)

(52) U.S. Cl.
  CPC ......... *H05B 47/105* (2020.01); *H05B 47/165* (2020.01)

(58) Field of Classification Search
  USPC ........................................................ 348/371
  See application file for complete search history.

(56) References Cited

U.S. PATENT DOCUMENTS

| | | | | |
|---|---|---|---|---|
| 2013/0113888 | A1* | 5/2013 | Koguchi | H04N 5/2351 348/46 |
| 2015/0062413 | A1* | 3/2015 | Yokoya | H04N 5/238 348/363 |
| 2015/0116586 | A1* | 4/2015 | Mahowald | H04N 5/23232 348/370 |
| 2015/0178592 | A1* | 6/2015 | Ratcliff | H04N 5/23222 382/155 |
| 2016/0316118 | A1* | 10/2016 | Benson | H04N 5/2256 |
| 2016/0366752 | A1* | 12/2016 | Di Censo | H05B 47/105 |

FOREIGN PATENT DOCUMENTS

| | | | | |
|---|---|---|---|---|
| JP | 2008-071662 | * | 3/2008 | ................ H04N 5/22 |
| JP | 2008-071662 A | | 3/2008 | |
| JP | 2008071662 | * | 3/2008 | ............. H04N 5/225 |
| JP | 2012-023542 | * | 2/2012 | ............. H04N 5/222 |
| JP | 2012-023542 A | | 2/2012 | |
| JP | 2013-132029 | * | 7/2013 | ............. H04N 5/232 |
| JP | 2013-132029 A | | 7/2013 | |
| JP | 2014-211748 A | | 11/2014 | |
| JP | 2005-251508 | * | 9/2015 | ............... F21S 10/00 |

* cited by examiner

FIG. 3
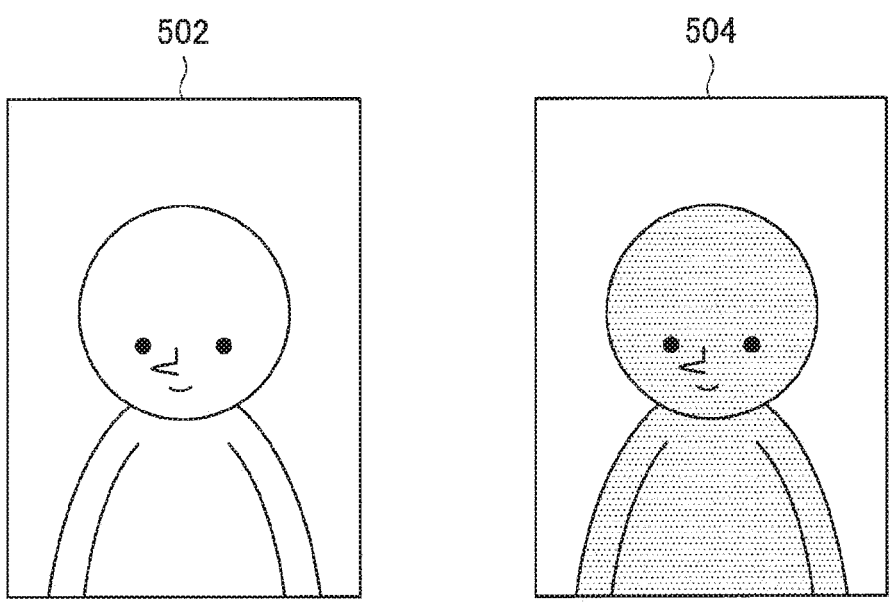
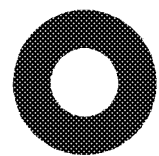 

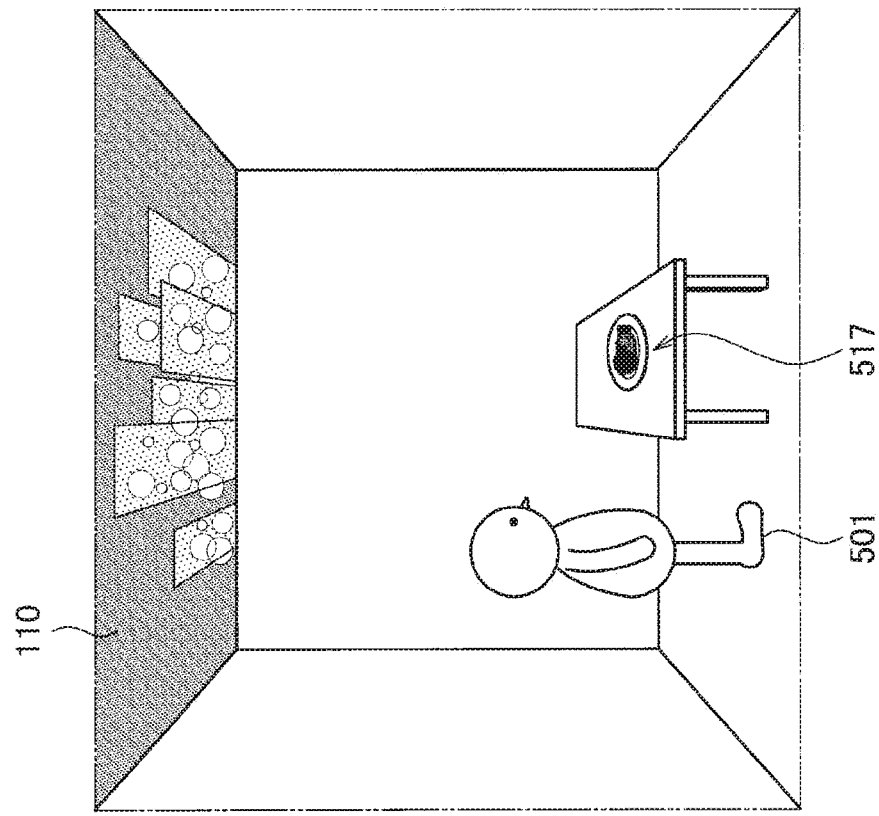
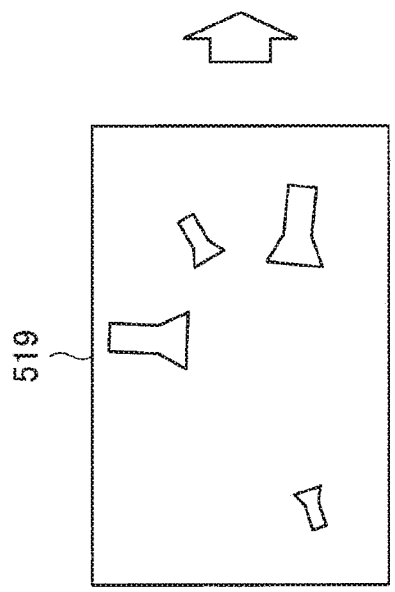
FIG. 40

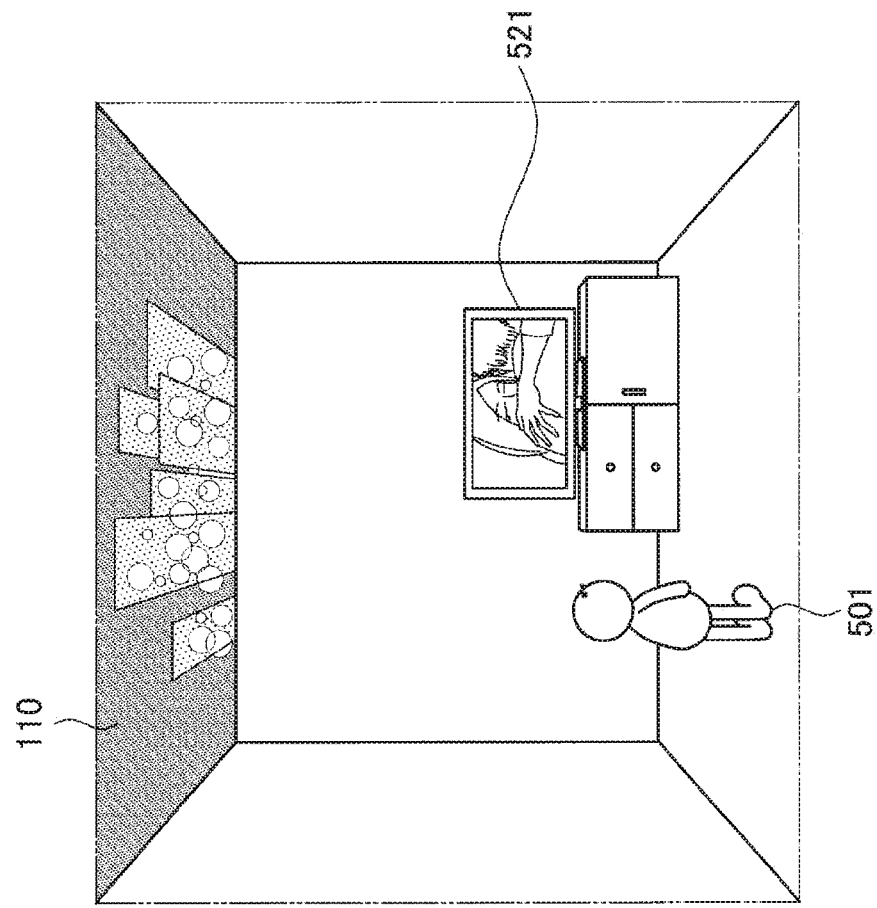
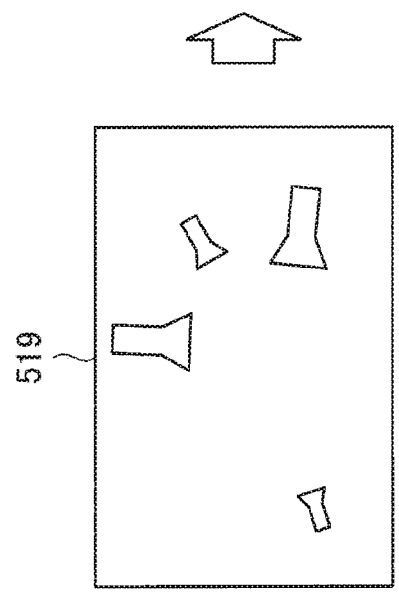
FIG. 43

CONTROL DEVICE, CONTROL METHOD AND ILLUMINATION SYSTEM

CROSS REFERENCE TO RELATED APPLICATIONS

This application is a U.S. National Phase of International Patent Application No. PCT/JP2017/044398 filed on Dec. 11, 2017, which claims priority benefit of Japanese Patent Application No. JP 2017-015634 filed in the Japan Patent Office on Jan. 31, 2017. Each of the above-referenced applications is hereby incorporated herein by reference in its entirety.

TECHNICAL FIELD

The present disclosure relates to a control device, a control method, and an illumination system.

BACKGROUND ART

Techniques for improving convenience of users by controlling illuminations appropriately have been developed. For example, an illumination system in which a type of food or beverage and ingredients used for the food or the beverage are determined on the basis of an image obtained by photographing of the food or the beverage, and an illumination light corresponding to the type and the ingredients is emitted to the food or the beverage is disclosed in Patent Document 1. According to the illumination system, it is possible to support eating habits of the user more effectively since an illumination light reflecting a health state of the user such as, for example, an illumination light for enhancing the appetite, or an illumination light for reducing the appetite can be emitted to the food or the beverage, depending on the type of food or beverage and the ingredients used for the food or the beverage.

CITATION LIST

Patent Document

Patent Document 1: Japanese Patent Application Laid-Open No. 2014-211748

SUMMARY OF THE INVENTION

Problems to be Solved by the Invention

Here, in the illumination system disclosed in Patent Document 1, an incandescent lamp, a fluorescent lamp, and a light emitting diodes (LED) mounted on a head mounted display (HMD) worn by the user are used as devices for emitting light to the food or the beverage. In these devices, it is difficult to control light characteristics (an emission direction, a wavelength, an intensity, and the like) in detail, and it is unlikely that the user is able to necessarily obtain desired illumination effects properly.

In this regard, the present disclosure proposes a control device, a control method, and an illumination system which are novel and improved and capable of improving the user's convenience.

Solutions to Problems

According to the present disclosure, provided is a control device including an illumination condition deciding unit that decides illumination conditions which are conditions for controlling emission lights from light emission points for an illuminating device which includes a plurality of light emission points arranged in a planar shape and emits an illumination light as the emission lights of the light emission points are controlled, in which the illumination condition deciding unit automatically decides the illumination conditions on the basis of predetermined information.

Further, according to the present disclosure, a control method including deciding, by a processor, illumination conditions which are conditions for controlling emission lights from light emission points for an illuminating device which includes a plurality of light emission points arranged in a planar shape and emits an illumination light as the emission lights of the light emission points are controlled, in which the illumination conditions are automatically decided on the basis of predetermined information when the illumination conditions are decided.

Further, according to the present disclosure, provided is an illumination system including an illuminating device which includes a plurality of light emission points arranged in a planar shape and emits an illumination light as emission lights of the light emission points are controlled and a control device that decides illumination conditions which are conditions for controlling emission lights from the light emission points of the illuminating device, in which the control device automatically decides the illumination conditions on the basis of predetermined information.

According to the present disclosure, the illumination conditions for driving the illuminating device are automatically determined on the basis of predetermined information. On the other hand, the illuminating device includes a plurality of light emission points arranged in a planar shape and emits an illumination light as the emission lights from the light emission points are controlled, and thus the illumination light can be controlled in detail. Therefore, since the illumination conditions are automatically determined on the basis of the predetermined information, it is possible to appropriately decide an appropriate illumination light suitable for a situation without performing a manipulation for deciding the illumination conditions by the user. Thus, the convenience of the user can be improved.

Effects of the Invention

As described above, according to the present disclosure, it is possible to further improve the user's convenience. Further, the above effects are not necessarily limited, and any of effects described in this specification or other effects that can be understood from this specification can be included in addition to or instead of the above effects.

BRIEF DESCRIPTION OF DRAWINGS

FIG. 3 is a diagram for describing a concept of a quality of a photograph by an illumination.

FIG. 40 is a diagram for describing an operation of an illumination system when an illumination condition is decided on the basis of layout data of a chamber and RGB data and depth data of an object in the chamber.

FIG. 43 is a diagram for describing an operation of an illumination system in a case where an illumination condition is decided on the basis of content being watched by a user.

MODE FOR CARRYING OUT THE INVENTION

Figure 1:
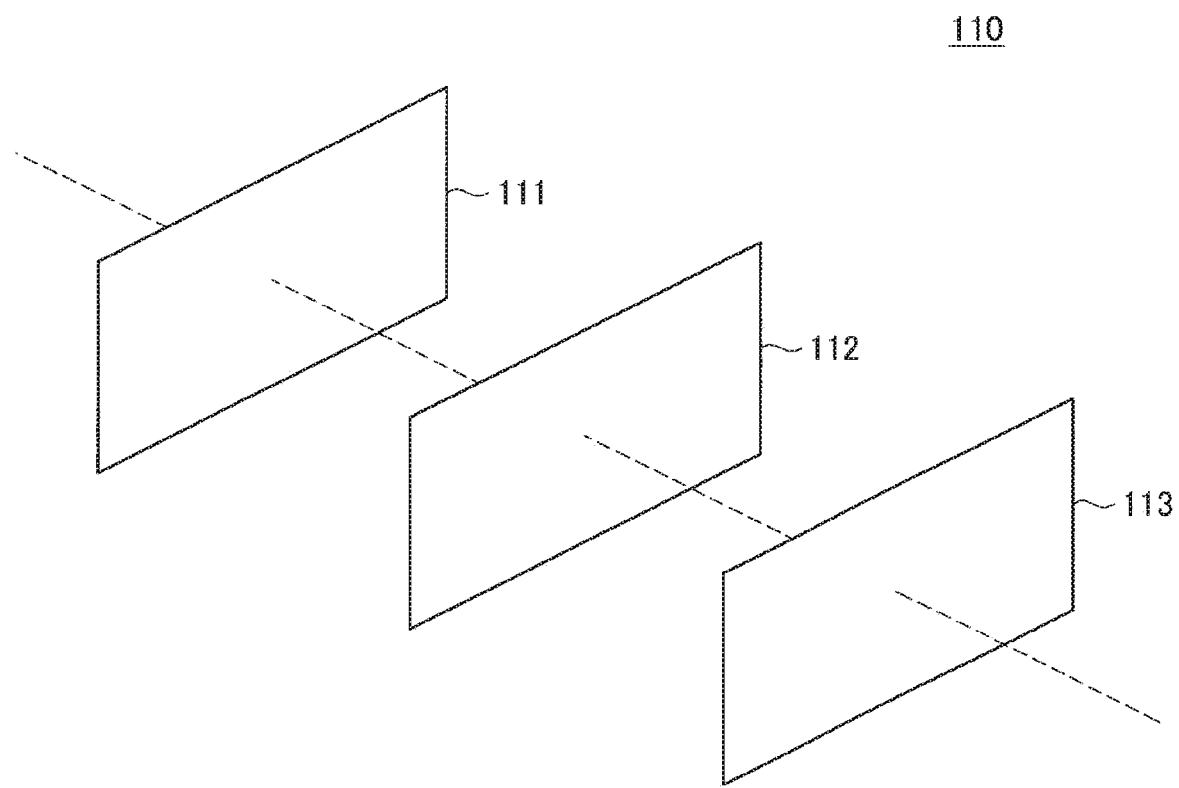
FIG. 1 is an exploded perspective view schematically illustrating a configuration of an illuminating device.

Hereinafter, exemplary embodiments of the present disclosure will be described in detail with reference to the appended drawings. Further, in this specification and drawings, components having substantially the same functional configuration will be assigned the same reference numerals, and repeated description will be omitted.

Further, the description will proceed in the following order.

1. Configuration of illuminating device
2. First Embodiment
2-1. Overview of first embodiment
2-2. Manual mode
2-2-1. Configuration of illumination system
2-2-2. Overview of operation of illumination system at time of photographing
2-2-3. Functional configuration of illumination system
2-2-4. Processing procedure of control method of illumination system
2-3. Automatic mode
2-3-1. Functional configuration of illumination system
2-3-2. Processing procedure of control method of illumination system
2-3-2-1. Case in which previous photographing data is used
2-3-2-2. Case in which previous photograph data is used
2-3-3. Modified example
2-4. Conclusion of first embodiment
3. Second Embodiment
3-1. Overview of second embodiment
3-2. Manual mode
3-2-1. Configuration of illumination system
3-2-2. Overview of operation of illumination system in illumination of mirror
3-2-3. Functional configuration of illumination system
3-2-4. Processing procedure of control method of illumination system
3-3. Automatic mode
3-3-1. Configuration of illumination system
3-3-2. Functional configuration of illuminating system
3-3-3. Modified example
3-4. Conclusion of second embodiment
4. Third Embodiment
4-1. Overview of third embodiment
4-2. Manual mode
4-2-1. Configuration of illumination system
4-2-2. Overview of operation of illumination system in illumination of chamber
4-2-3. Functional configuration of illumination system
4-3. Automatic mode
4-3-1. Configuration of illumination system
4-3-2. Functional configuration of illumination system
4-3-3. Processing procedure of control method of illumination system
4-3-4. Examples of other operations of illumination system
4-4. Conclusion of third embodiment
5. Fourth Embodiment
5-1. Overview of fourth embodiment
5-2. Configuration of illumination system
5-3. Overview of operation of illumination system at time of information notification
5-4. Functional configuration of illumination system
5-5. Processing procedure of control method of illumination system
5-6. Conclusion of the fourth embodiment
6. Supplement

1. Configuration of Illuminating Device

The present disclosure provides an illumination system equipped with an illuminating device. Further, as will be described later as first to fourth embodiments, an illumination system provides the user with illumination effects corresponding to various situations. Here, prior to describing a configuration, functions, and purposes of the illumination system, a configuration of an illuminating device constituting the illumination system will be described.

FIG. 1 is an exploded perspective view schematically illustrating a configuration of an illuminating device. As illustrated in FIG. 1, an illuminating device 110 mainly has a configuration in which a backlight 111, a liquid crystal panel 112, and a lenticular sheet 113 are stacked in this order.

The backlight 111 and the liquid crystal panel 112 are used for a general liquid crystal display. Although not illustrated, an optical film such as a polarizing plate is disposed between the backlight 111 and the liquid crystal panel 112, and a liquid crystal display is constituted by the backlight 111, the optical film, and the liquid crystal panel 112. In other words, the illuminating device 110 corresponds to a device in which the lenticular sheet 113 is disposed on the surface of the liquid crystal display.

Figure 2:
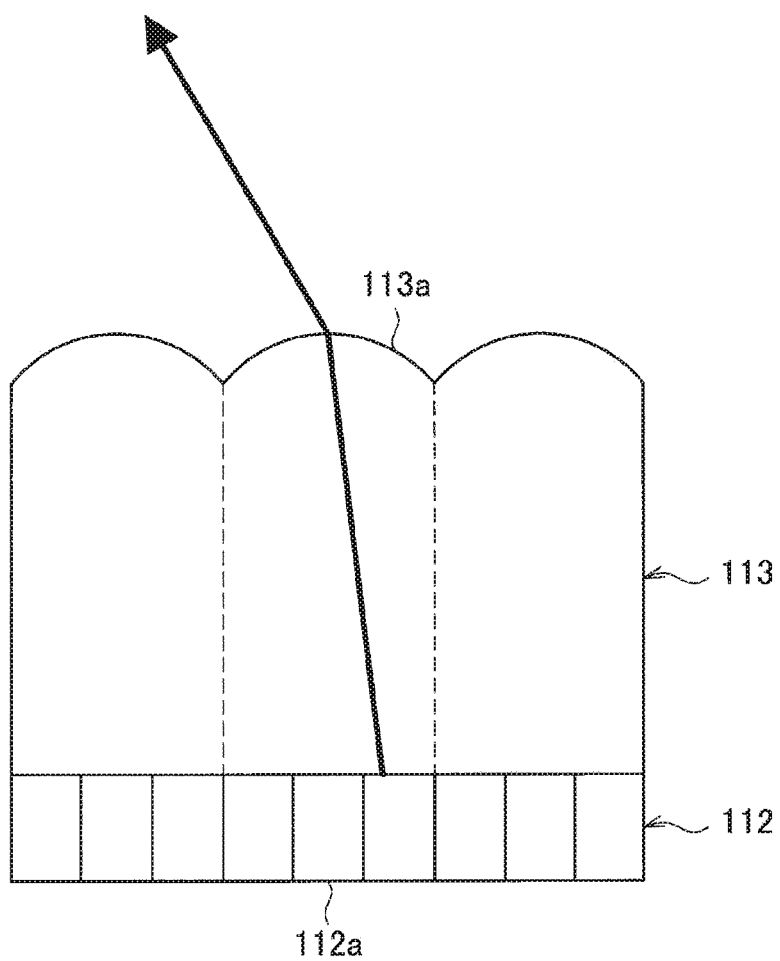
FIG. 2 is a diagram for describing a positional relationship between a pixel of a liquid crystal panel and a lens of a lenticular sheet in the illuminating device illustrated in FIG. 1.

The lenticular sheet 113 is formed such that semi-cylindrical optical lenses are evenly arranged. The lenticular sheet 113 is also referred to as a lenticular lens, a lenticular lens sheet or the like. As illustrated in FIG. 2, a size and an arrangement of each lens in the lenticular sheet 113 are adjusted such that one lens 113a corresponds to a plurality of pixels 112a of the liquid crystal panel 112. FIG. 2 is a diagram for describing a positional relationship between the pixel 112a of the liquid crystal panel 112 and the lens 113a of the lenticular sheet 113 in the illuminating device 110 illustrated in FIG. 1. FIG. 2 illustrates a partial cross section of the liquid crystal panel 112 and the lenticular sheet 113 which are stacked.

With such a configuration, light from one pixel 112a of the liquid crystal panel 112 passes through the lens 113a corresponding to the pixel 112a of the lenticular sheet 113 and is emitted in a predetermined direction. In other words, in the illuminating device 110, it is possible to emit light having desired characteristics in a desired direction by appropriately controlling characteristics (an intensity, a wavelength, and the like) of light emitted from each pixel in the liquid crystal display including the backlight 111 and the liquid crystal panel 112.

As described above, the illuminating device 110 has a configuration in which a plurality of light emission points are arranged on a surface and can individually control an intensity, a color, and a direction of emission light from each light emission point of a panel-like device. Therefore, according to the illuminating device 110, all light sources can be reproduced in principle. As described above, the illuminating device 110 is an illuminating device with a high degree of freedom that can freely reproduce a virtual light source (for example, fluorescent light, incandescent light, spotlight, or the like) desired by the user.

Here, stereoscopic vision technology (called integral imaging or the like) using a lenticular lens is widely used in a so-called glasses-free 3D display in which the user can view 3D display with naked eyes. Specifically, integral imaging itself was already proposed by Gabriel Lippmann in 1908, and a mechanism for reproducing a 3D video by combining integral imaging and a liquid crystal display was devised at the end of the 20-th century, and research has been actively conducted to date.

A device configuration of the illuminating device 110 described above may be substantially similar to a device configuration of the glasses-free 3D display. In other words, the illuminating device 110 applies technology of glasses-free 3D display to the illuminating device. Further, an illuminating device to which the glasses-free 3D display technology is applied is already known, and "AnyLight: Programmable Ambient Illumination via Computational Light Fields," Yuichiro Takeuchi, et al., Proceedings of the 2016 ACM on Interactive Surfaces and Spaces, November, 2016, Pages 39-48 can be referred to for the details of the illuminating device, for example. As a specific driving method for the illuminating device 110 for realizing a desired illumination effect, the technique described in the document or other known techniques can be used, and so detailed description thereof is omitted here.

The configuration of the illuminating device 110 has been described above. Further, as described above, the illuminating device 110 has a configuration in which a plurality of light emission points are arranged on a surface, and individually controls an emission light from each of the light emission points so that a desired illumination light is emitted. Therefore, the configuration of the illuminating device 110 is not limited to the configuration described above, and various known configurations can be used as the illuminating device 110 as long as it has the above-described configuration.

For example, various known configurations generally known as the glasses-free 3D display can be used as the illuminating device 110. For example, in the configuration described above, a filter in which a plurality of fine holes are formed may be used instead of the lenticular sheet 113. According to such a configuration, a configuration similar to so-called glasses-free 3D display of a parallax barrier scheme can be realized, and thus an illuminating device 110 capable of reproducing various light sources similar to those described above can be realized. However, in a case where the illuminating device 110 is constituted by this scheme, a screen is partially blocked by the above filter, and brightness of the entire screen is reduced as compared to a case where the lenticular sheet 113 is used, and thus it is desirable to use a device with a larger output as the backlight 111.

Further, for example, in the configuration described above, a projector may be used instead of the backlight 111. In general, liquid crystal displays are manufactured to be thin, so it is difficult to give a large output to the backlight. Therefore, a glasses-free 3D display using a projector instead of a liquid crystal display has been developed to realize a brighter screen in the glasses-free 3D display. By applying the configuration of the glasses-free 3D display using the projector to the illuminating device 110, it is possible to realize a higher output illuminating device that can secure sufficient brightness as an illumination.

A configuration of the illumination system constituted by the illuminating device 110 described above and illumination effects corresponding to various situations using the illumination system will be described below.

2. First Embodiment

2-1. Overview of First Embodiment

A first embodiment of the present disclosure is described. In the first embodiment, the illumination system is used for photographing.

In recent years, opportunities for everyday photography have increased with the trend of smartphones. In the case of social media, many users photograph and upload their faces, small objects around them, and the like. In this regard, in order to perform high-quality photographing, videos which are uploaded to video sites for teaching photography skills, smartphone applications for supporting photography, dedicated devices such as selfie sticks, and the like are gaining popularity.

On the other hand, an illumination is one of important factors for deciding the quality of photograph. FIG. 3 is a diagram for describing a concept of a quality of photograph by an illumination. In a case where a photograph is taken in a professional studio, it is possible to more freely adjust a way of emitting light to a person's face or an object using various special illuminating instruments, and it is possible to take a high-quality photograph 502 (a left diagram of FIG. 3). However, in a general living environment such as a house, it is often difficult to adjust an illumination at the time of photographing in detail. Although it is possible to use a flash, a small illuminating instrument sold for smartphones, or the like, detailed light control is unable to be performed in these devices. Further, although it is possible to compensate for deficiency of an illumination by applying image processing to a captured image, an image which has undergone image processing often becomes unnatural, and it is difficult to make major adjustments. As described above, in a general living environment, it is difficult to control an illumination in detail, and a situation in which a low-quality photograph 504 is taken occurs (a right diagram of FIG. 3).

In view of the above-mentioned circumstances, the present inventors have conducted keen examination on technology capable of taking a higher quality photograph even in a general living environment. As a result, the present inventors were able to reach a technique of applying the illuminating device 110 described above to photography. As described above, according to the illuminating device 110, it is possible to take a high-quality photograph similar to that in a case where a dedicated illuminating instrument is used in a dedicated studio in a general living environment since it is possible to control illumination light in detail. As described above, a portable photography studio is realized by applying the illuminating device 110 to photography.

A configuration and functions of the illumination system according to the first embodiment will be described in detail below. Here, in the illumination system according to the first embodiment, there may be a mode in which illumination conditions of the illuminating device 110 are manually set on the basis of an instruction input of the user (hereinafter also referred to as a manual mode) and a mode in which illumination conditions are automatically set on the basis of predetermined information (hereinafter also referred to as an automatic mode). Here, the illumination conditions are conditions for controlling emission light from each light emission point of the illuminating device 110. In a case where the illumination conditions are decided, the illumination light of the whole illuminating device 110 is also decided. The illumination conditions include information about a direction, an intensity, and a wavelength (that is, a color) of the emission light from each light emission point. A functional configuration of the illumination system also differs depending on which of the manual mode and the automatic mode is used. The configuration and functions of the illumination system in these modes will be described in order below.

Further, the configuration and functions of the illumination system according to the first embodiment will be described by taking a case where a subject is the user himself/herself as an example. However, the first embodiment is not limited to this example, and the subject may be any person, an object, or the like other than the user.

2-2. Manual Mode

First, the configuration and functions of the illumination system in the manual mode will be described.

2-2-1. Configuration of Illuminating System

Figure 4:
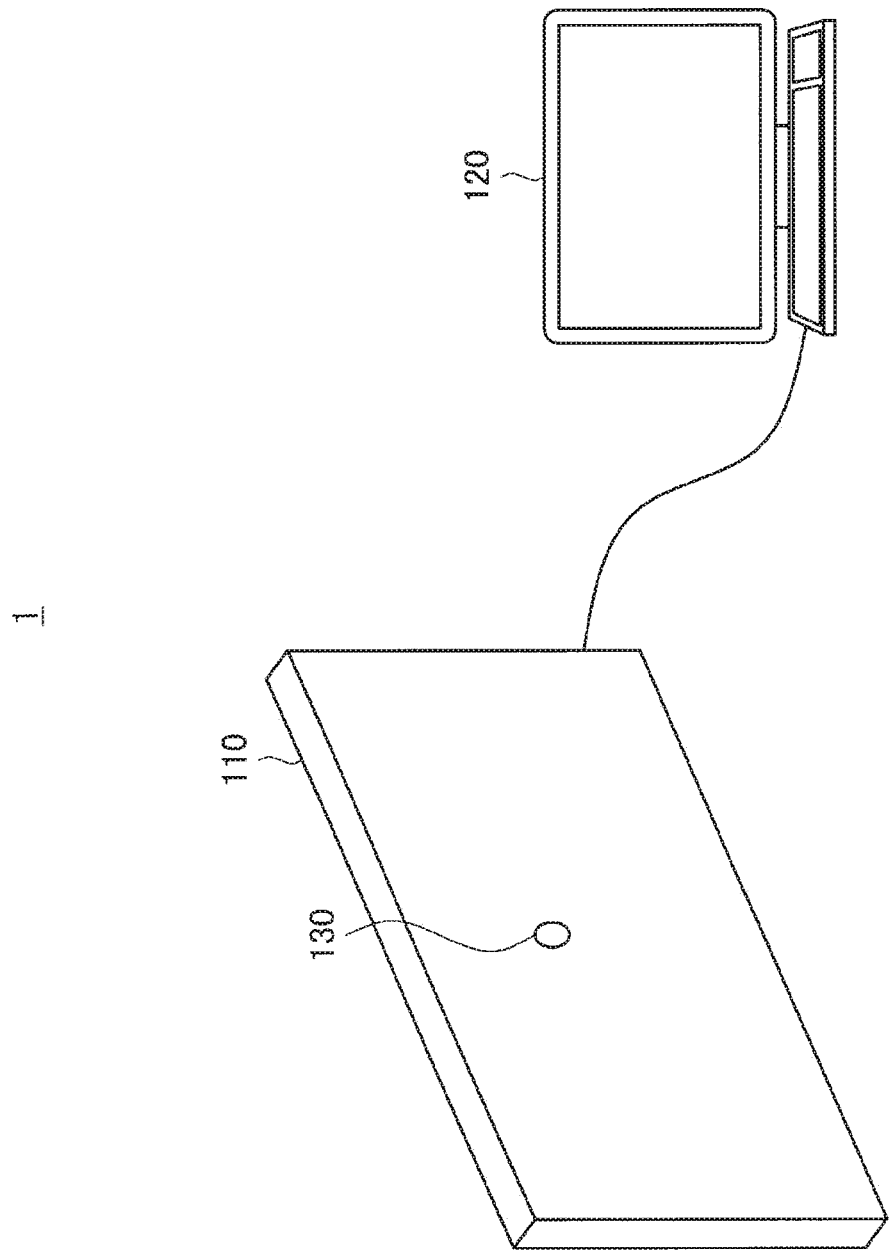
FIG. 4 is a diagram illustrating a schematic configuration of an illumination system operated in a manual mode according to a first embodiment.

FIG. 4 is a diagram illustrating a schematic configuration of the illumination system operated in the manual mode according to the first embodiment. Referring to FIG. 4, an illumination system 1 operated in the manual mode according to the first embodiment includes an illuminating device 110, a terminal 120, and an RGB camera 130. Further, since the illuminating device 110 is similar to the illuminating device 110 described with reference to FIG. 1, detailed description thereof is omitted here.

The terminal 120 is an information processing device that manages an operation of the illumination system 1 in an integrated manner. Although simplified and illustrated in FIG. 4, the terminal 120 includes at least an input device, a display device, and a control device.

The input device (corresponding to an input device 121 illustrated in FIG. 7 to be described later) of the terminal 120 is an input interface used for the user to input various types of information or instructions to the terminal 120. A specific device configuration of the input device is not limited, and the input device may be various types of known input devices such as a keyboard, a mouse, a switch, and a touch panel. Further, the input device may be a camera or a sensor capable of detecting an action of the user, and various types of information or instructions may be input in accordance with a line of sight, a gesture, or the like of the user. Further, the input device may be a microphone, and various types of information or instructions may be input in accordance with a voice of the user.

The display device (corresponding to a display device 122 illustrated in FIG. 7 described later) of the terminal 120 is an output interface for visually presenting various types of information to the user. The display device can display various types of information in various formats such as images, characters, and graphs. A specific device configuration of the display device is not limited, and the display device may be various types of known display devices such as a liquid crystal display, an organic electroluminescence (EL) display, and a plasma display.

The control device (corresponding to a control device 123 illustrated in FIG. 7 described later) of the terminal 120 controls an operation of the illumination system 1 in an integrated manner. The control device includes, for example, a processor such as a central processing unit (CPU) or a digital signal processor (DSP), a memory that stores a program executed by the processor and information processed by the processor, and the like. Driving of the input device, the display device, the illuminating device 110, and the RGB camera 130 can be controlled under the control of the control device.

Further, the functions of the input device, the display device, and the control device of the terminal 120 will be described in detail later with reference to FIG. 7.

A specific device configuration of the terminal 120 is not limited as long as it includes the input device, the display device, and the control device. For example, the terminal 120 may be a desktop personal computer (PC), a notebook PC, a tablet PC, a smartphone, or the like.

The RGB camera 130 is a camera capable of performing color photographing (that is, capable of acquiring image data including color information of the subject (hereinafter also referred to as color image data)). The RGB camera 130 can acquire color image data to which color information is added in an RGB format. In the illumination system 1, it is possible to take a picture of the subject with the RGB camera. Further, various types of known cameras may be used as the RGB camera 130.

The RGB camera 130 is installed at a position at which an emission range of the illumination light by the illuminating device 110 can be photographed. In the illustrated example, the RGB camera 130 is installed at substantially the center of an illumination surface of an illumination light of the illuminating device 110 in a left-right direction so that a photographing direction thereof substantially coincides with an illumination direction of the illumination light. As the RGB camera 130 is installed at such a position, it becomes possible to photograph a subject from the front with an illumination light emitted from the front, and thus it is possible to take a higher quality photograph. However, the installation position of the RGB camera 130 is not limited to the illustrated example and may be any position as long as it can photograph the emission range of the illumination light by the illuminating device 110 as described above.

Figure 5:
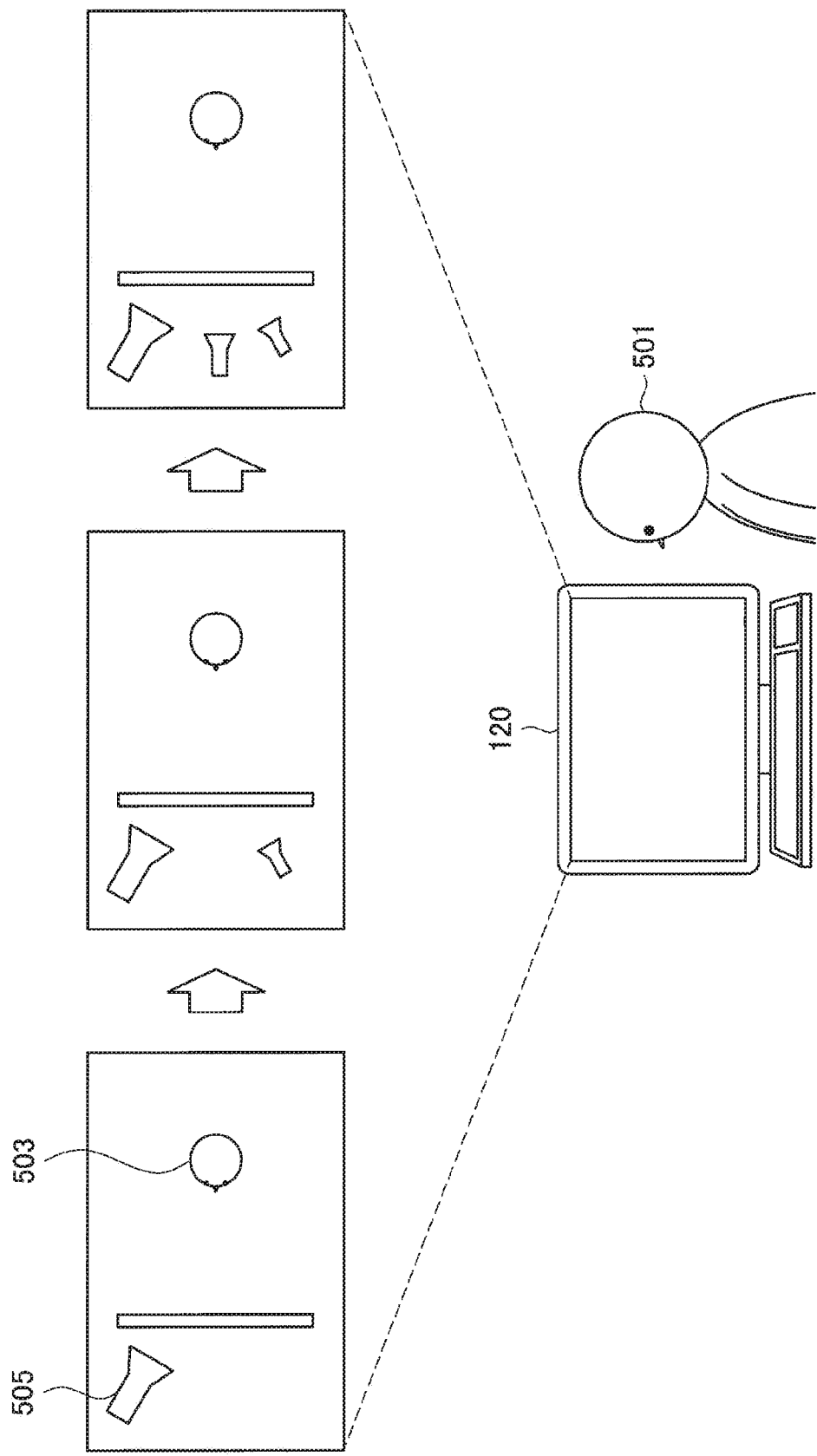
FIG. 5 is a diagram for describing a process of arranging virtual illuminating instruments.

2-2-2. Overview of Operation of Illumination System at the Time of Photographing An overview of an operation of the illumination system 1 at the time of photographing in manual mode is described. In photographing in the manual mode using the illumination system 1, first, the user arranges virtual illuminating instruments at the time of photographing using the terminal 120. FIG. 5 is a diagram for describing a process of arranging the virtual illuminating instruments. FIG. 5 illustrates an example in which a user 501 executes a process of arranging virtual illuminating instruments using the terminal 120.

As illustrated in FIG. 5, in the first embodiment, a graphical user interface (GUI) for arranging the virtual illuminating instruments can be provided. Specifically, as the GUI, an icon 503 indicating a subject and an icon 505 indicating a virtual illuminating instrument are displayed on a screen of the display device of the terminal 120. The user 501 can adjust a type of icon 505, the number of icons 505 indicating the virtual illuminating instrument, a position of the icon 505, and a direction of the icon 505 with respect to the icon 503 indicating the subject by a manipulation performed by the input device of the terminal 120. The type, the number, the position, and the direction of the icon 505 correspond to a type (including an intensity or a color) of a light source, the number of light sources, a position of a light source, and an emission direction of an illumination light which are desired to be reproduced by the illuminating device 110. As the type of icon 505, those corresponding to various light sources such as, for example, a fluorescent lamp, and an incandescent lamp, a spotlight may be prepared in advance. Accordingly, the user 501 can arrange the virtual illuminating instruments with respect to the subject. Further, a method of arranging the virtual illuminating instruments is not limited to the method of using GUI, and for example, the virtual illuminating instruments may be arranged by other methods such as a gesture or a voice.

Figure 6:
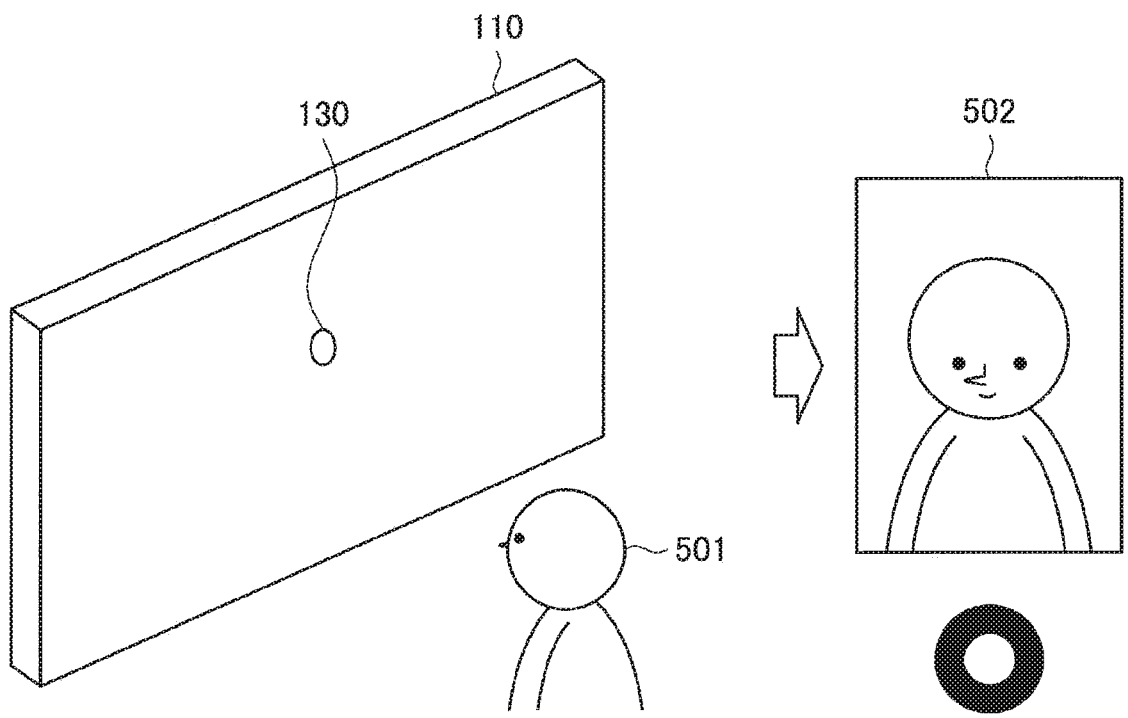
FIG. 6 is a diagram for describing a process of driving an illuminating device and a photographing process by an RGB camera.

If the arrangement of the virtual illuminating instruments is decided, the control device of the terminal 120 then drives the illuminating device 110 so that the illumination light by the decided virtual illuminating instruments is reproduced. Then, the control device of the terminal 120 drives the RGB camera 130 to capture still images in a state in which the illuminating device 110 is driven. FIG. 6 is a diagram for describing the process of driving the illuminating device 110 and the photographing process by the RGB camera 130. As illustrated in FIG. 6, as these processes are executed, the user 501 can take his/her satisfactory photograph 502 while receiving the illumination light from the illuminating device 110 that reproduces the virtual illuminating instrument, that is, receiving a desired illumination light.

Further, a through image based on an image captured by the RGB camera 130 may be displayed on the display device of the terminal 120. In this case, the user 501 may adjust the arrangement of the virtual illuminating instrument while confirming the through image. The driving of the illuminating device 110 based on the adjusted arrangement of the virtual illuminating instrument and the photographing by the RGB camera 130 are executed if necessary, and thus the user 501 can adjust the arrangement of the virtual illuminating instrument in real time while confirming the through image. Then, the user 501 performs a predetermined manipulation for capturing still images at a desired timing, so that the still image at that timing can be recorded as a photograph. However, in the illumination system 1, the through image need not necessarily be displayed, and the user 501 may repeat the arrangement of the virtual illuminating instruments and the capturing of the still image and adjust the arrangement of the virtual illuminating instrument while confirming the still image.

2-2-3. Functional Configuration of Illumination System

A functional configuration of the illumination system 1 for realizing the operation at the time of photographing described above will be described. FIG. 7 is a block diagram illustrating an example of a functional configuration of the illumination system 1 operated in the manual mode according to the first embodiment. Further, FIG. 7 illustrates a functional configuration corresponding to a case where the through image is displayed on the display device of the terminal 120 as an example. However, the function for displaying the through image may not be installed in the illumination system 1 as described above.

As described above, the illumination system 1 operated in the manual mode according to the first embodiment includes the illuminating device 110, the terminal 120, and the RGB camera 130. Further, the illuminating device 110 mainly includes the backlight 111, the liquid crystal panel 112, and the lenticular sheet 113. FIG. 7 conceptually illustrates these configurations as blocks. The illuminating device 110 emits the illumination light in accordance with the illumination conditions decided by the control device 123 under the control of the control device 123 of the terminal 120 to be described later. The RGB camera 130 executes photographing under control of the control device 123. Further, the RGB camera 130 transmits the acquired image data to the control device 123. Further, the image data acquired by the RGB camera 130 is hereinafter also referred to as RGB data in order to be distinguished from data acquired by a depth camera to be described later. In other words, the RGB data is image data (color image data) including color information.

Figure 7:
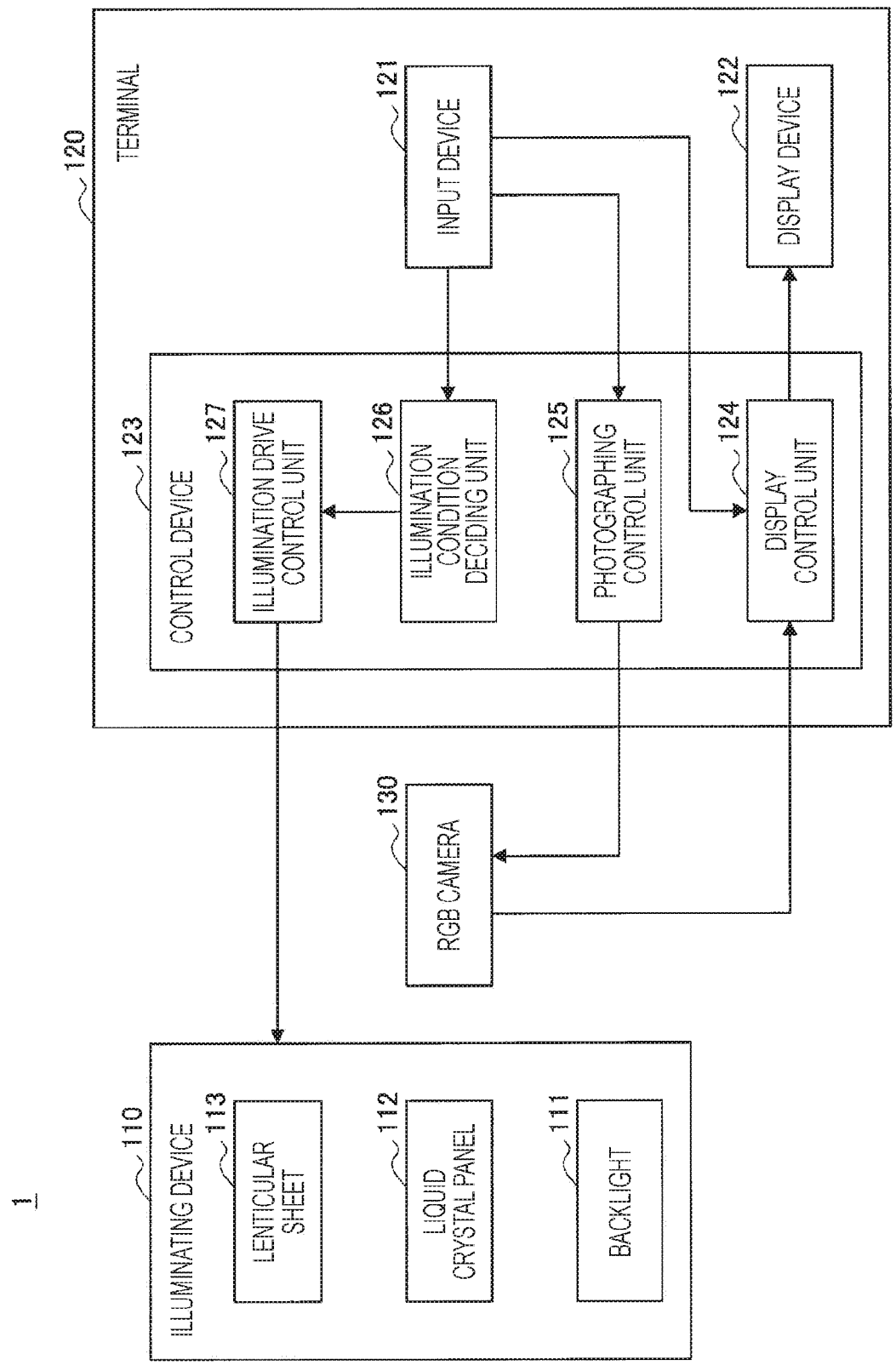
FIG. 7 is a block diagram illustrating an example of a functional configuration of an illumination system operated in a manual mode according to the first embodiment.

Referring to FIG. 7, the terminal 120 includes an input device 121, a display device 122, and a control device 123. For example, an instruction to arrange the virtual illuminating instrument described above, an instruction to perform still image capturing, and the like are input to the terminal 120 through the input device 121. As illustrated in FIG. 7, information or an instruction input from the input device 121 are provided to the control device 123. Further, the display device 122 displays, for example, a display screen related to a GUI, the through image, or the like when the virtual illuminating instrument described above is arranged under the control of the control device 123.

The control device 123 includes a display control unit 124, a photographing control unit 125, an illumination condition deciding unit 126, and an illumination drive control unit 127 as its functions. These functions can be realized as the processor of the control device 123 executes arithmetic processing in accordance with a predetermined program.

The display control unit 124 controls the operation of the display device 122 and causes the display device 122 to display various types of information. Specifically, the display control unit 124 causes the display device 122 to display the display screen related to the GUI when the virtual illuminating instrument is arranged. At this time, the display control unit 124 controls display such as movement of a GUI component (such as an icon) on the display screen together in response to an instruction input of the user via the input device 121. Further, the display control unit 124 causes the display device 122 to display the through image on the basis of the RGB data which is acquired by the RGB camera 130 and transmitted from the RGB camera 130.

The photographing control unit 125 controls an operation of the RGB camera 130 and causes the RGB camera 130 to execute photographing. Specifically, the photographing control unit 125 constantly drives the RGB camera 130 in order to cause the display device 122 to display the through image while the illuminating device 110 is being driven. Further, in a case where an instruction to execute still image capturing is input by the user via the input device 121, the photographing control unit 125 drives the RGB camera 130 to capture still images.

The illumination condition deciding unit 126 decides the illumination conditions for driving the illuminating device 110. In the manual mode, the user inputs information about the arrangement of the virtual illuminating instrument to the control device 123 via the input device 121. The illumination condition deciding unit 126 decides the illumination conditions for reproducing the illumination light by the arrangement of the virtual illuminating instrument on the basis of the information about the arrangement of the virtual illuminating instrument. The illumination condition deciding unit 126 provides the information about the decided illumination conditions to the illumination drive control unit 127.

The illumination drive control unit 127 drives the illuminating device 110 in accordance with the illumination condition on the basis of the information about the illumination conditions decided by the illumination condition deciding unit 126. Specifically, the illumination drive control unit 127 controls the illumination light emitted from the illuminating device 110 by controlling emission light from each light emission point of the illuminating device 110 in accordance with the illumination conditions decided by the illumination condition deciding unit 126. Accordingly, the illuminating device 110 can be driven to reproduce the illumination light by the arrangement of the virtual illuminating instrument input by the user.

2-2-4. Processing Procedure of Control Method of Illumination System

Figure 8:
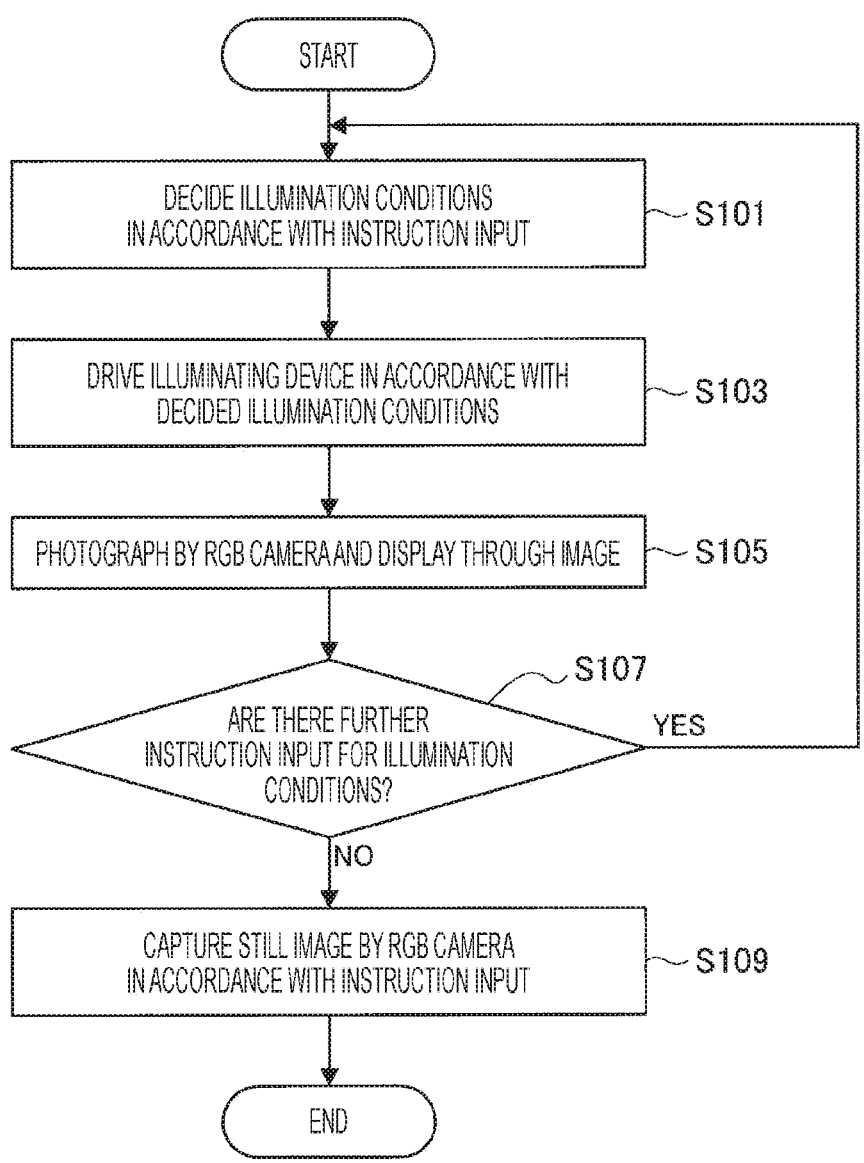
FIG. 8 is a flowchart illustrating an example of a processing procedure of a control method in a manual mode of an illumination system according to the first embodiment.

A processing procedure of a control method of the illumination system 1 executed by the control device 123 described above will be described. FIG. 8 is a flowchart illustrating an example of a processing procedure of a control method in the manual mode of the illumination system 1 according to the first embodiment. Further, each process illustrated in FIG. 8 corresponds to each process executed by the control device 123 illustrated in FIG. 7. Each process illustrated in FIG. 8 is executed as the processor constituting the control device 123 operates in accordance with a predetermined program. The details of each process illustrated in FIG. 8 have already been described above when describing the functions of the control device 123, and therefore, in description of each process illustrated in FIG. 8, an overview of each process will be described, and detailed description thereof will be omitted.

Referring to FIG. 8, in the control method in the manual mode of the illumination system 1 according to the first embodiment, first, the illumination conditions are decided in accordance with an instruction input from the user via the input device 121 (an instruction input to arrange the virtual illuminating instrument) (step S101). The process of step S101 corresponds to the process performed by the illumination condition deciding unit 126 illustrated in FIG. 7.

Then, the illuminating device 110 is driven in accordance with the decided illumination conditions (step S103). The process of step S103 corresponds to the process performed by the illumination drive control unit 127 illustrated in FIG. 7.

Then, photographing by the RGB camera 130 is performed, and a through image of an image captured by the RGB camera 130 is displayed on the display device 122 (step S105). The process of step S105 corresponds to the process executed by the photographing control unit 125 and the display control unit 124 illustrated in FIG. 7.

Then, it is determined whether or not there is a further instruction input for the illumination conditions (step S107). The process of step S107 corresponds to the process performed by the illumination condition deciding unit 126 illustrated in FIG. 7.

In a case where there is a further instruction input for the illumination conditions in step S107, the process returns to step S101, and the illumination condition deciding unit 126 decides the illumination conditions in accordance with the further instruction input. Then, the process of step S103 and subsequent steps is executed again.

In a case where there is no further instruction input for the illumination conditions in step S107, the process proceeds to step S109. In step S109, still image capturing by the RGB camera 130 is executed in response to the instruction input from the user via the input device 121 (an instruction input to capture a still image). The process of step S109 corresponds to the process executed by the photographing control unit 125 illustrated in FIG. 7.

2-3. Automatic Mode

Next, a configuration and functions of the illumination system in the automatic mode will be described. Further, a device configuration of the illumination system operated in the automatic mode is similar to the device configuration of the illumination system 1 operated in the manual mode described with reference to FIG. 4. Therefore, the detailed description is omitted here.

2-3-1. Functional Configuration of Illumination System

Figure 9:
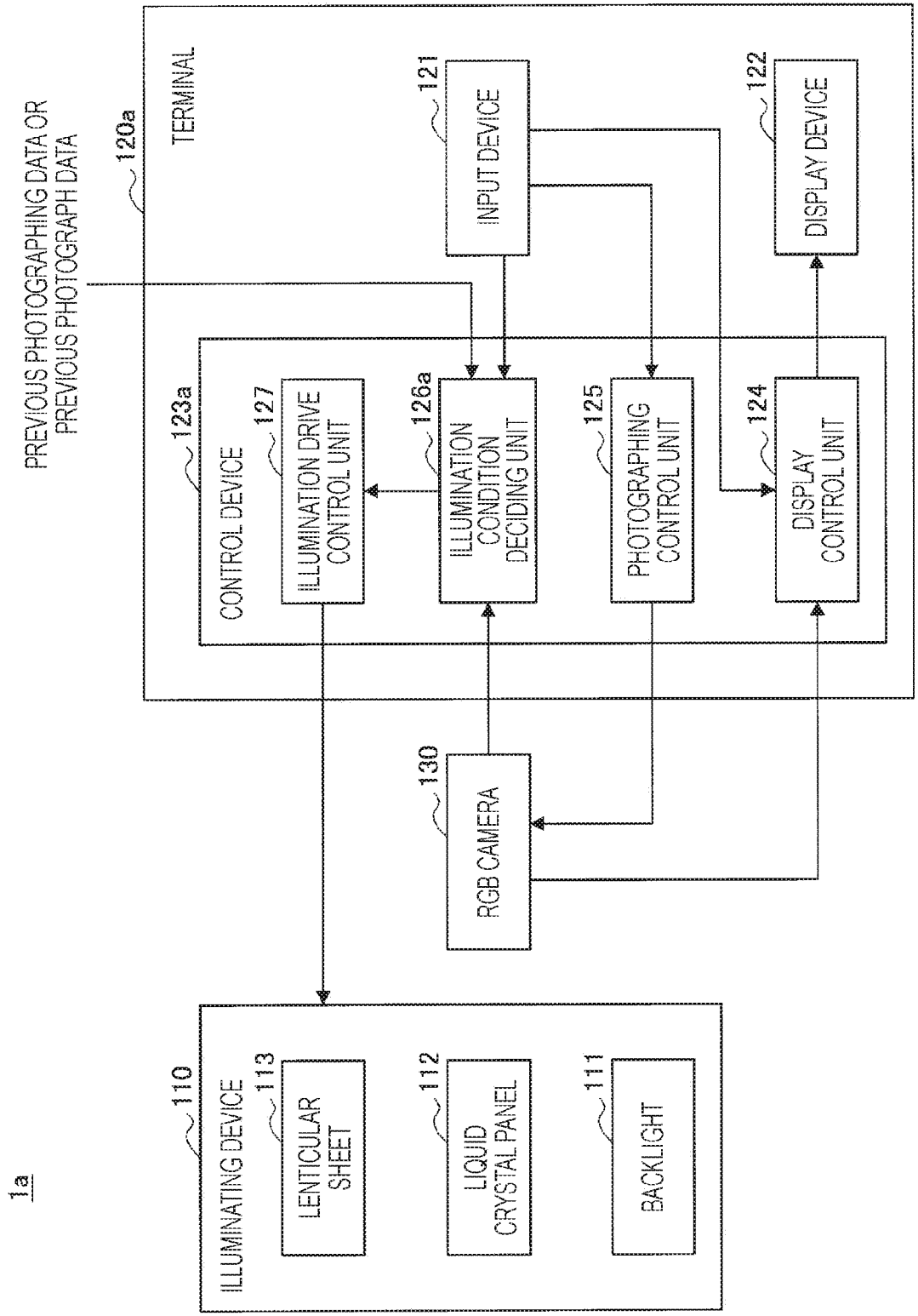
FIG. 9 is a block diagram illustrating an example of a functional configuration of an illumination system operated in an automatic mode according to the first embodiment.

FIG. 9 is a block diagram illustrating an example of a functional configuration of the illumination system operated in the automatic mode according to the first embodiment. Further, FIG. 9 illustrates a functional configuration corresponding to a case where through image is displayed on a display device 122 of a terminal 120a to be described later as an example. However, even in the case of the automatic mode, similarly to the case of the manual mode, the function of displaying the through image may not be installed in the illumination system.

Referring to FIG. 9, an illumination system 1a operated in the automatic mode according to the first embodiment includes an illuminating device 110, a terminal 120a, and an RGB camera 130. Further, the terminal 120a includes an input device 121, a display device 122, and a control device 123a. Here, the configurations and functions of the illuminating device 110, the RGB camera 130, and the input device 121 and the display device 122 of the terminal 120a are similar to those in the illumination system 1 operated in the manual mode illustrated in FIG. 7, and thus detailed description thereof is omitted here. As described above, the illumination system 1a corresponds to one in which the control device 123 of the terminal 120 is replaced with the control device 123a in the illumination system 1. Further, a device configuration of the control device 123a is similar to the device configuration of the control device 123, and the control device 123a corresponds to one whose function is changed from the control device 123.

Referring to FIG. 9, the control device 123a includes a display control unit 124, a photographing control unit 125, an illumination condition deciding unit 126a, and an illumination drive control unit 127 as its functions. These functions can be realized as the processor of the control device 123a executes arithmetic processing in accordance with a predetermined program. Here, the functions of the display control unit 124, the photographing control unit 125, and the illumination drive control unit 127 are similar to those in the illumination system 1 operated in the manual mode described with reference to FIG. 7, and thus detailed description thereof is omitted here.

In the automatic mode, previous photographing data or previous photograph data is input to the control device 123a. Here, the previous photographing data is data in photographing performed in the past using the illumination system 1a, and the previous photographing data includes information about the illumination conditions in the photographing and RGB data of the subject. Further, the previous photograph data is arbitrary photograph data captured in the past without using the illumination system 1a, and is, for example, photograph data captured by a digital camera or a smartphone. The photograph data may be data in which at least RGB data of a subject is extractable. The previous photographing data or the previous photograph data input to the control device 123a may be data when a satisfactory photograph has been taken in the past.

The illumination condition deciding unit 126a automatically decides the illumination conditions for performing photographing from now on the basis of the input previous photographing data or the previous photograph data so that the illumination conditions in the previous photographing data or the previous photograph data are reproduced.

Figure 10:
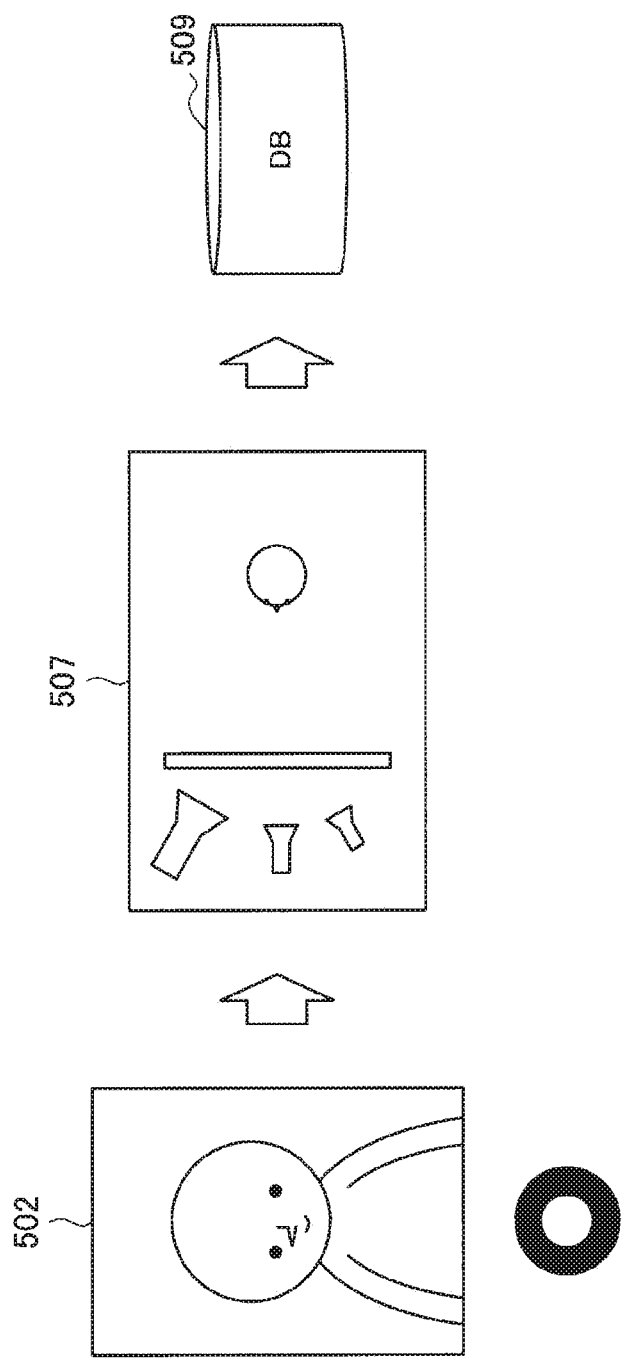
FIG. 10 is a diagram for describing an operation of an illumination system at the time of photographing using previous photographing data.
Figure 11:
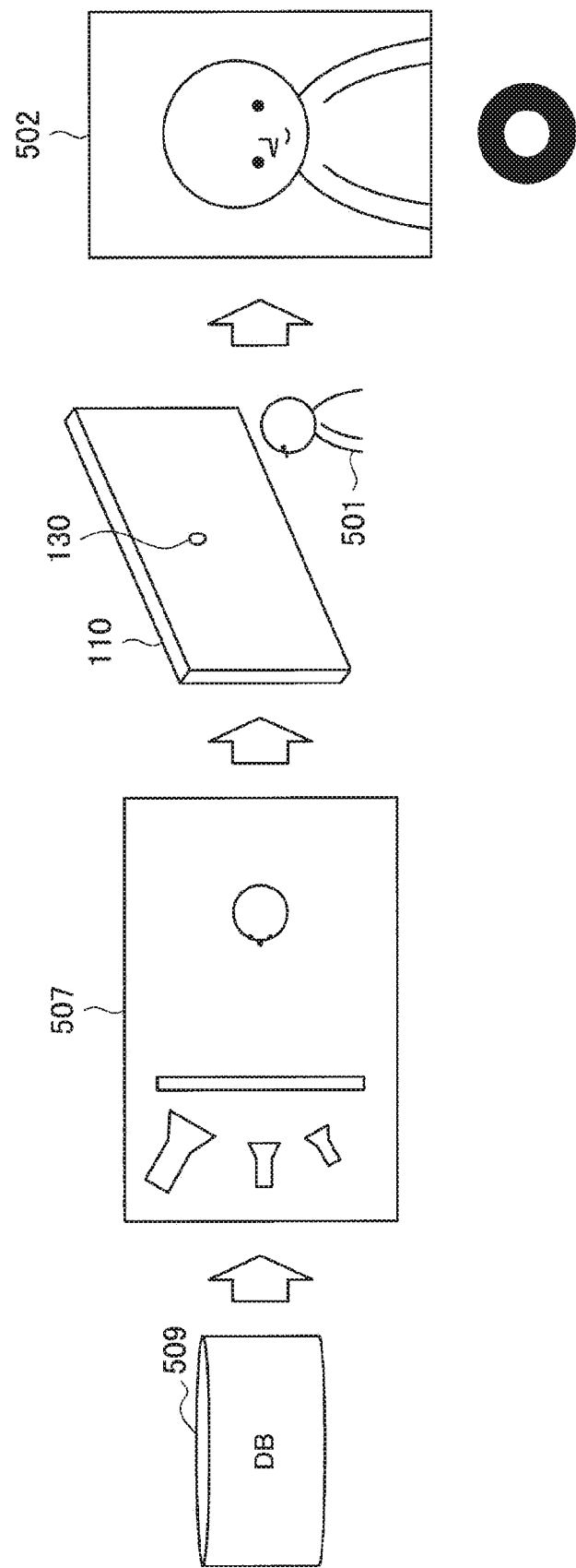
FIG. 11 is a diagram for describing an operation of an illumination system at the time of photographing using previous photographing data.

Specifically, in a case where the previous photographing data is input, the illumination condition deciding unit 126a decides illumination conditions included in the previous photographing data as the illumination conditions for performing photographing from now on. An operation of the illumination system 1a at the time of photographing using the previous photographing data will be described with reference to FIGS. 10 and 11. FIGS. 10 and 11 are diagrams for describing an operation of the illumination system 1a at the time of photographing using the previous photographing data. In the illumination system 1a, in a case where the previous photographing data is used, a database 509 (a DB 509) that stores photographing data 507 in which a satisfactory photograph has been captured in the past using the illumination system 1a (in FIGS. 10 and 11, for convenience, the arrangement of the virtual illuminating instruments related to the illumination conditions are illustrated as the photographing data 507) is created, for example, as illustrated in FIG. 10. In a case where photographing is newly performed, as illustrated in FIG. 11, the previous photographing data 507 is acquired from the DB 509, and the illumination conditions included in the previous photographing data 507 are reproduced. Then, the illuminating device 110 is driven in accordance with the reproduced illumination conditions, and photographing is performed. Accordingly, it is possible to capture a satisfactory photograph similar to that when the previous photographing data is obtained.

However, even in a case where photographing is performed using the illumination conditions included in the previous photographing data 507 without change, a satisfactory photograph is not necessarily captured, similarly to when the previous photographing data 507 is acquired, due to a surrounding environment, a distance between the illuminating device 110 and the subject, or the like. Therefore, the illumination condition deciding unit 126a further compares current RGB data of the subject acquired by the RGB camera 130 with previous RGB data of the subject included in the previous photographing data, and automatically adjust the illumination conditions so that the previous RGB data can be reproduced. Specifically, the illumination condition deciding unit 126a quantitatively calculates a physical quantity specifying the illumination conditions such as brightness, saturation, and a hue for each pixel of the RGB data or for each predetermined region including a plurality of pixels in both the current RGB data of the subject and the previous RGB data of the subject. Then, the illumination condition deciding unit 126a compares the calculated values of the brightness or the like for the current RGB data and the previous RGB data. Then, the illumination condition deciding unit 126a changes the illumination conditions so that the value of the brightness or the like of each pixel or each region in the current RGB data is close to the value of the brightness or the like of each pixel or each region in the previous RGB data (for example, so that the illumination light is further emitted to compensate for the brightness for a pixel or a region having insufficient brightness).

Further, in the illumination system 1a, after the illumination conditions are automatically decided by the illumination condition deciding unit 126a, the illumination conditions are manually adjusted in accordance with an instruction input by the user 501 via the input device 121 if necessary. The manual adjustment of the illumination conditions is performed, similarly to the illumination system 1 operated in the manual mode described above. Even in a case where the illumination conditions are automatically decided by the illumination condition deciding unit 126a, an image desired by the user 501 is not necessarily obtained by the illumination light according to the illumination condition, and thus the user 501 can obtain the illumination light which is more in line with his/her needs since the manual adjustment can be performed. At this time, the illumination conditions close to the illumination conditions from which a desired illumination light can be obtained are automatically decided, and then the manual adjustment by the user 501 can be performed, so that the burden on the user 501 can be reduced as compared with a case where the user 501 designates the illumination conditions from the beginning as in the manual mode.

Figure 12:
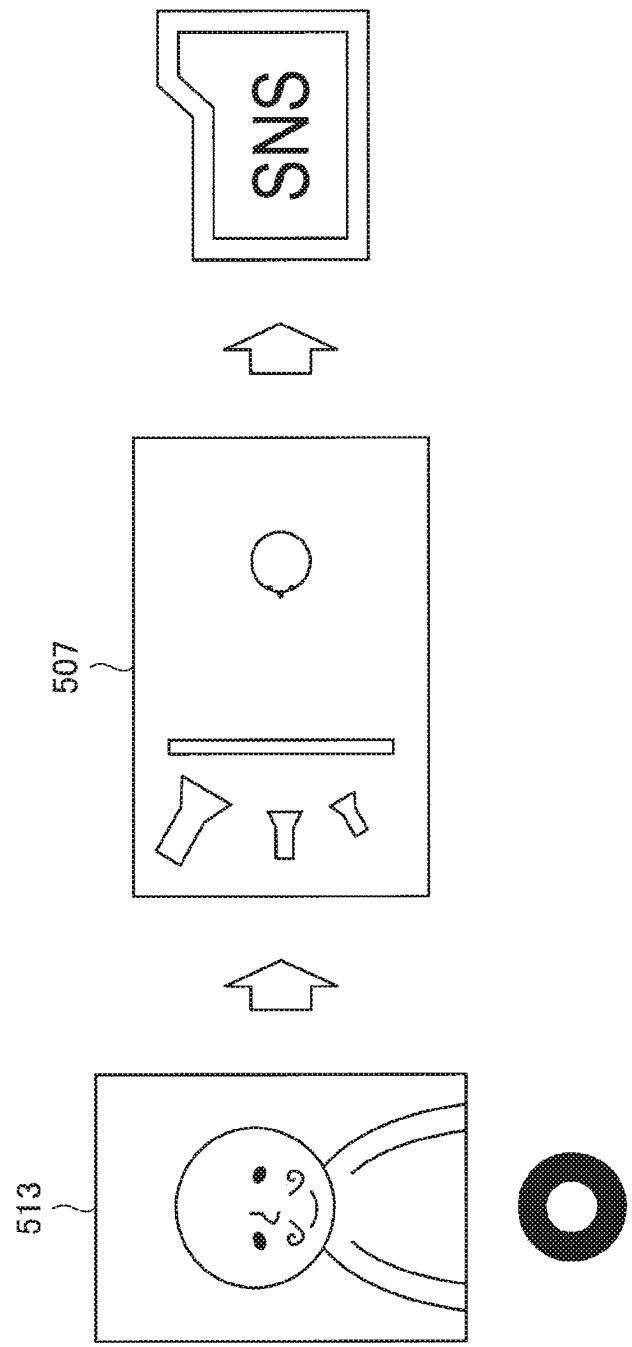
FIG. 12 is a diagram for describing another operation of an illumination system at the time of photographing using previous photographing data.
Figure 13:
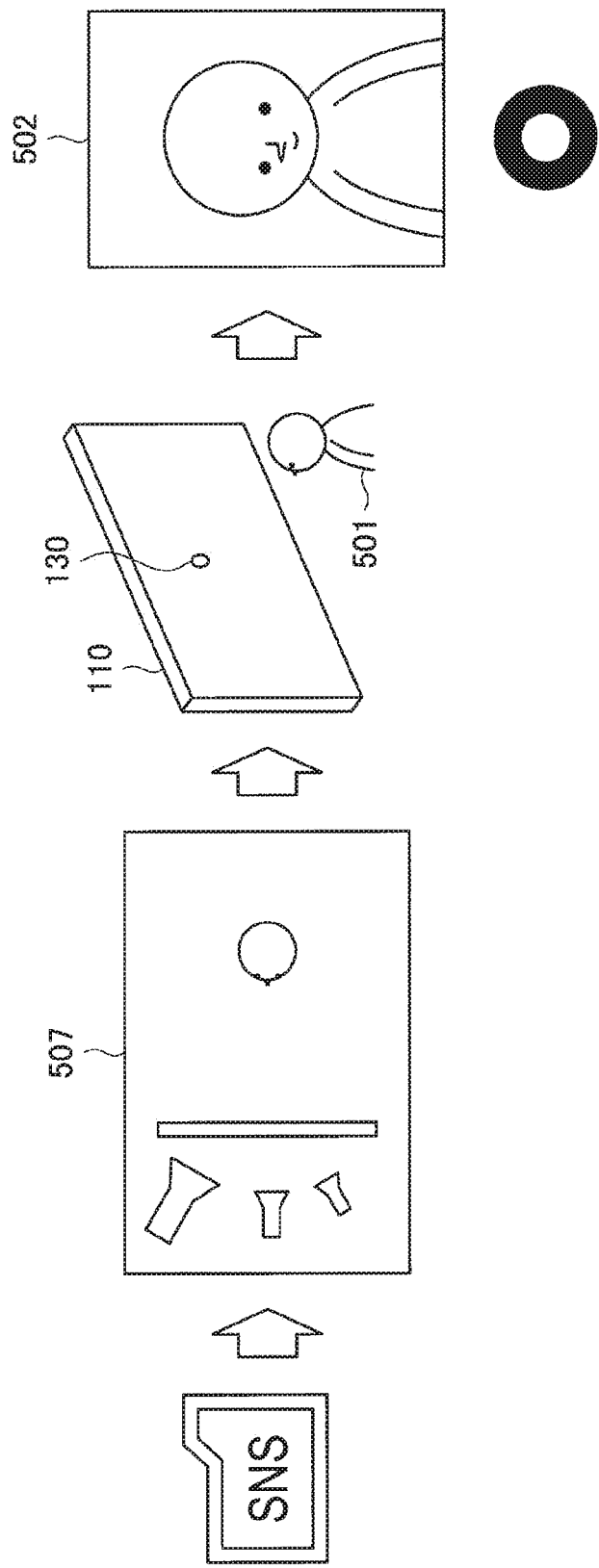
FIG. 13 is a diagram for describing another operation of an illumination system at the time of photographing using previous photographing data.

Further, the previous photographing data need not necessarily be the photographing data of the user 501 him/herself (that is, the subject to be photographed from now on) and may be photographing data of another user photographed in the past. FIGS. 12 and 13 are diagrams for describing another operation of the illumination system 1a at the time of photographing using the previous photographing data. In a case where photographing data of another user is used, for example, as illustrated in FIG. 12, the previous photographing data 507 in which a satisfactory photograph 513 of another user is captured (in FIG. 12 and FIG. 13, for convenience, the arrangement of the virtual illuminating instrument related to the illumination conditions are illustrated as the photographing data 507) is shared via social media such as a social networking service (SNS). In this case, in a case where photographing is newly performed, the user 501 acquires the photographing data 507 in which an illumination meeting the user's desire is realized among the previous photographing data uploaded to the social media and inputs the acquired photographing data 507 to the illumination condition deciding unit 126a of the control device 123a as illustrated in FIG. 13. In the illumination condition deciding unit 126a, the illumination conditions included in the previous photographing data 507 are reproduced.

Then, the illuminating device 110 is driven in accordance with the reproduced illumination conditions, and photographing is performed. Further, in this case, as described above, the adjustment of the illumination conditions by a comparison of the current RGB data and the previous RGB data or the manual adjustment of the illumination conditions by the user may be further performed. Since the photographing data can be shared by a plurality of users 501 using the illumination system 1a using social media, for example, one user 501 performs photographing using the photographing data obtained by another user 501. Therefore, it becomes possible for the user 501 to perform photographing under the illumination conditions that is not thought of by the user 501, and the convenience of the user 501 is further improved. Further, the method for acquiring the photographing data of the other users is not limited to the method via the social media. For example, the photographing data may be exchanged by personal interaction between the users, or samples of one or more types of photographing data may be registered in advance in the control device 123a of the illumination system 1a.

Figure 14:
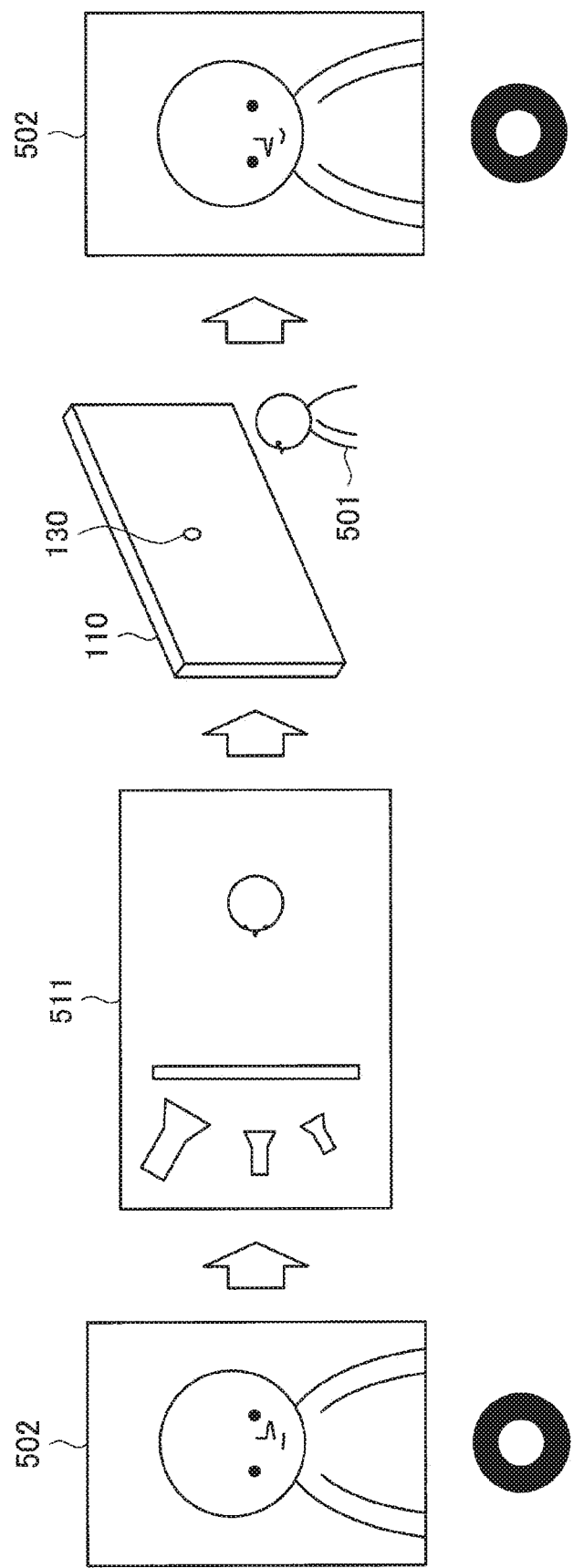
FIG. 14 is a diagram for describing an operation of an illumination system at the time of photographing using previous photograph data.

On the other hand, the operation of the illumination system 1a in a case where the previous photograph data is input will be described with reference to FIG. 14. FIG. 14 is a diagram for describing an operation of the illumination system 1a at the time of photographing using the previous photograph data. In a case where the previous photograph data is used, for example, as illustrated in FIG. 14, the user 501 inputs data of the satisfactory photograph 502 in which the user 501 was photographed in the past to the control device 123a of the terminal 120a.

In a case where the previous photograph data is used, the illumination condition deciding unit 126a is unable to immediately decide the illumination conditions in contrast to a case where the previous photographing data is input since the illumination conditions when the previous photograph data is acquired are unknown. Therefore, in a case where the previous photograph data is input, the illumination condition deciding unit 126a compares the current RGB data of the subject acquired by the RGB camera 130 with the previous RGB data of the subject extracted from the previous photograph data and decides illumination conditions 511 (in FIG. 14, for convenience, the arrangement of the virtual illuminating instruments related to the illumination conditions 511 is illustrated as the illumination conditions 511) so that the previous RGB data can be reproduced. Specifically, similarly to a case where the above-described previous photographing data is input, the illumination condition deciding unit 126a quantitatively calculates a physical quantity specifying the illumination conditions 511 such as the brightness for each pixel of the RGB data or for each predetermined region of a plurality of pixels, compares the calculated value of the brightness or the like, and decides the illumination conditions 511 so that the value of the brightness or the like of each pixel or each region in the current RGB data is close to the value of the brightness or the like of each pixel or each region in the previous RGB data. Further, at this time, the current RGB data can be acquired in a state in which the illuminating device 110 is driven in accordance with a predetermined illumination conditions set in advance.

Then, the illuminating device 110 is driven in accordance with the decided illumination conditions, and photographing is performed. Accordingly, it is possible to obtain the satisfactory photograph 502, similarly to the case in a case where the previous photograph data is obtained. Further, at this time, similarly to a case where the previous photographing data is used, the manual adjustment of the illumination conditions by the user may be further performed.

Figure 15:
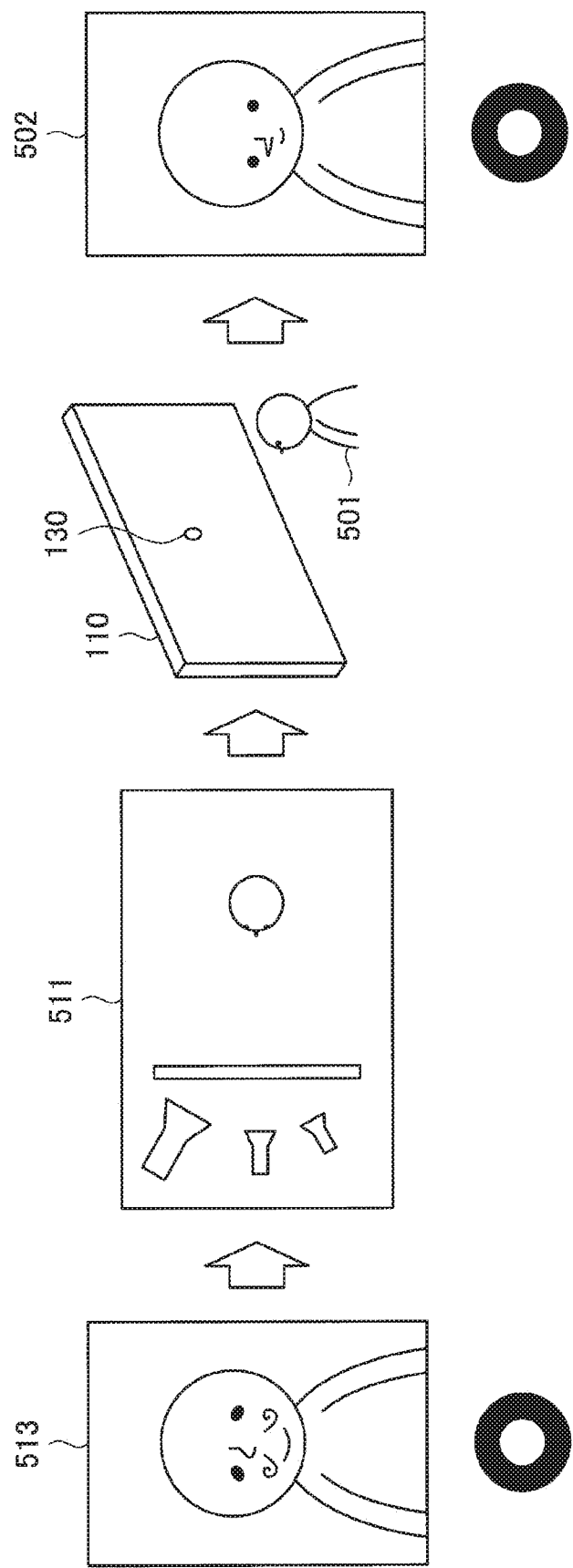
FIG. 15 is a diagram for describing another operation of an illumination system at the time of photographing using previous photograph data.

Further, the previous photograph data need not necessarily be data which is obtained by photographing the user 501 him/herself (that is, the subject to be photographed from now on). FIG. 15 is a diagram for describing another operation of the illumination system 1a at the time of photographing using the previous photograph data. As illustrated in FIG. 15, data of a satisfactory photograph 513 of another user taken in the past may be used as input data. A past photograph of another user may be, for example, a photograph published in a magazine or the like or may be any photograph acquired from the Internet. Alternatively, one or more types of photograph data samples may be registered in advance in the control device 123a of the illumination system 1a. The user 501 can input arbitrary photograph data to the control device 123a as the input data for deciding the illumination conditions.

In this case, similarly to a case where his/her own photograph data is used, the illumination condition deciding unit 126a analyzes the previous photograph data, compares it with the current RGB data of the subject (the user 501), and decides the illumination conditions 511 (in FIG. 15, for convenience, the arrangement of the virtual illuminating instrument related to the illumination conditions 511 is illustrated as illumination conditions 511) so that the RGB data of the subject (other user) in the previous photograph data is reproduced.

Then, the illuminating device 110 is driven in accordance with the decided illumination conditions 511, and photographing is performed. Accordingly, it is possible to obtain the satisfactory photograph 502, similarly to the case in a case where the previous photograph data is obtained. Further, at this time, similarly to a case where his/her own previous photograph data is used, the manual adjustment of the illumination conditions 511 by the user 501 may be further performed. By using the previous photograph data of another user, the user 501 can take a photograph so that the illumination conditions at the time of photographing are reproduced using a desired arbitrary photograph as an input, and thus the convenience of the user 501 is further improved.

2-3-2. Processing Procedure of Control Method of Illumination System

Figure 16:
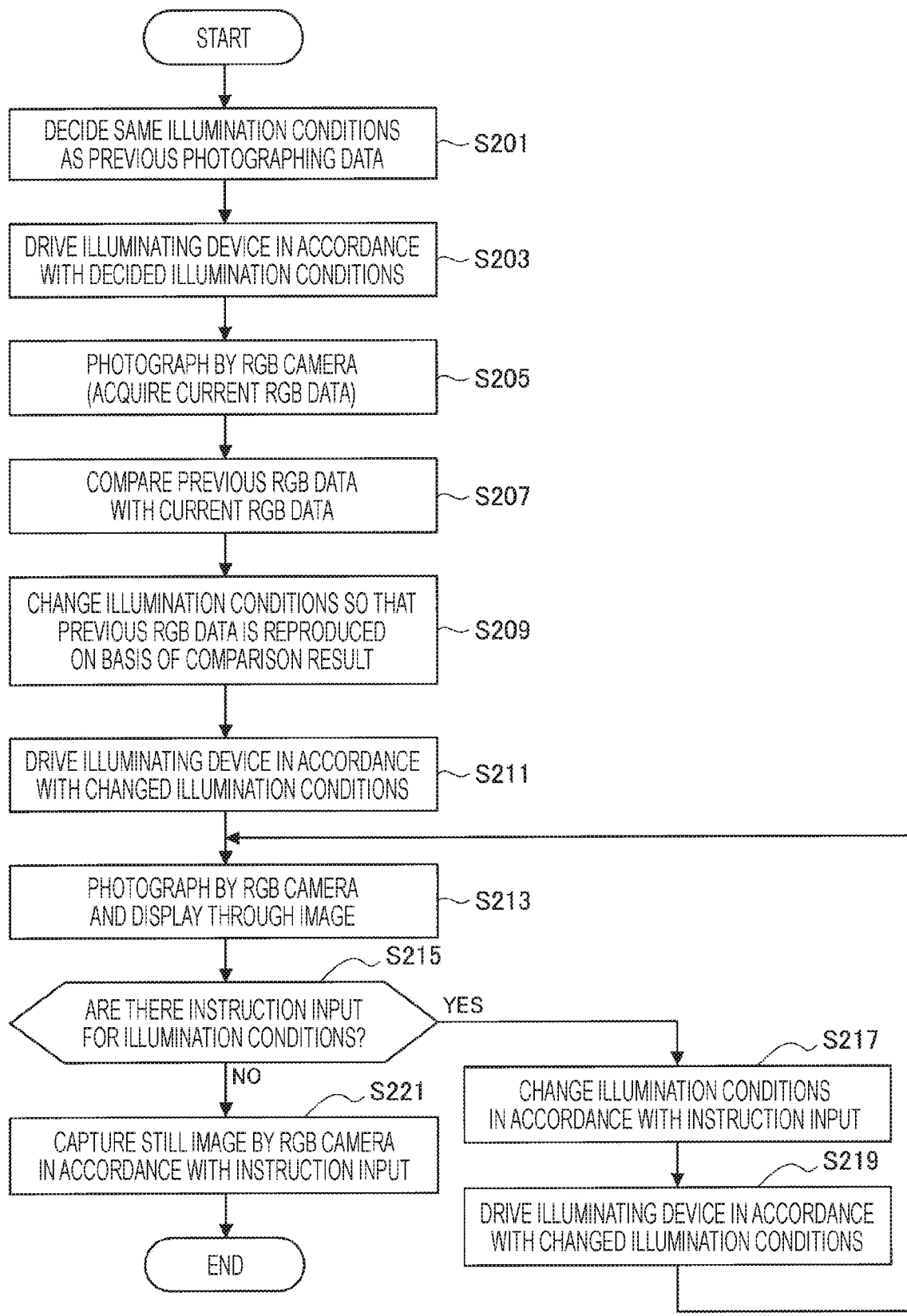
FIG. 16 is a flowchart illustrating an example of a processing procedure of a control method in a case where previous photographing data is used in an illumination system operated in an automatic mode according to the first embodiment is used.
Figure 17:
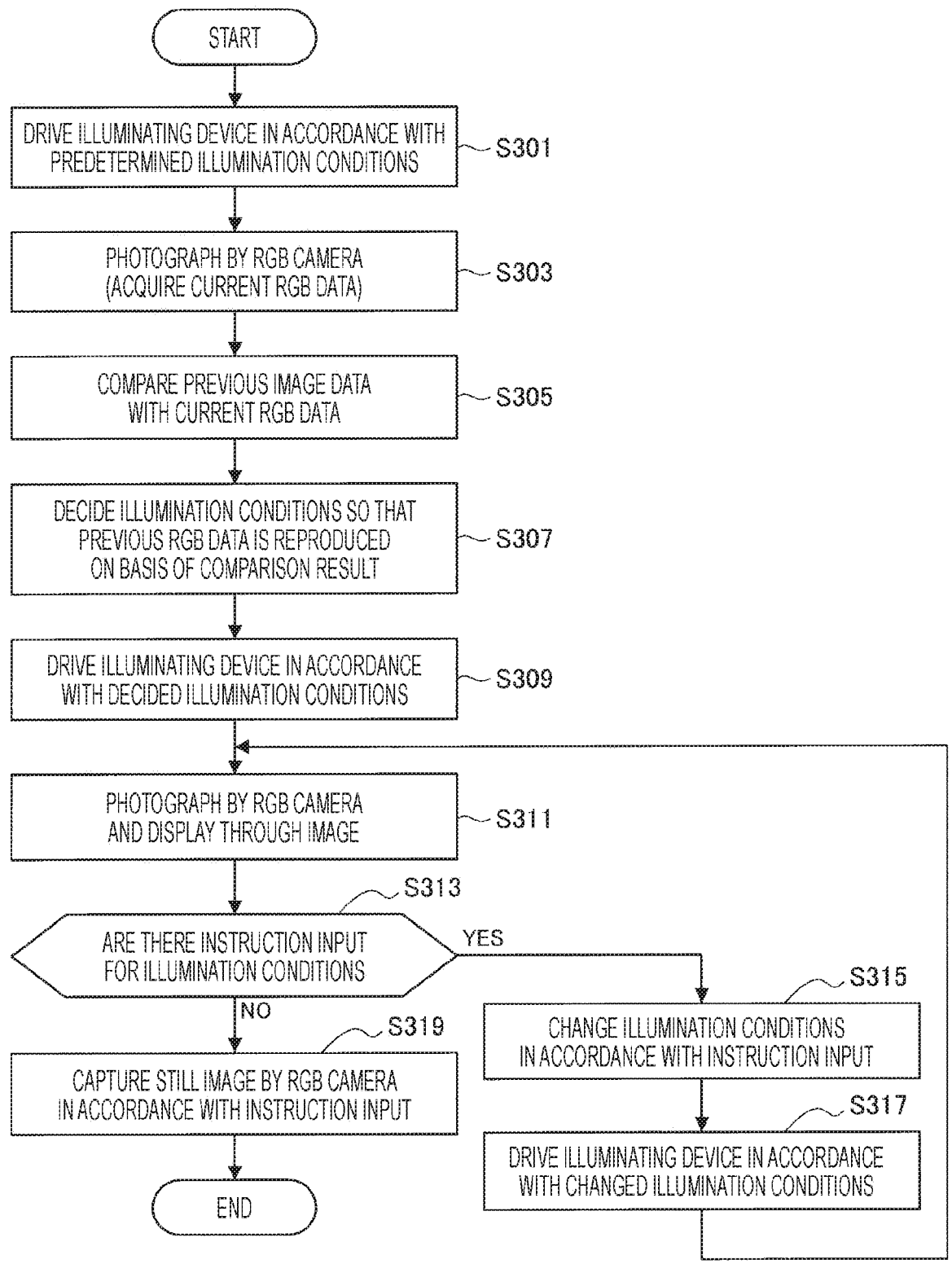
FIG. 17 is a flowchart illustrating an example of a processing procedure of a control method in a case where previous photograph data is used in an illumination system operated in an automatic mode according to the first embodiment is used.

A processing procedure of a control method of the illumination system 1a executed by the control device 123a described above will be described. Further, as described above, in the illumination system 1a, the previous photographing data or the previous photograph data is used to automatically decide the illumination conditions. Hereinafter, the processing procedure of the control method of the illumination system 1a in a case where the previous photographing data is used and the processing procedure of the control method of the illumination system 1a in a case where the previous photograph data is used will be described in order. Further, processes illustrated in FIGS. 16 and 17 below correspond to the processes executed by the control device 123a illustrated in FIG. 9. The processes illustrated in FIGS. 16 and 17 are executed as the processor constituting the control device 123a operates in accordance with a predetermined program. The details of the processes illustrated in FIGS. 16 and 17 have been already described above when describing the functions of the control device 123a, and therefore, in description of the processes illustrated in FIGS. 16 and 17, an overview of each process will be described, and detailed description thereof will be omitted.

2-3-2-1. Case in which Previous Photographing Data is Used

The processing procedure of the control method of the illumination system 1a in a case where the previous photographing data is used will be described with reference to FIG. 16. FIG. 16 is a flowchart illustrating an example of the processing procedure of the control method in a case where the previous photographing data is used in the illumination system 1a operated in the automatic mode according to the first embodiment.

Referring to FIG. 16, according to the first embodiment, in the control method in a case where the previous photographing data is used in the illumination system 1a operated in the automatic mode, first, the illumination conditions identical to those in the previous photographing data are decided as the illumination conditions for performing photographing from now on (step S201). The process of step S201 corresponds to the process performed by the illumination condition deciding unit 126a illustrated in FIG. 9.

Then, the illuminating device 110 is driven in accordance with the decided illumination conditions (step S203). The process of step S203 corresponds to the process performed by the illumination drive control unit 127 illustrated in FIG. 9.

Then, photographing by the RGB camera 130 is performed, that is, the current RGB data of the subject is acquired (step S205). The process of step S205 corresponds to the process executed by the photographing control unit 125 illustrated in FIG. 9.

Then, the previous RGB data of the subject included in the previous photographing data is compared with the current RGB data of the subject acquired by the RGB camera 130 (step S207). The process of step S207 corresponds to the process executed by the illumination condition deciding unit 126a illustrated in FIG. 9.

Then, the illumination conditions are changed on the basis of a comparison result so that the previous RGB data is reproduced (step S209). The process of step S209 corresponds to the process performed by the illumination condition deciding unit 126a illustrated in FIG. 9.

Then, the illuminating device 110 is driven in accordance with the changed illumination conditions (step S211). The process of step S211 corresponds to the process performed by the illumination drive control unit 127 illustrated in FIG. 9.

Then, photographing by the RGB camera 130 is performed, and the through image of the image captured by the RGB camera 130 is displayed on the display device 122 (step S213). The process of step S213 corresponds to the process executed by the photographing control unit 125 and the display control unit 124 illustrated in FIG. 9.

Then, it is determined whether or not there is an instruction input (an instruction input from the user via the input device 121) for the illumination conditions (step S215). The process of step S215 corresponds to the process executed by the illumination condition deciding unit 126a illustrated in FIG. 9.

In a case where there is an instruction input for the illumination conditions in step S215, the process proceeds to step S217. In step S217, the illumination conditions are changed in accordance with the instruction input. Then, the illuminating device 110 is driven in accordance with the changed illumination conditions (step S219). Thereafter, the process returns to step S213, and the processing after step S213 is executed again. The process of step S217 corresponds to the process performed by the illumination condition deciding unit 126a illustrated in FIG. 9. Further, the process of step S219 corresponds to the process executed by the illumination drive control unit 127 illustrated in FIG. 9.

On the other hand, in a case where there is no instruction input for the illumination conditions in step S215, the process proceeds to step S221. In step S221, still image capturing by the RGB camera 130 is executed in accordance with an instruction input from the user via the input device 121 (an instruction input to capture a still image). The process of step S211 corresponds to the process executed by the photographing control unit 125 illustrated in FIG. 9.

2-3-2-2. Case in which Previous Photograph Data is Used

The processing procedure of the control method of the illumination system 1a in a case where the previous photograph data is used will be described with reference to FIG. 17. FIG. 17 is a flow chart illustrating an example of the processing procedure of the control method in a case where the previous photograph data is used in the illumination system 1a operated in the automatic mode according to the first embodiment.

Referring to FIG. 17, in the control method in a case where the previous photograph data is used in the illumination system 1a operated in the automatic mode according to the first embodiment, first, the illuminating device 110 is driven in accordance with predetermined illumination conditions (step S301). The process of step S301 corresponds to the process performed by the illumination drive control unit 127 illustrated in FIG. 9.

Then, photographing by the RGB camera 130 is performed, that is, the current RGB data is acquired (step S303). The process of step S303 corresponds to the process executed by the photographing control unit 125 illustrated in FIG. 9.

Then, the previous RGB data of the subject extracted from the previous photograph data is compared with the current RGB data of the subject acquired by the RGB camera 130 (step S305). The process of step S305 corresponds to the process executed by the illumination condition deciding unit 126a illustrated in FIG. 9.

Then, the illumination conditions are decided on the basis of a comparison result so that the previous RGB data is reproduced (step S307). The process of step S307 corresponds to the process executed by the illumination condition deciding unit 126a illustrated in FIG. 9.

Then, the illuminating device 110 is driven in accordance with the decided illumination conditions (step S309). The process of step S309 corresponds to the process performed by the illumination drive control unit 127 illustrated in FIG. 9.

Then, photographing by the RGB camera 130 is performed, and the through image of the image captured by the RGB camera 130 is displayed on the display device 122 (step S311). The process of step S311 corresponds to the process executed by the photographing control unit 125 and the display control unit 124 illustrated in FIG. 9.

Then, it is determined whether or not there is an instruction input (an instruction input from the user via the input device 121) for the illumination conditions (step S313). The process of step S313 corresponds to the process performed by the illumination condition deciding unit 126a illustrated in FIG. 9.

In a case where there is an instruction input for the illumination conditions in step S313, the process proceeds to step S315. In step S315, the illumination conditions are changed in accordance with the instruction input. Then, the illuminating device 110 is driven in accordance with the changed illumination conditions (step S317). Thereafter, the process returns to step S311, and the process of step S213 and subsequent steps is executed again. The process of step S315 corresponds to the process performed by the illumination condition deciding unit 126a illustrated in FIG. 9. Further, the process of step S317 corresponds to the process executed by the illumination drive control unit 127 illustrated in FIG. 9.

On the other hand, in a case where there is no instruction input for the illumination conditions in step S313, the process proceeds to step S319. In step S319, still image capturing by the RGB camera 130 is performed in response to an instruction input from the user via the input device 121 (an instruction input to capture a still image). The process of step S313 corresponds to the process executed by the photographing control unit 125 illustrated in FIG. 9.

2-3-3. Modified Example

A modified example of the illumination system 1a operated in the automatic mode according to the first embodiment described above will be described. The illumination system 1a described above includes the illuminating device 110, the terminal 120a, and the RGB camera 130. However, the first embodiment is not limited to such an example, and the illumination system 1a may further include a depth camera in addition to this configuration.

Figure 18:
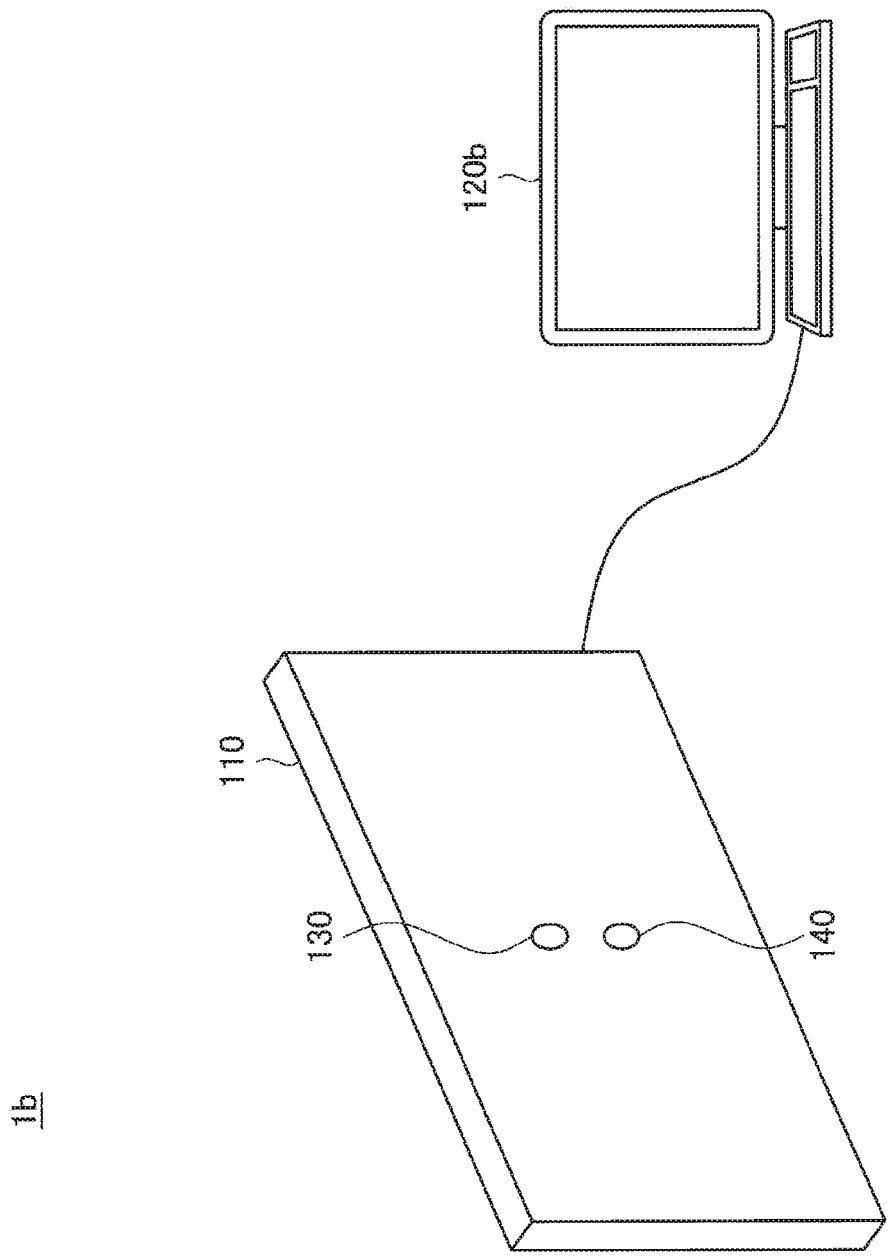
FIG. 18 is a diagram illustrating a schematic configuration of an illumination system further including a depth camera according to a modified example of the first embodiment.
Figure 19:
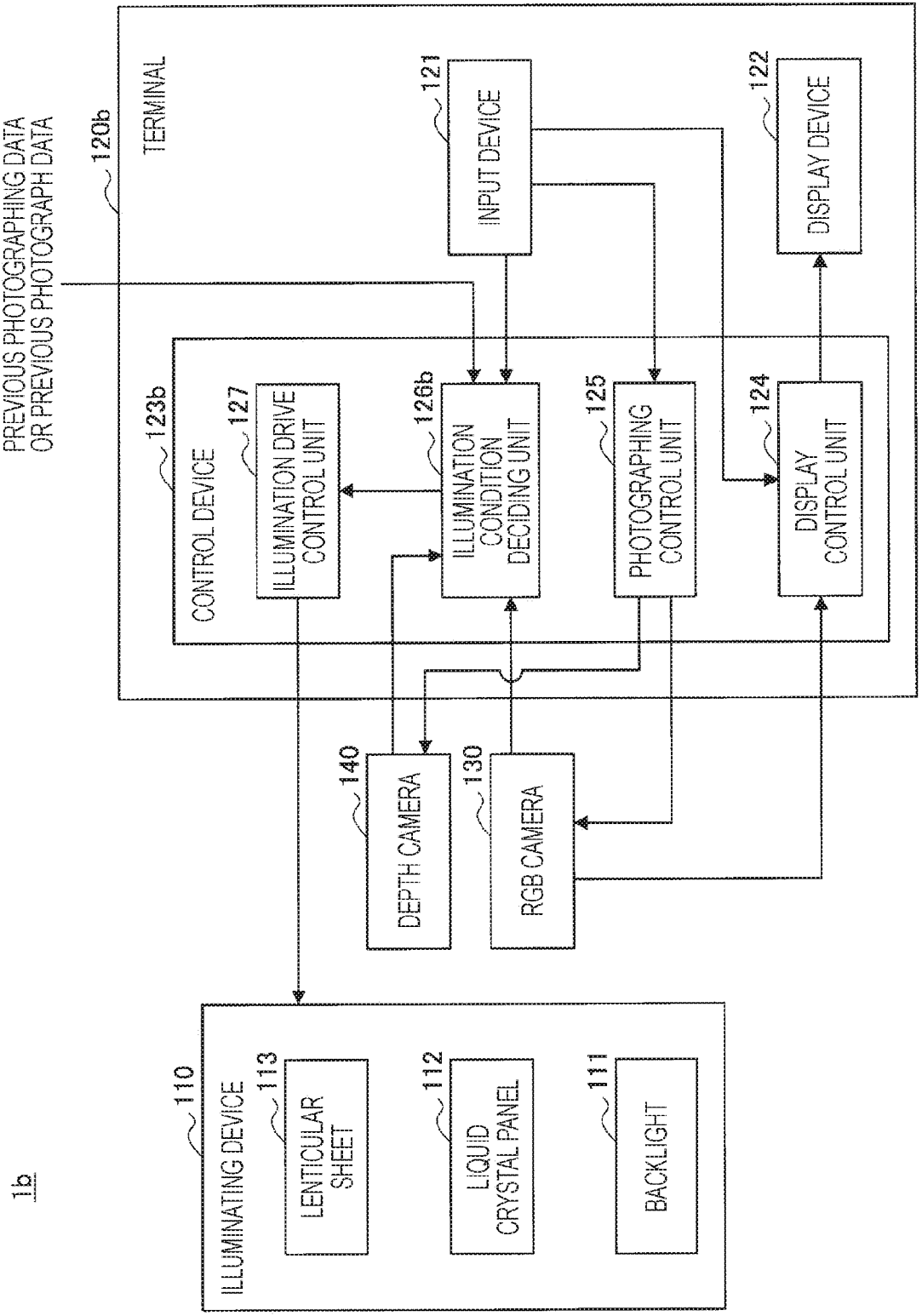
FIG. 19 is a block diagram illustrating an example of a functional configuration of an illumination system further including a depth camera according to a modified example of the first embodiment.

The illumination system according to the modified example further including such a depth camera will be described with reference to FIGS. 18 and 19. FIG. 18 is a diagram illustrating a schematic configuration of the illumination system further including a depth camera according to the modified example of the first embodiment. FIG. 19 is a block diagram illustrating an example of a functional configuration of the illumination system including a depth camera according to the modified example of the first embodiment.

Referring to FIGS. 18 and 19, an illumination system 1b according to the present modified example includes an illuminating device 110, a terminal 120b, an RGB camera 130, and a depth camera 140. Further, the terminal 120b includes an input device 121, a display device 122, and a control device 123b. Here, configurations and functions of the illuminating device 110, the RGB camera 130, and the input device 121 and the display device 122 of the terminal 120b are similar to those in the illumination system 1a operated in the automatic mode illustrated in FIG. 9, and thus detailed description thereof is omitted here.

Referring to FIG. 19, the control device 123b includes a display control unit 124, a photographing control unit 125, an illumination condition deciding unit 126b, and an illumination drive control unit 127 as its functions. These functions can be realized as the processor of the control device 123b executes arithmetic processing in accordance with a predetermined program. Here, since functions of the display control unit 124, the photographing control unit 125, and the illumination drive control unit 127 are similar to those in the illumination system 1a operated in the automatic mode illustrated in FIG. 9, detailed description thereof is omitted here.

As described above, the illumination system 1b corresponds to one in which the depth camera 140 is further installed, and the control device 123a of the terminal 120 is replaced with the control device 123b in the illumination system 1a. Further, a device configuration of the control device 123b is similar to the device configuration of the control device 123a, and the control device 123b corresponds to a device whose function is changed from the control device 123a.

The depth camera 140 is a camera having a function of acquiring depth data of the subject (that is, information for a distance of the subject from the depth camera 140). In the illumination system 1b, at the time of photographing, under control of the photographing control unit 125, the RGB data of the subject is acquired by the RGB camera 130, and the depth data of the subject is acquired by the depth camera 140.

In the illumination system 1b, in addition to the information for the illumination conditions and the RGB data of the subject, the depth data of the subject is included in the photographing data. In other words, the information for the illumination conditions, the RGB data of the subject, and the depth data of the subject when photographing is performed in the past are input to the control device 123b of the terminal 120 as the previous photographing data. Further, when the current RGB data of the subject is acquired, the depth data of the subject is also acquired.

The process of the illumination condition deciding unit 126b at the time of photographing using the previous photographing data or the previous photograph data is substantially similar to that of the illumination condition deciding unit 126a of the illumination system 1a described above. However, the illumination condition deciding unit 126b compares the previous RGB data of the subject with the current RGB data of the subject and further uses the depth data of the subject when changing the illumination conditions.

Specifically, the illumination condition deciding unit 126a calculates the brightness or the like for each pixel or for each predetermined region including a plurality of pixels from the RGB data, compares the value of the previous RGB data with the value of the current RGB data, and decides the illumination conditions so that the previous RGB data is reproduced. On the other hand, in the illumination system 1b, the previous photographing data includes the depth data of the subject, and depth data of the current subject is also acquired. Therefore, the illumination condition deciding unit 126b calculates the brightness or the like for each voxel or for each predetermined region including a plurality of voxels from the RGB data and the depth data for those with the depth data, compares the value of the previous RGB data with the value of the current RGB data, and decides the illumination conditions so that the previous RGB data is reproduced. As described above, according to the modified example, it is possible to analyze the emission conditions of the illumination light for each voxel (that is, in three-dimensionally) by using the depth data, and thus it is possible to decide the illumination conditions so that the previous RGB data can be reproduced with a high degree of accuracy. Further, a case where it is difficult to extract the depth data for the previous photograph data is also considered, but in that case, for the previous photograph data, similarly to the illumination condition deciding unit 126a, it is desirable to calculate the brightness or the like for each pixel or for each predetermined region including a plurality of pixels and use the values for a comparison.

2-4. Conclusion of First Embodiment

The first embodiment of the present disclosure has been described above. As described above, in the first embodiment, the illumination systems 1, 1a, and 1b are constructed using the illuminating device 110 as an illuminating device used at the time of photographing. In the illuminating device 110, it is possible to control the emission state of the illumination light to the subject in detail, for example, it is possible to make only a part of the face become brighter than the other parts, and it is possible to emit an illumination light having a color different from colors of the other parts to only a part of the face, and thus according to the illumination systems 1, 1a, and 1b, it is possible to take high-quality photographs equivalent to photographs taken in a dedicated photo studio even in a general living environment. Therefore, the convenience of the user can be improved.

Further, in the first embodiment, either the manual mode or the automatic mode can be appropriately selected as the method of deciding the illumination conditions. In the manual mode, it is possible to control the driving of the illuminating device 110 with a higher degree of freedom since the user can freely decide the illumination conditions. Further, in the automatic mode, the illumination conditions are automatically decided so that a state of illumination in predetermined information is reproduced (specifically, the photographing data when a satisfactory photograph has been taken in the past or satisfactory photograph data obtained in the past). Therefore, it is possible to drive the illuminating device 110 so that a desired illumination light can be realized without performing complicated manipulations by the user. As described above, the convenience of the user at the time of photographing can be further improved by appropriately selecting the manual mode and the automatic mode.

3. Second Embodiment

3-1. Overview of Second Embodiment

A second embodiment of the present disclosure is described. In the second embodiment, the illuminating device 110 is used as an illumination of a mirror.

According to the illuminating device 110, since it is possible to control the illumination light in detail as described above, the user can visually recognize the appearance of the user on a mirror surface more clearly by appropriately adjusting the illumination light using the illuminating device 110 as the illumination of the mirror. Therefore, it is possible to improve the convenience of the user when checking his/her appearance with a mirror, for example, in a case where the user does make-up while looking at the mirror or in a case where the user checks clothes with a full-length mirror.

A configuration and functions of the illumination system according to the second embodiment will be described in detail below. Here, in the illumination system according to the second embodiment, similarly to the first embodiment, there may be a manual mode and an automatic mode as the method of deciding the illumination conditions in the illuminating device 110. A configuration and functions of the illumination system in each of these modes will be described in order below.

3-2. Manual Mode

First, a configuration and functions of the illumination system in the manual mode will be described.

3-2-1. Configuration of Illumination System

Figure 20:
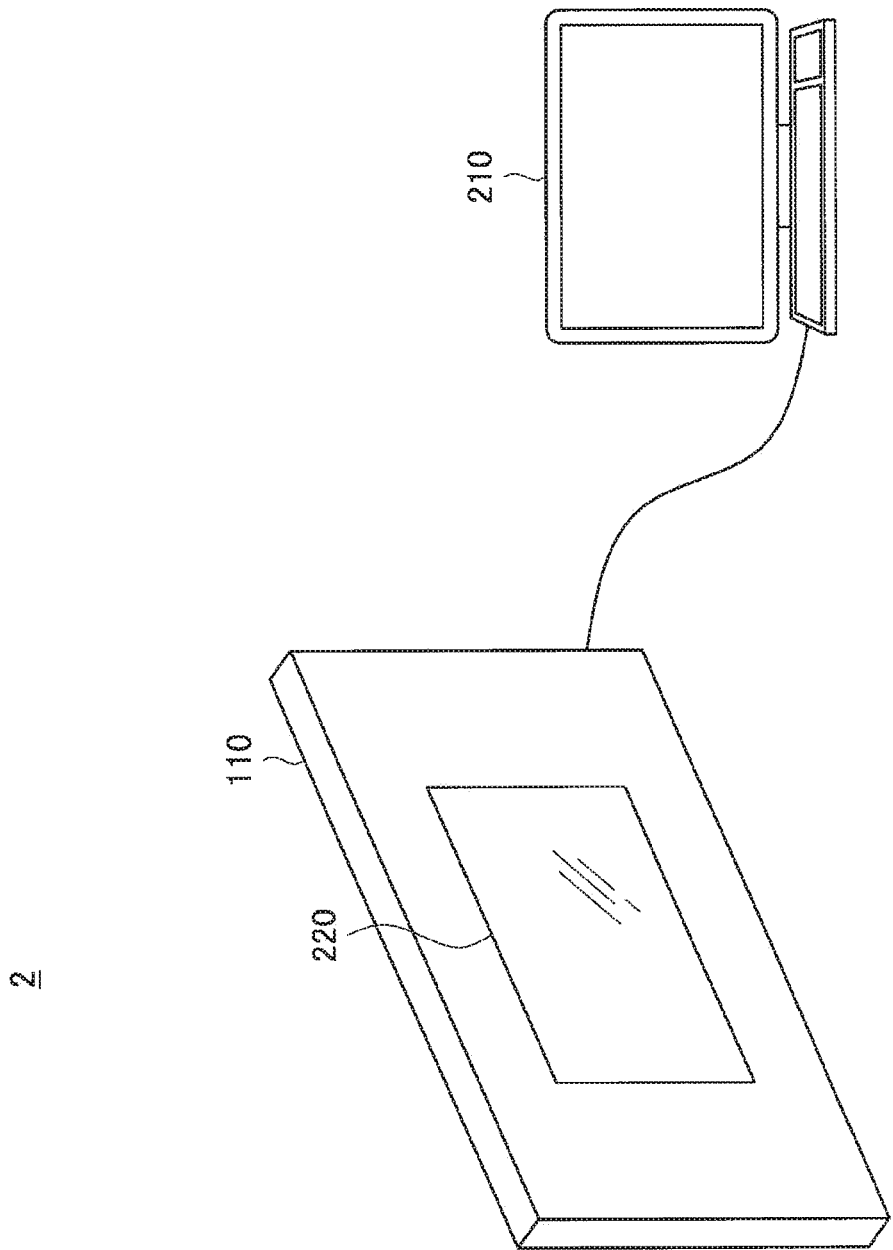
FIG. 20 is a diagram illustrating a schematic configuration of an illumination system operated in a manual mode according to a second embodiment.

FIG. 20 is a diagram illustrating a schematic configuration of the illumination system operated in the manual mode according to the second embodiment. Referring to FIG. 20, an illumination system 2 operated in the manual mode according to the second embodiment includes an illuminating device 110, a terminal 210, and a mirror 220. Further, a configuration and functions of the illuminating device 110 are similar to those of the illuminating device 110 in the first embodiment, and thus detailed description thereof is omitted here.

The terminal 210 is an information processing device that manages an operation of the illumination system 2 in an integrated manner. Although simplified and illustrated in FIG. 20, the terminal 210 includes at least an input device, a display device, and a control device. Here, a configuration of the terminal 210 is similar to that of the terminal 120 according to the first embodiment described above with reference to FIGS. 4 and 7 except that functions of the control device are different. Therefore, detailed description of the terminal 210 for the same matters as the terminal 120 will be omitted here. Further, the functions of the control device of the terminal 210 will be described later with reference to FIG. 23.

The mirror 220 may be similar to a mirror generally used at home. In the illustrated example, the mirror 220 is installed at substantially the center of the illumination surface of the illumination light of the illuminating device 110 so that the mirror surface is parallel to the emission surface and faces in an emission direction of the illumination light. As the mirror 220 is installed at such a position, the user can check his/her appearance shown in the mirror 220 in a state in which the illumination light is emitted in front of the user and can visually recognize the appearance of the user clearly. However, the installation position of the mirror 220 is not limited to the illustrated example, and the installation position of the mirror 220 may be arbitrary as long as the mirror 220 is installed so that the mirror surface faces the emission range of the illumination light by the illuminating device 110.

Figure 21:
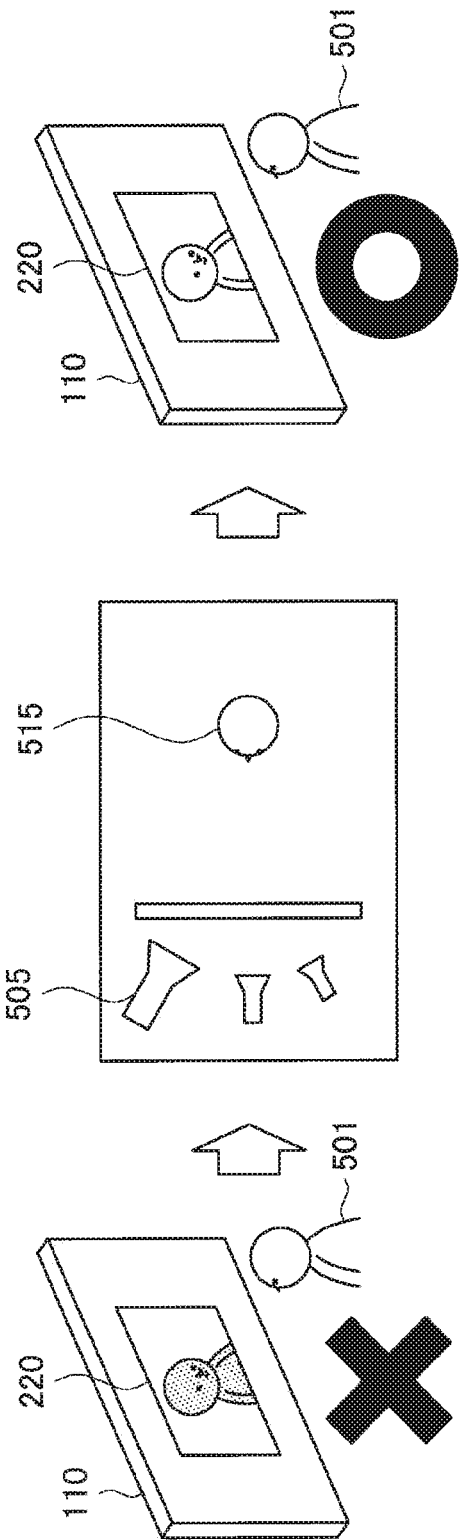
FIG. 21 is a diagram for describing an operation of an illumination system 2 in a manual mode when operated as illumination of a mirror.

3-2-2. Overview of Operation of Illumination System in Illumination of Mirror An overview of an operation of the illumination system 2 described above will be described with reference to FIG. 21. FIG. 21 is a diagram for describing an operation of the illumination system 2 in the manual mode when operating as an illumination of a mirror.

First, in the illumination system 2, in a case where the illuminating device 110 is not operating, the appearance of the user 501 shown in the mirror 220 is dark and not clear (a left diagram in FIG. 21). In this regard, in the illumination system 2, the user 501 can arrange the virtual illuminating instrument using the terminal 210. In the illumination system 2, similarly to the first embodiment, a GUI for arranging the virtual illuminating instrument can be provided. Specifically, as the GUI, an icon 515 indicating the user 501 and an icon 505 indicating the virtual illuminating instrument are displayed on a screen of the display device of the terminal 210 (a middle diagram in FIG. 21). The user 501 can adjust a type of an icon 505 indicating the virtual illuminating instrument, the number of icons 505, a position of the icon 505, and a direction of the icon 505 with respect to the icon 515 indicating the user in accordance with a manipulation performed by an input device of the terminal 210.

If the arrangement of the virtual illuminating instrument is determined, the control device of the terminal 210 drives the illuminating device 110 so that the illumination light by the determined virtual illuminating instrument is reproduced. As the process is executed, the user 501 can confirm his/her own appearance with the mirror 220 while receiving the illumination light by the illuminating device 110 that reproduces the virtual illuminating instrument (a right diagram in FIG. 21).

Figure 22:
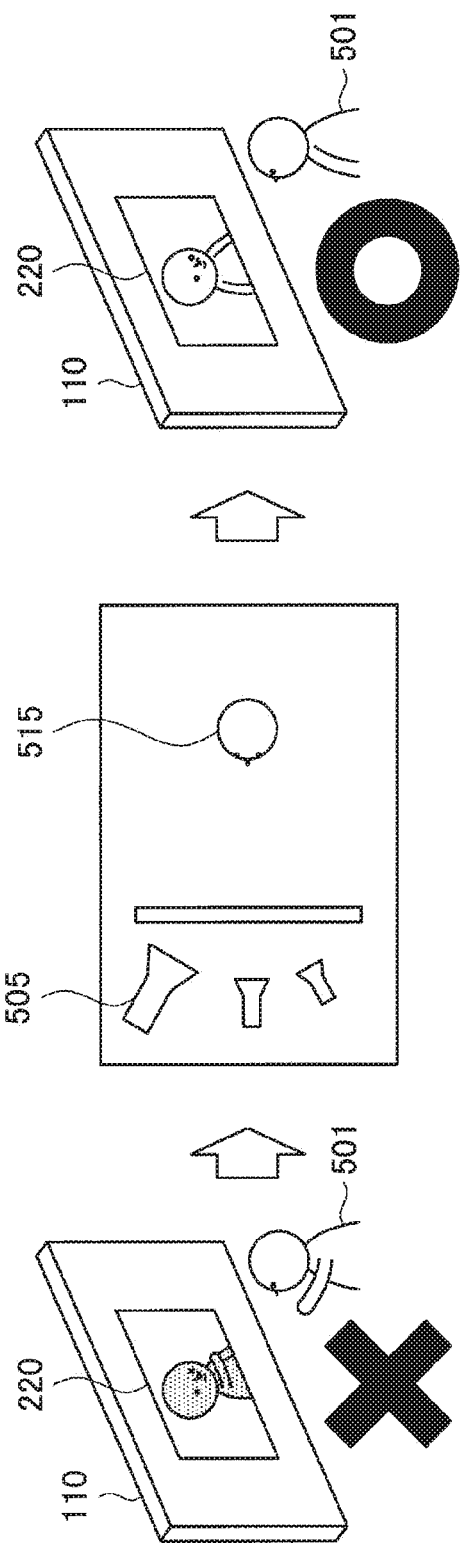
FIG. 22 is a diagram for describing a method of arranging virtual illuminating instruments in accordance with a gesture.

Further, the method of arranging the virtual illuminating instrument is not limited to the method using the GUI, but the virtual illuminating instrument may be arranged by other methods such as, for example, a gesture or a voice. FIG. 22 is a diagram for describing the method of arranging the virtual illuminating instruments by gesture as an example of another method. In this method, as illustrated in FIG. 22, the user 501 may adjust a type of virtual illuminating instrument, the number of virtual illuminating instruments, a position of the illuminating instrument, and a direction of the virtual illuminating instrument by performing a predetermined action (an action of shaking an arm in the illustrated example). In FIG. 22, in order to indicate that the arrangement of the virtual illuminating instrument is changed by gesture, for convenience of description, the screen related to the GUI similar to FIG. 20 is illustrated, but the screen may not be displayed on the display device of the terminal 210 in a case where the virtual illuminating instrument is arranged by gesture.

Further, the virtual illuminating instrument may be arranged by a combination of a gesture and a voice. For example, the following method is assumed. A virtual spotlight appears above the emission surface of the illuminating device 110 (that is, above the mirror 220) in response to a voice command such as "add spotlight." In this state, when a gesture of waving the hand is performed, the position of the virtual spotlight in the illuminated surface of the illuminating device 110 is moved. Thereafter, the position of the virtual spotlight is determined by a voice audio command such as "OK."

3-2-3. Functional Configuration of Illumination System

Figure 23:
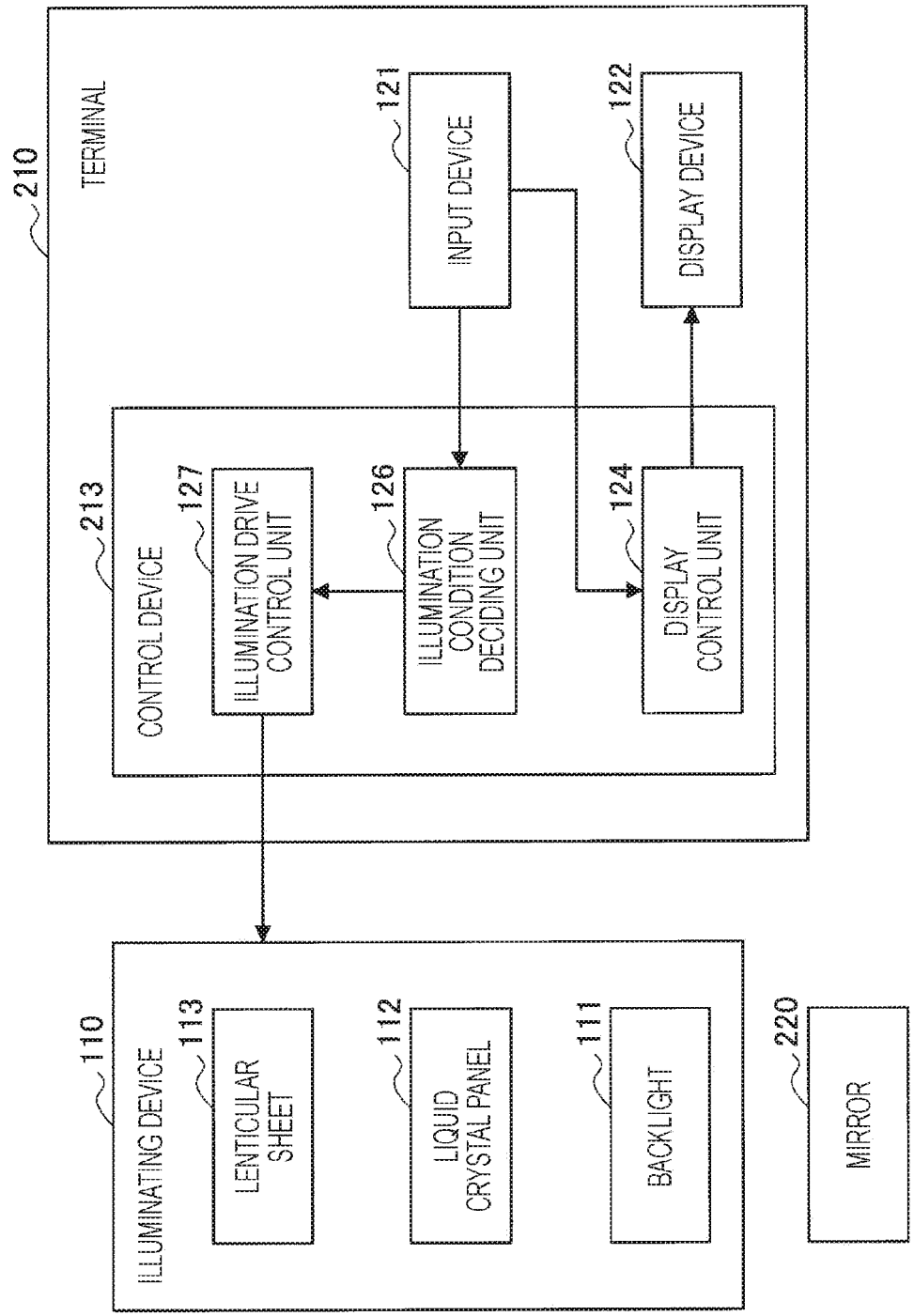
FIG. 23 is a block diagram illustrating an example of a functional configuration of an illumination system operated in a manual mode according to the second embodiment.

A functional configuration of the illumination system 2 that realizes the operation when used as the illumination of the mirror described above will be described. FIG. 23 is a block diagram illustrating an example of a functional configuration of the illumination system 2 operated in the manual mode according to the second embodiment.

Referring to FIG. 23, as described above, the illumination system 2 operated in the manual mode according to the second embodiment includes an illuminating device 110, a terminal 210, and a mirror 220. Further, the terminal 210 has an input device 121, a display device 122, and a control device 213. Here, configurations and functions of the illuminating device 110, the input device 121, and the display device 122 are similar to those in the illumination system 1 operated in the manual mode according to the first embodiment described above, and thus detailed description thereof is omitted. Further, since the configuration and function of the mirror 220 have already been described, detailed description thereof is omitted here.

Referring to FIG. 23, the control device 213 of the terminal 210 includes a display control unit 124, an illumination condition deciding unit 126, and an illumination drive control unit 127 as its functions. The control device 213 has a device configuration similar to that of the control device 123 according to the first embodiment, and functions thereof can be realized as the processor of the control device 213 executes arithmetic processing in accordance with a predetermined program.

The functions of the display control unit 124, the illumination condition deciding unit 126, and the illumination drive control unit 127 are substantially similar to the functions of the control device 123 in the illumination system 1 operated in manual mode according to the first embodiment illustrated in FIG. 7. Specifically, the display control unit 124 controls the operation of the display device 122 such that the display screen related to the GUI when the virtual illuminating instrument is arranged is displayed on the display device 122. At this time, the display control unit 124 controls display such as movement of a GUI component (such as an icon) on the display screen together in response to a manipulation of the user input via the input device 121. Further, the illumination condition deciding unit 126 decides the illumination conditions so that the illumination light by the arrangement of the virtual illuminating instrument is realized on the basis of the information about the arrangement of the virtual illuminating instrument input by the user via the input device 121. Further, the illumination drive control unit 127 drives the illuminating device 110 in accordance with the illumination conditions decided by the illumination condition deciding unit 126.

As described above, the functional configuration of the illumination system 2 corresponds to one in which, in the illumination system 1, the function of the mirror 220 is added, and the function of the RGB camera 130 and the function related to the RGB camera 130 are removed.

3-2-4. Processing Procedure of Control Method of Illumination System

Figure 24:
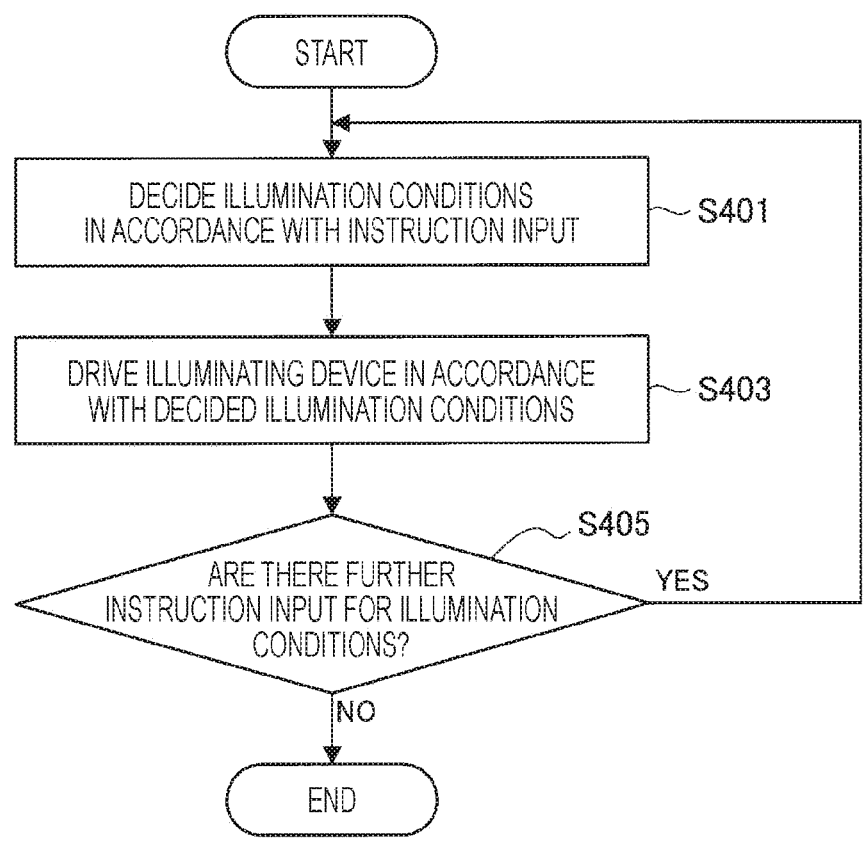
FIG. 24 is a flowchart illustrating an example of a processing procedure of a control method in a manual mode of an illumination system in accordance with the second embodiment.

A processing procedure of a control method of the illumination system 2 executed by the control device 213 described above will be described. FIG. 24 is a flowchart illustrating an example of a processing procedure of a control method in the manual mode of the illumination system 2 according to the second embodiment. Further, each process illustrated in FIG. 24 corresponds to each process executed by the control device 213 illustrated in FIG. 23. Each process illustrated in FIG. 24 is executed as the processor constituting the control device 213 operates in accordance with a predetermined program. The details of each process illustrated in FIG. 24 have already been described above when describing the functions of the control device 213, and therefore, in description of each process illustrated in FIG. 24 below, an overview of each process will be described, and detailed description thereof will be omitted.

Referring to FIG. 24, in the control method in the manual mode of the illumination system 2 according to the second embodiment, first, the illumination conditions are decided in accordance with an instruction input from the user via the input device 121 (an instruction input to arrange the virtual illuminating instrument) (step S401). The process of step S401 corresponds to the process performed by the illumination condition deciding unit 126 illustrated in FIG. 23.

Then, the illuminating device 110 is driven in accordance with the decided illumination conditions (step S403). The process of step S403 corresponds to the process performed by the illumination drive control unit 127 illustrated in FIG. 23.

Then, it is determined whether or not there is a further instruction input for the illumination conditions (step S405). The process of step S405 corresponds to the process performed by the illumination condition deciding unit 126 illustrated in FIG. 23.

In a case where there is a further instruction input for the illumination conditions in step S405, the process returns to step S401, and the illumination condition deciding unit 126 decides the illumination conditions in accordance with the further instruction input. Then, the process of step S403 and subsequent steps is executed again.

In a case where there is no further instruction input for the illumination conditions in step S405, a series of processes ends.

3-3. Automatic Mode

Next, a configuration and functions of the illumination system in the automatic mode will be described.

3-3-1. Configuration of Illumination System

Figure 25:
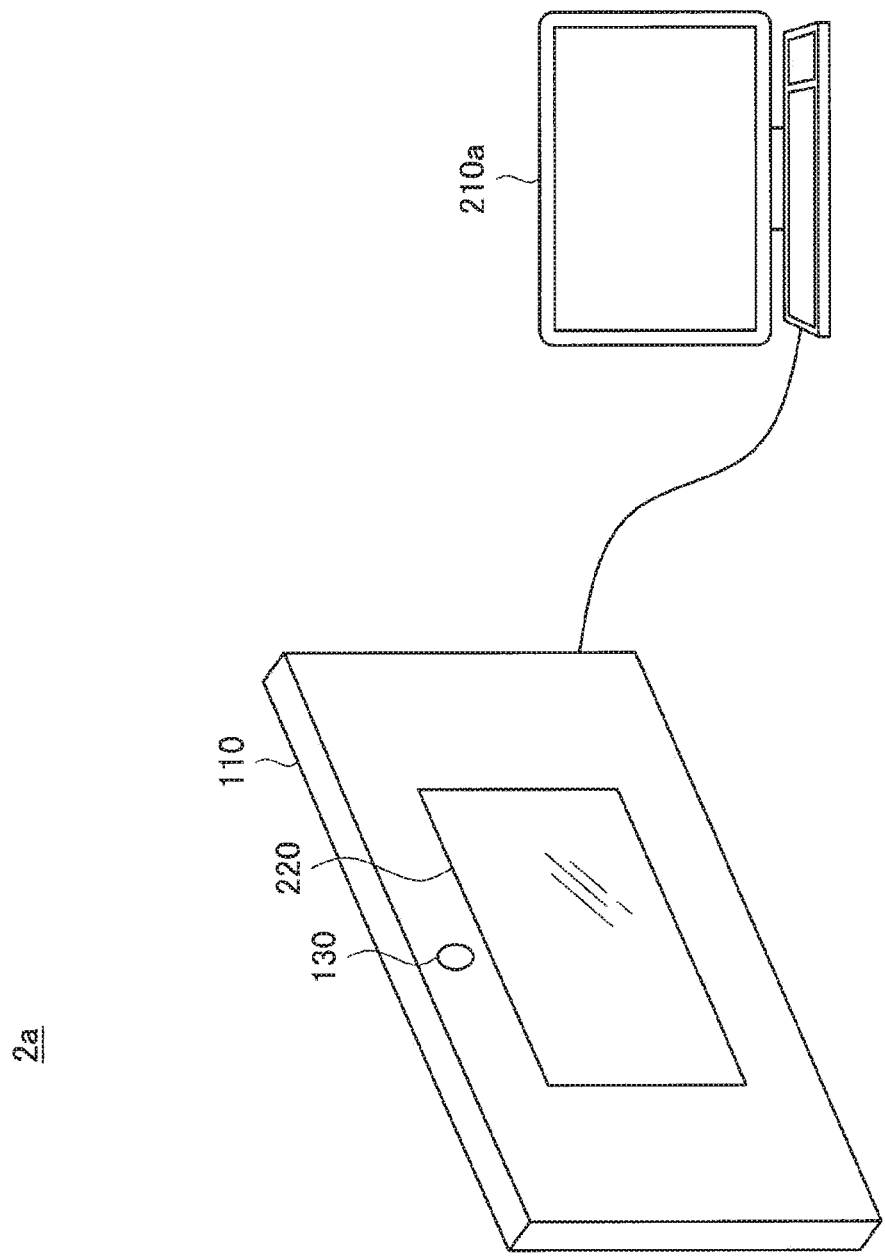
FIG. 25 is a diagram illustrating a schematic configuration of an illumination system operated in an automatic mode according to the second embodiment.

FIG. 25 is a diagram illustrating a schematic configuration of the illumination system operated in the automatic mode according to the second embodiment. Referring to FIG. 25, an illumination system 2a operated in the automatic mode according to the second embodiment includes an illuminating device 110, an RGB camera 130, a terminal 210a, and a mirror 220. As described above, the illumination system 2a corresponds to one in which, in the illumination system 2 operated in the manual mode according to the second embodiment described above with reference to FIG. 20, the RGB camera 130 is further installed, and the terminal 210 is replaced with the terminal 210a. Further, a configuration and functions of the terminal 210a will be described later with reference to FIG. 26.

A configuration and functions of the RGB camera 130 are similar to those of the RGB camera 130 in the first embodiment. Specifically, the RGB camera 130 is arranged at a position at which the emission range of the illumination light by the illuminating device 110 can be photographed, and the user who is irradiated with the illumination light by the illuminating device 110 is photographed, and the image data (the RGB data) is acquired. The RGB data acquired by the RGB camera 130 is used when automatically deciding the illumination conditions. However, in the first embodiment, the through image acquired by the RGB camera 130 may be displayed on the display device of the terminals 120, 120a, and 120b, but in the second embodiment, the through image may not be displayed on the display device of the terminal 210a. In the first embodiment, the user can confirm the illumination effects by the through image and adjust the illumination conditions, but in the second embodiment, the user can confirm the illumination effects by the mirror 220 and adjust the illumination conditions, and thus it is unnecessary to display the through image.

3-3-2. Functional Configuration of Illumination System

Figure 26:
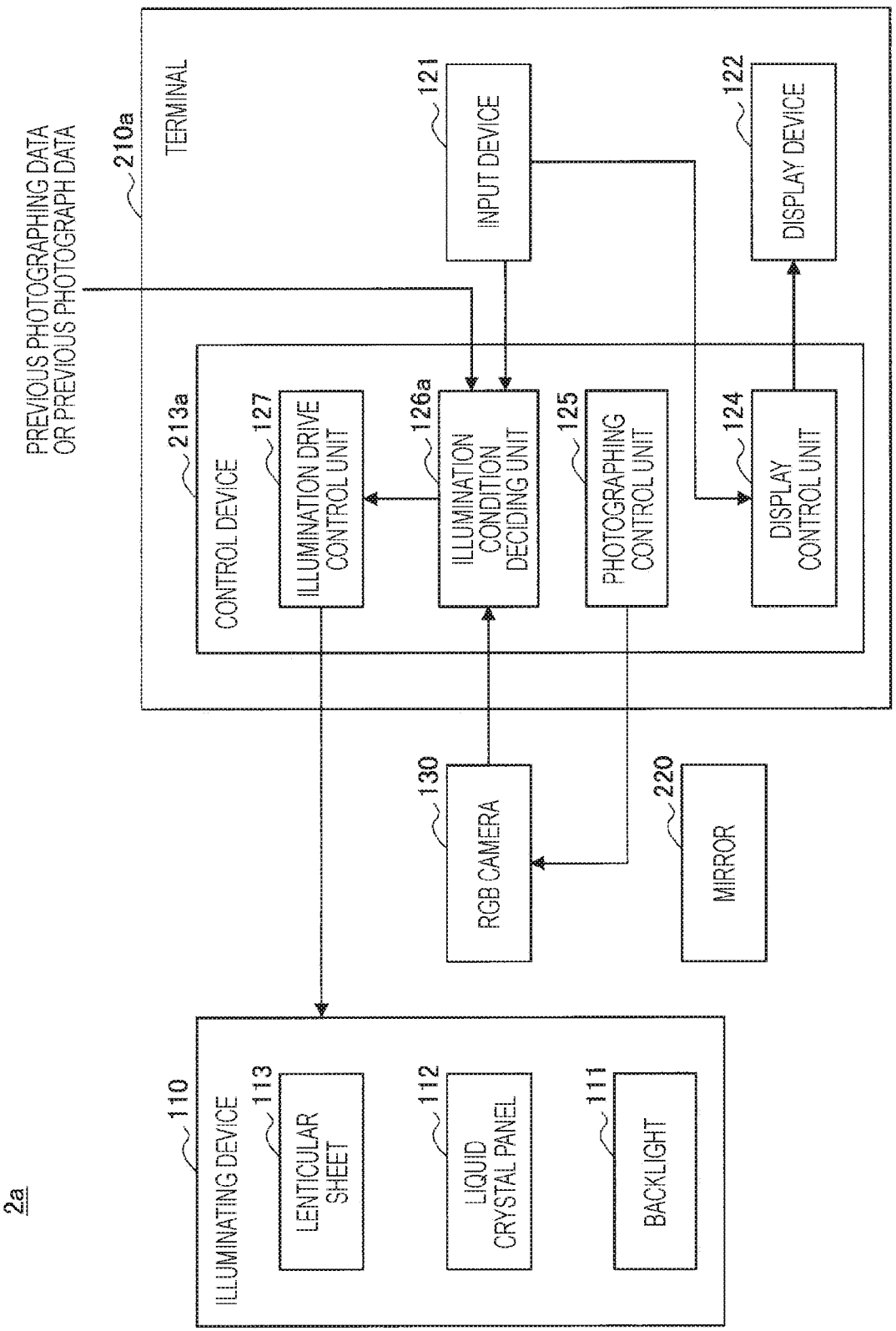
FIG. 26 is a block diagram illustrating an example of a functional configuration of an illumination system operated in an automatic mode according to the second embodiment.

A functional configuration of the illumination system 2a will be described with reference to FIG. 26. FIG. 26 is a block diagram illustrating an example of a functional configuration of the illumination system 2a operated in the automatic mode according to the second embodiment.

Referring to FIG. 26, as described above, the illumination system 2a operated in the automatic mode according to the second embodiment includes an illuminating device 110, an RGB camera 130, a terminal 210a, and a mirror 220. Further, the terminal 210a includes an input device 121, a display device 122, and a control device 213a. Here, configurations and functions of the illuminating device 110, the mirror 220, and the input device 121 and the display device 122 of the terminal 210a are similar to those in the illumination system 2 operated in the manual mode illustrated in FIG. 23, and thus detailed description thereof is omitted. As described above, the illumination system 2a corresponds to one in which in which, in the illumination system 2, the RGB camera 130 is added, and the control device 213 of the terminal 210 is replaced with the control device 213a. Further, a device configuration of the control device 213a is similar to the device configuration of the control device 213, and the control device 213a corresponds to one whose function is changed from the control device 213.

Referring to FIG. 26, the control device 213a includes, as its functions, a display control unit 124, a photographing control unit 125, an illumination condition deciding unit 126a, and an illumination drive control unit 127. These functions can be realized as the processor of the control device 213a executes arithmetic processing in accordance with a predetermined program. Here, the functions of the display control unit 124, the photographing control unit 125, illumination condition deciding unit 126a, and the illumination drive control unit 127 are substantially similar to those in the illumination system 1a operated in the automatic mode according to the first embodiment described with reference to FIG. 9. However, in the second embodiment, the display control unit 124 does not perform control for displaying the through image. Further, in the second embodiment, the photographing control unit 125 does not perform control of still image capturing according to the instruction input of the user. As described above, the control device 213a executes a process similar to that of the control device 123a of the illumination system 1a except that the through image is not displayed, and the RGB camera 130 does not performing final still image capturing in a state in which the illumination conditions are decided.

Specifically, in the automatic mode, the previous photographing data or the previous photograph data is input to the control device 213a. In a case where the previous photographing data is input, the following process is executed in the control device 213a, and the illumination conditions are automatically decided. First, the illumination condition deciding unit 126a decides the illumination conditions included in the previous photographing data as the illumination conditions for performing photographing from now on. Then, the illumination drive control unit 127 drives the illuminating device 110 in accordance with the decided illumination conditions. Then, in this state, the photographing control unit 125 captures the image of the user who is irradiated with the illumination light by the RGB camera 130 (that is, acquires the RGB data of the user). Then, the illumination condition deciding unit 126a compares the current RGB data with the previous RGB data included in the previous photographing data and changes the illumination conditions so that the previous RGB data is reproduced. A specific method of comparing the current RGB data with the previous RGB data is similar to that of the first embodiment. Then, the illumination drive control unit 127 drives the illuminating device 110 in accordance with the changed illumination conditions.

On the other hand, in a case where the previous photograph data is input, the following process is executed in the control device 213a, and the illumination conditions are automatically decided. First, the illumination condition deciding unit 126a decides predetermined illumination conditions as an illumination conditions for performing photographing from now on. Then, the illumination drive control unit 127 drives the illuminating device 110 in accordance with the decided illumination conditions. Then, in this state, the photographing control unit 125 captures an image of the user who is irradiated with the illumination light by the RGB camera 130 (that is, acquires the RGB data of the user). Then, the illumination condition deciding unit 126a compares the current RGB data with the RGB data extracted from the previous photograph data and changes the illumination conditions so that the previous RGB data is reproduced. A specific method of comparing the current RGB data with the previous RGB data is similar to that of the first embodiment. Then, the illumination drive control unit 127 drives the illuminating device 110 in accordance with the changed illumination conditions.

Further, similarly to the first embodiment, as described above, in a case where the illumination conditions are automatically decided on the basis of the previous photographing data or the previous photograph data, the user can adjust the illumination conditions in accordance with the instruction input via the input device 121 if necessary.

Further, the method of acquiring the previous photographing data and the previous photograph data may be similar to that of the first embodiment. In other words, as the previous photographing data, the photographing data acquired by the user in the past may be stored in the DB, or the photographing data of another user may be acquired via social media or the like. Further, the previous photograph data may be photograph data acquired by the user in the past or may be photograph data of another user published in a magazine or on the Internet, for example.

Further, as described above, the processing procedure of the control method of the illumination system 2a executed by the control device 213a is similar to the processing procedure of the control method of the illumination system 1a executed by the control device 123a described with reference to FIGS. 16 and 17 except that the through image is not displayed, and the RGB camera 130 does not performing final still image capturing in a state in which the illumination conditions are decided. Therefore, detailed description of the processing procedure of the control method of the illumination system 2a executed by the control device 213a is omitted here.

3-3-3. Modified Example

A modified example of the illumination system 2a operated in the automatic mode according to the second embodiment described above will be described. The illumination system 2a described above includes an illuminating device 110, an RGB camera 130, a terminal 210a, and a mirror 220. However, the second embodiment is not limited to such an example, and the illumination system 2a may further include a depth camera in addition to this configuration.

Figure 27:
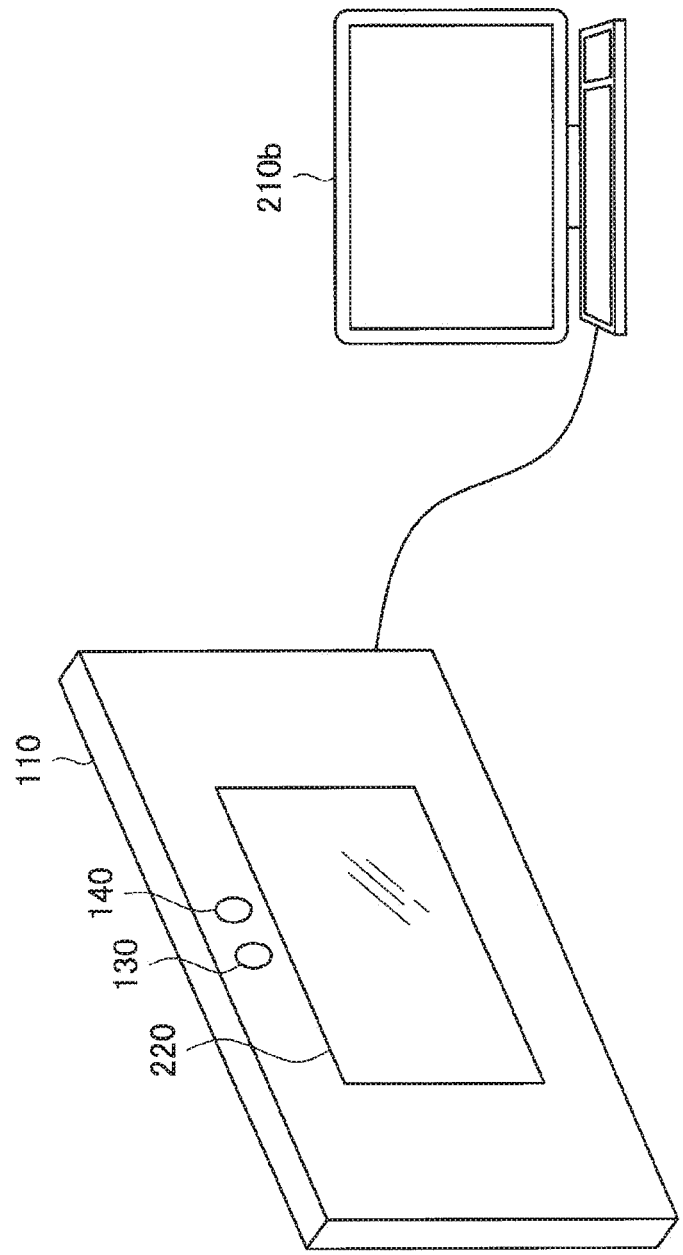
FIG. 27 is a diagram illustrating a schematic configuration of an illumination system further including a depth camera according to a modified example of the second embodiment.
Figure 28:
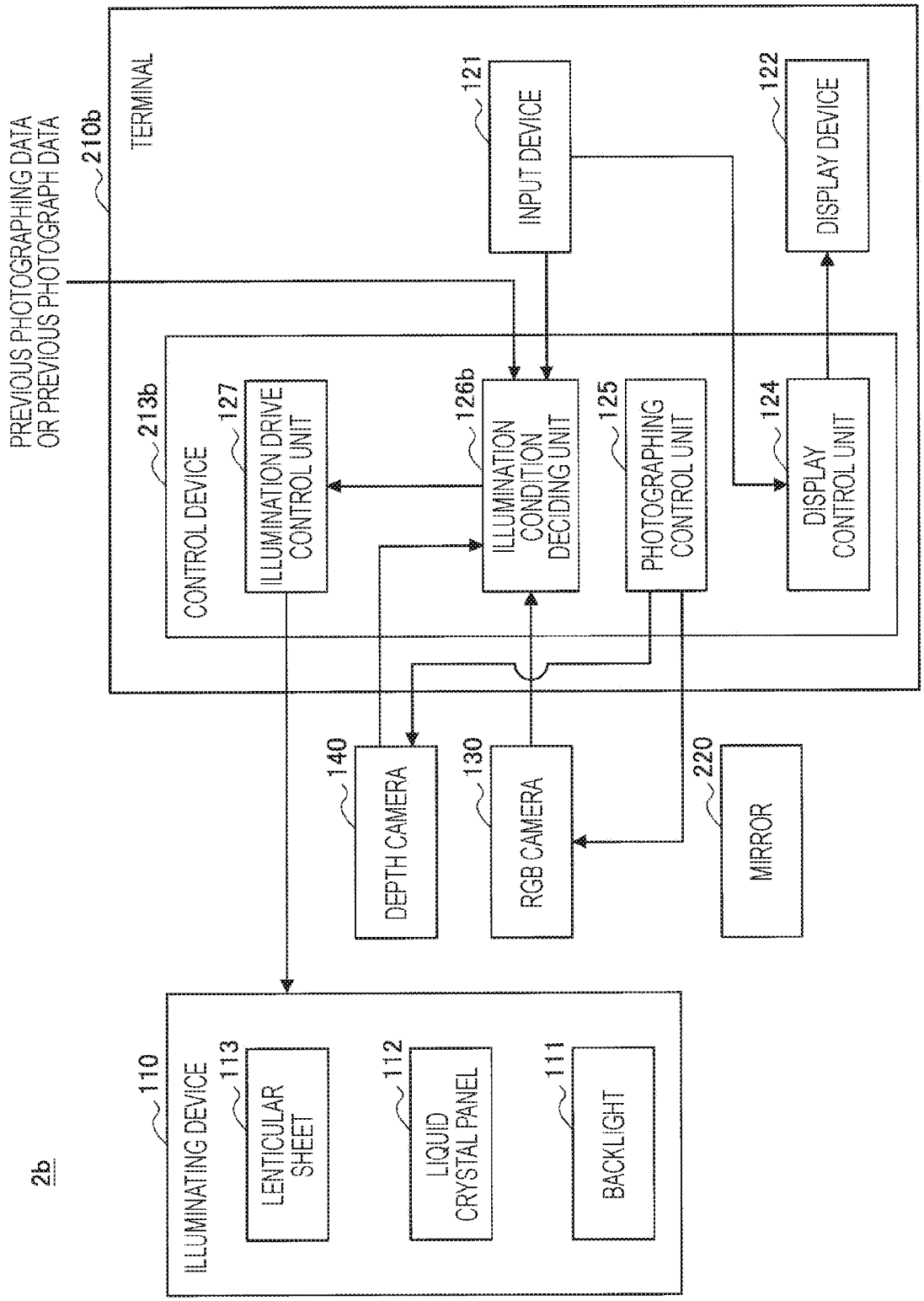
FIG. 28 is a block diagram illustrating an example of a functional configuration of an illumination system further including a depth camera according to a modified example of the second embodiment.

The illumination system according to the modified example further including such a depth camera will be described with reference to FIGS. 27 and 28. FIG. 27 is a diagram illustrating a schematic configuration of the illumination system further including a depth camera according to the modified example of the second embodiment. FIG. 28 is a block diagram illustrating an example of a functional configuration of the illumination system including a depth camera according to the modified example of the second embodiment.

Referring to FIGS. 27 and 28, an illumination system 2b according to the present modified example includes an illuminating device 110, a terminal 210b, an RGB camera 130, and a depth camera 140. Further, the terminal 210b includes an input device 121, a display device 122, and a control device 213b. Here, configurations and functions of the illuminating device 110, the RGB camera 130, and the input device 121 and the display device 122 of the terminal 210a are similar to those in the illumination system 2a operated in the automatic mode illustrated in FIGS. 25 and 26, and thus detailed description thereof is omitted here. Thus, the illumination system 2b corresponds to one in which, in the illumination system 2a, the depth camera 140 is added, and the control device 213a of the terminal 210a is replaced with the control device 213b. Further, a device configuration of the control device 213b is similar to the device configuration of the control device 213a, and the control device 213b corresponds to one whose function is changed from the control device 213a.

A configuration and functions of the depth camera 140 are similar to the configuration and functions of the depth camera 140 in the first embodiment. Specifically, the depth camera 140 is installed at a position at which the emission range of the illumination light by the illuminating device 110 can be photographed, and photographs the user who is irradiated with the illumination light by the illuminating device 110 and acquires the depth data under the control of the photographing control unit 125 of the control device 213b to be described later. The depth data acquired by the depth camera 140 is used when automatically deciding the illumination conditions.

Referring to FIG. 28, the control device 213b includes a display control unit 124, a photographing control unit 125, an illumination condition deciding unit 126b, and an illumination drive control unit 127 as its functions. These functions can be realized as the processor of the control device 213b executes arithmetic processing in accordance with a predetermined program. Here, the functions of the display control unit 124, the photographing control unit 125, the illumination condition deciding unit 126b, and the illumination drive control unit 127 are substantially similar to those in the illumination system 1b operated in the automatic mode according to one modified example of the first embodiment described with reference to FIG. 19. However, in the control device 213b, the display control unit 124 does not perform control for displaying the through image. Further, in the control device 213b, the photographing control unit 125 does not perform control of still image capturing according to the instruction input of the user. As described above, the control device 213b executes a process similar to that of the control device 123b of the illumination system 1b except that the through image is not displayed, and the RGB camera 130 does not performing final still image capturing in a state in which the illumination conditions are decided.

Specifically, in the illumination system 2b, the illumination condition deciding unit 126b of control device 213b executes the process of automatically deciding the illumination conditions on the basis of the previous photographing data or the previous photograph data, similarly to the illumination condition deciding unit 126b of the illumination system 1b. At this time, the illumination condition deciding unit 126b compares the previous RGB data with the current RGB data, and decides the illumination conditions so that the previous RGB data is reproduced using the depth data in addition to the RGB data. As the depth data is used, it is possible to reproduce the illumination states in the previous photographing data or the previous photograph data with a high degree of accuracy.

3-4. Conclusion of Second Embodiment

The second embodiment of the present disclosure has been described above. As described above, in the second embodiment, the illumination systems 2, 2a and 2b are constructed using the illuminating device 110 as an illuminating device when the user checks himself/herself with the mirror. In the illuminating device 110, for example, it is possible to control the emission state of the illumination light to the subject in detail, for example, it is possible to make only a part of the face become brighter than the other parts, and it is possible to emit an illumination light having a color different from colors of the other parts to only a part of the face, and thus according to the illumination systems 2, 2a, and 2b, the user can check himself/herself with the mirror under desired illumination effects satisfying the purpose. Therefore, the convenience of the user can be improved.

Further, in the second embodiment, either the manual mode or the automatic mode can be appropriately selected as the method of deciding the illumination conditions. In the manual mode, it is possible to control the driving of the illuminating device 110 with a higher degree of freedom since the user can freely decide the illumination conditions. Further, in the automatic mode, the illumination conditions are automatically decided so that a state of illumination in predetermined information is reproduced (specifically, the photographing data when a satisfactory illumination state has been obtained in the past or satisfactory photograph data obtained in the past). Therefore, it is possible to drive the illuminating device 110 so that a desired illumination light can be realized without performing complicated manipulations by the user. As described above, the convenience of the user when the illuminating device 110 is used as the illumination of the mirror can be further improved by appropriately selecting the manual mode and the automatic mode.

4. Third Embodiment

4-1. Overview of Third Embodiment

A third embodiment of the present disclosure will be described. In the third embodiment, the illuminating device 110 is used as an illumination of a chamber.

As described above, according to the illuminating device 110, since it is possible to control the illumination light in detail, the illumination light is appropriately adjusted using the illuminating device 110 as the illumination of the chamber, and thus it is possible to obtain various illumination effects corresponding to a situation such as, for example, eating or watching television without exchanging the illuminating device 110 itself.

Figure 29:
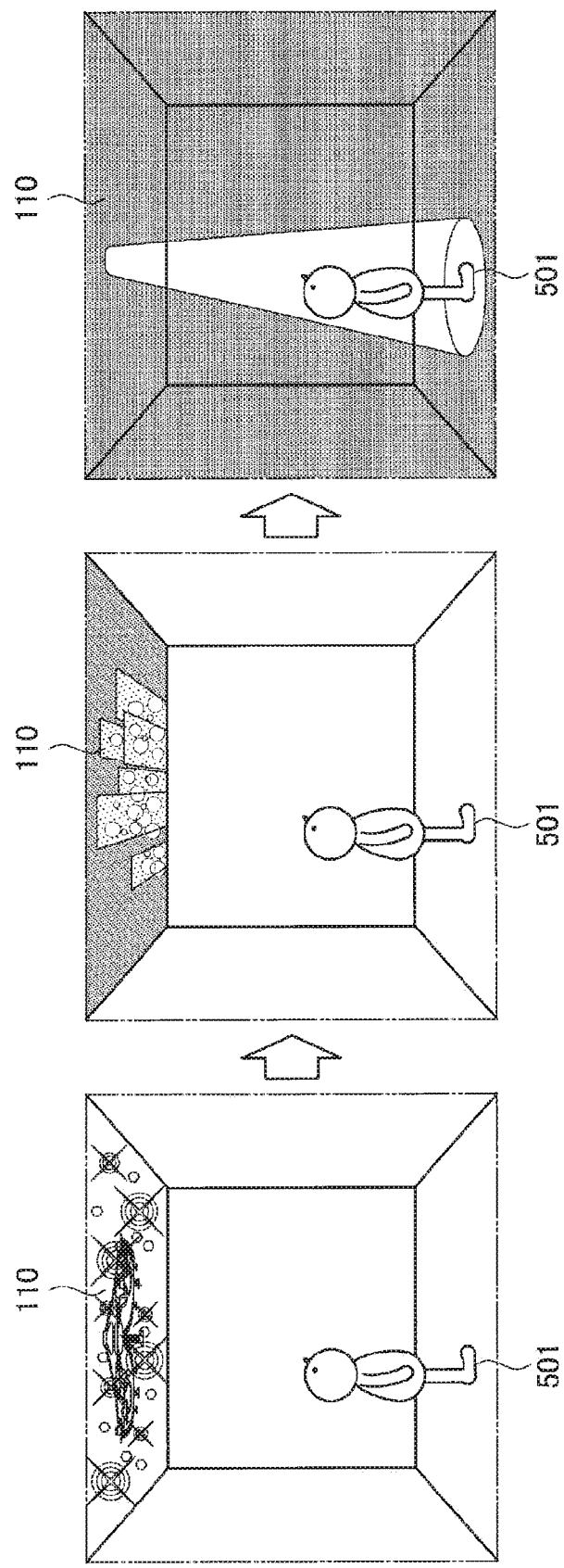
FIG. 29 is a diagram for describing an overview of an operation of an illuminating device in a third embodiment.

FIG. 29 is a diagram for describing an overview of an operation of the illuminating device 110 in the third embodiment. As illustrated in FIG. 29, in the third embodiment, it is assumed that the illuminating device 110 is installed on a ceiling of a room of the user 501. It is possible to reproduce, for example, an illumination simulating a chandelier (a left diagram of FIG. 29), an illumination simulating a night view (a middle diagram of FIG. 29), an illumination simulating a spotlight (a right diagram of FIG. 29), and the like by appropriately driving the illuminating device 110.

A configuration and functions of the illumination system according to the third embodiment will be described in detail below. Here, in the illumination system according to the third embodiment, there may be a manual mode and an automatic mode as the method of deciding the illumination conditions in the illuminating device 110, similarly to the first embodiment. The configuration and functions of the illumination system in these modes will be described in order below.

4-2. Manual Mode

First, a configuration and functions of the illumination system in the manual mode will be described.

4-2-1. Configuration of Illumination System

Figure 30:
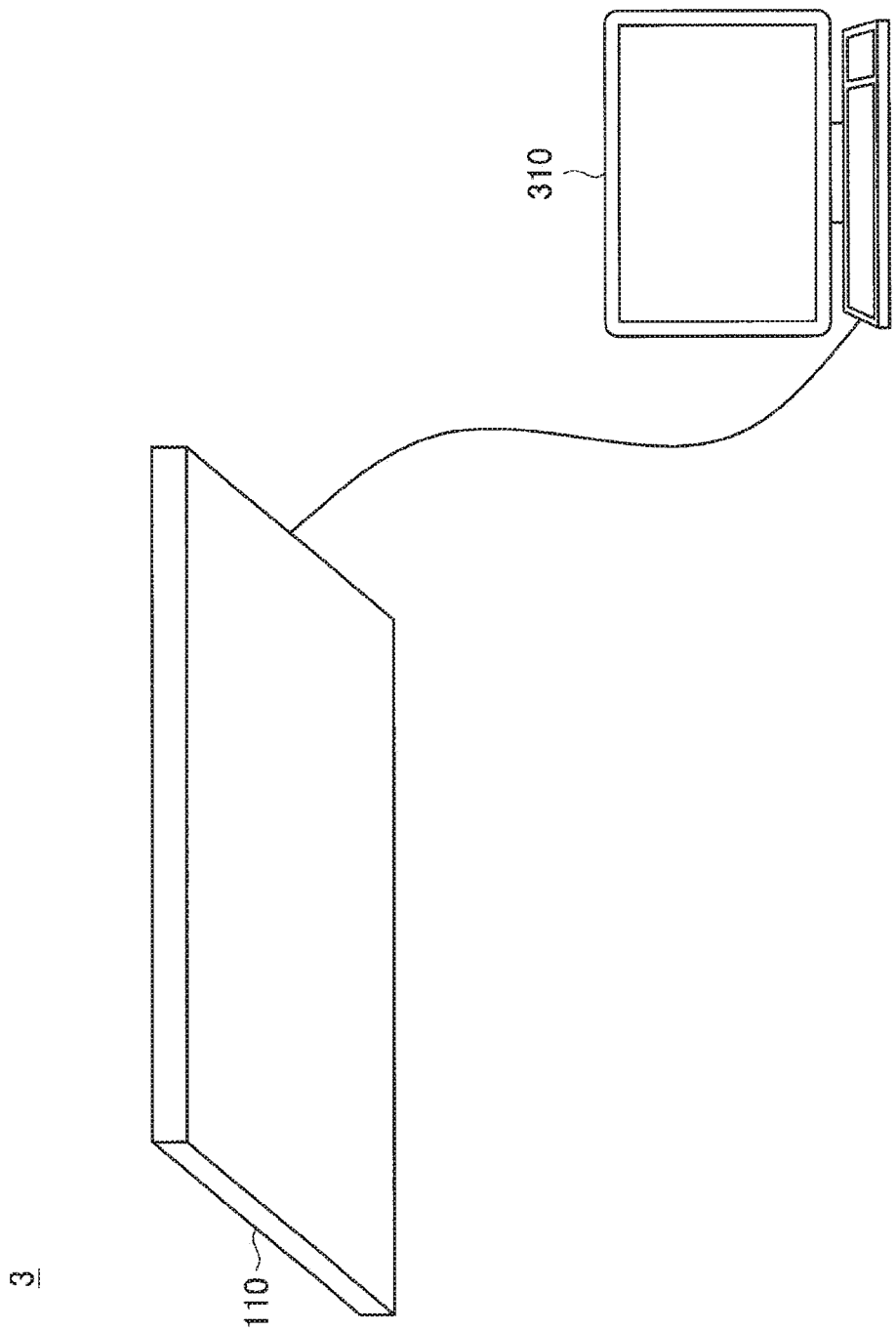
FIG. 30 is a diagram illustrating a schematic configuration of an illumination system operated in a manual mode according to a third embodiment.

FIG. 30 is a diagram illustrating a schematic configuration of an illumination system operated in the manual mode according to the third embodiment. Referring to FIG. 30, the illumination system 3 operated in the manual mode according to the third embodiment includes an illuminating device 110 and a terminal 310. In the third embodiment, as illustrated in FIG. 30, the illuminating device 110 is installed on a ceiling of a room of user so that the emission direction is a downward direction. Further, a configuration and functions of the illuminating device 110 are similar to those of the illuminating device 110 in the first embodiment, and thus detailed description thereof is omitted here.

The terminal 310 is an information processing device that manages an operation of the illumination system 3 in an integrated manner. Although simplified and illustrated in FIG. 30, the terminal 310 includes at least an input device, a display device and a control device. Here, a configuration of the terminal 310 is similar to that of the terminal 120 according to the first embodiment described above with reference to FIGS. 4 and 7 except that a function of the control device is different. Therefore, detailed description of the terminal 310 for the same matters as the terminal 120 will be omitted here. Further, the functions of the control device of the terminal 310 will be described later with reference to FIG. 33.

Figure 31:
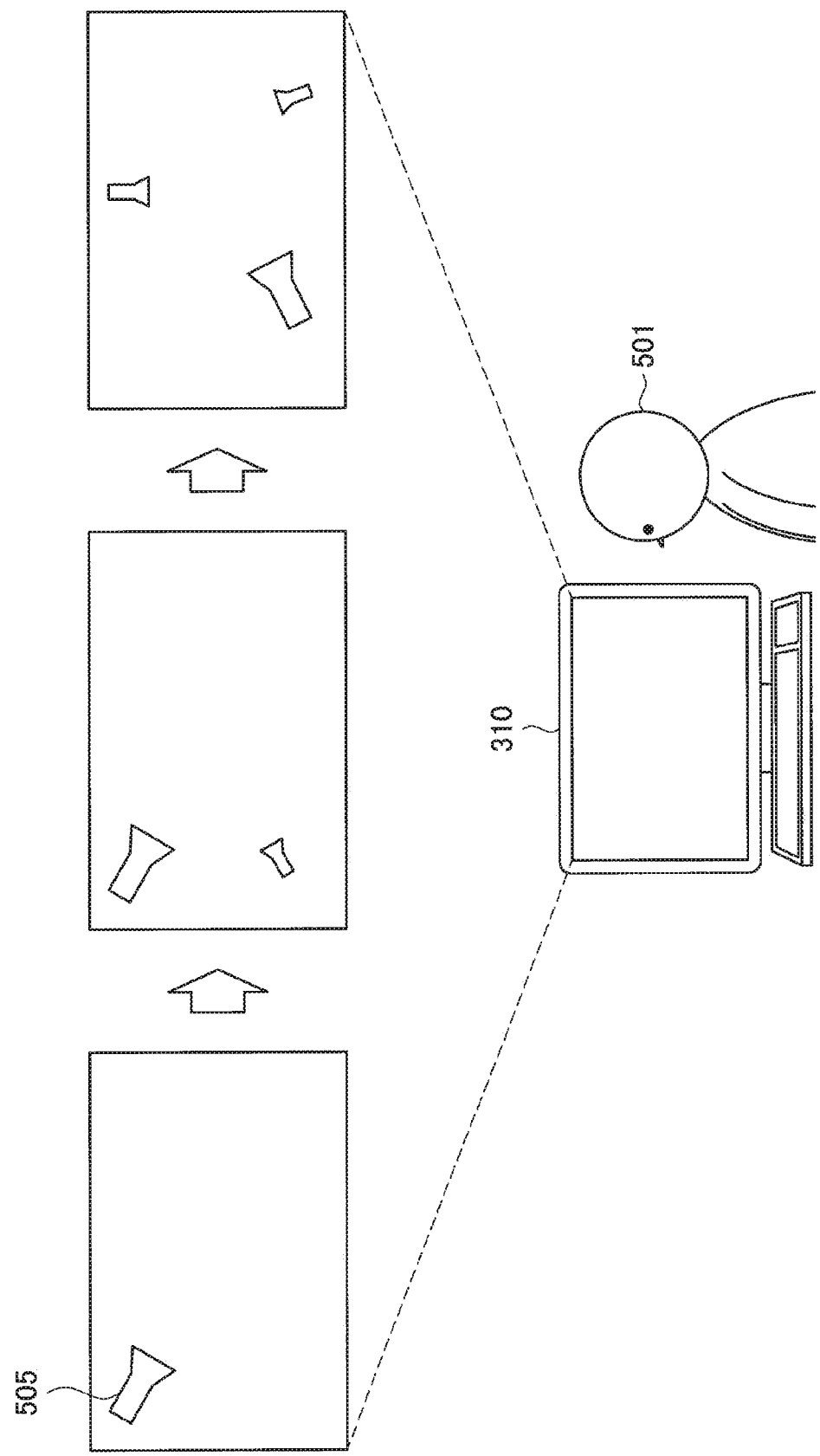
FIG. 31 is a diagram for describing an operation of an illumination system in a manual mode in a case where operated as an illumination of a chamber.

4-2-2. Overview of Operation of Illumination System in Illumination of the Chamber An overview of an operation of the illumination system 3 described above will be described with reference to FIG. 31. FIG. 31 is a diagram for describing an operation of an illumination system 3 in the manual mode when operating as the illumination of the chamber.

In the illumination system 3, the user 501 can arrange the virtual illuminating instrument using the terminal 310. Specifically, in the illumination system 3, similarly to the first embodiment, a GUI for arranging the virtual illuminating instrument can be provided. As illustrated in FIG. 31, as the GUI, an icon 505 indicating the virtual illuminating instrument is displayed on the screen of the display device of the terminal 310 (a middle diagram in FIG. 31). The user 501 can adjust a type of icon 505, the number of icons 505 indicating the virtual illuminating instrument, a position of the icon 505, and a direction of the icon 505 by a manipulation performed by the input device of the terminal 310. If the arrangement of the virtual illuminating instruments is decided, the control device of the terminal 310 drives the illuminating device 110 so that the illumination light by the decided virtual illuminating instruments is reproduced. As this process is executed, the illumination effects desired by the user 501 can be realized as the illumination of the chamber. At this time, the changing of the arrangement of the icon 505 indicating the virtual illuminating instrument and the driving of the illuminating device 110 that reproduces the illumination light by the virtual illuminating instrument may be continuously and repeatedly executed, and the user 501 can appropriately adjust the arrangement of the virtual illuminating instruments if necessary while actually checking the state of the illumination of the chamber.

Figure 32:
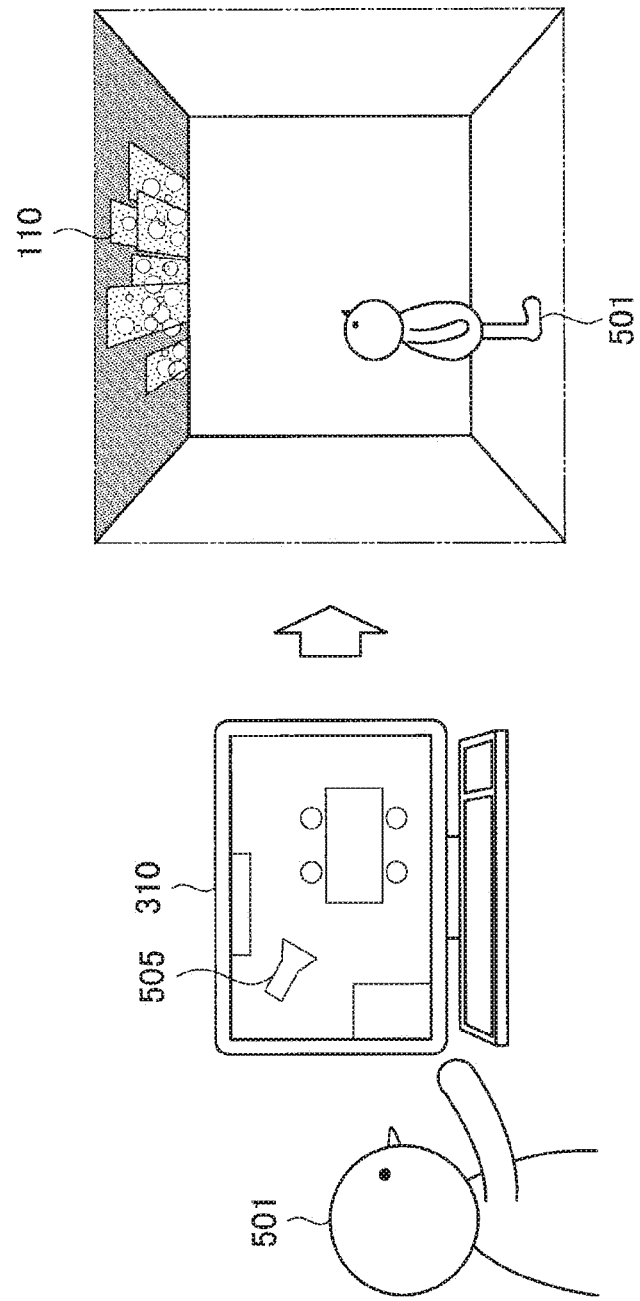
FIG. 32 is a diagram for describing another GUI for arranging virtual illuminating instruments.

Further, a GUI other than that illustrated in FIG. 31 may be provided as the GUI for arranging the virtual illuminating instrument. FIG. 32 is a diagram for describing another GUI for arranging the virtual illuminating instrument. For example, a camera capable of photographing a state of an indoor space in an overlooking manner is installed on the ceiling of the chamber in which the illuminating device 110 is installed, and the state of the chamber photographed by the camera is displayed as the display screen related to the GUI as illustrated in FIG. 32. The user 501 can appropriately arrange the icon 505 indicating the virtual illuminating instrument to be superimposed on the screen in which the state of the chamber is shown on the display screen. According to such a GUI, since the virtual illuminating instrument can be arranged in consideration of, for example, an arrangement of furniture or the like with reference to an actual state of an indoor space, the virtual illuminating instrument can be arranged more appropriately. For example, it is possible to perform a more intuitive manipulation corresponding to the arrangement of the furniture, for example, it is possible to arrange the virtual illuminating instrument corresponding to a pendant light on a dining table.

Figure 33:
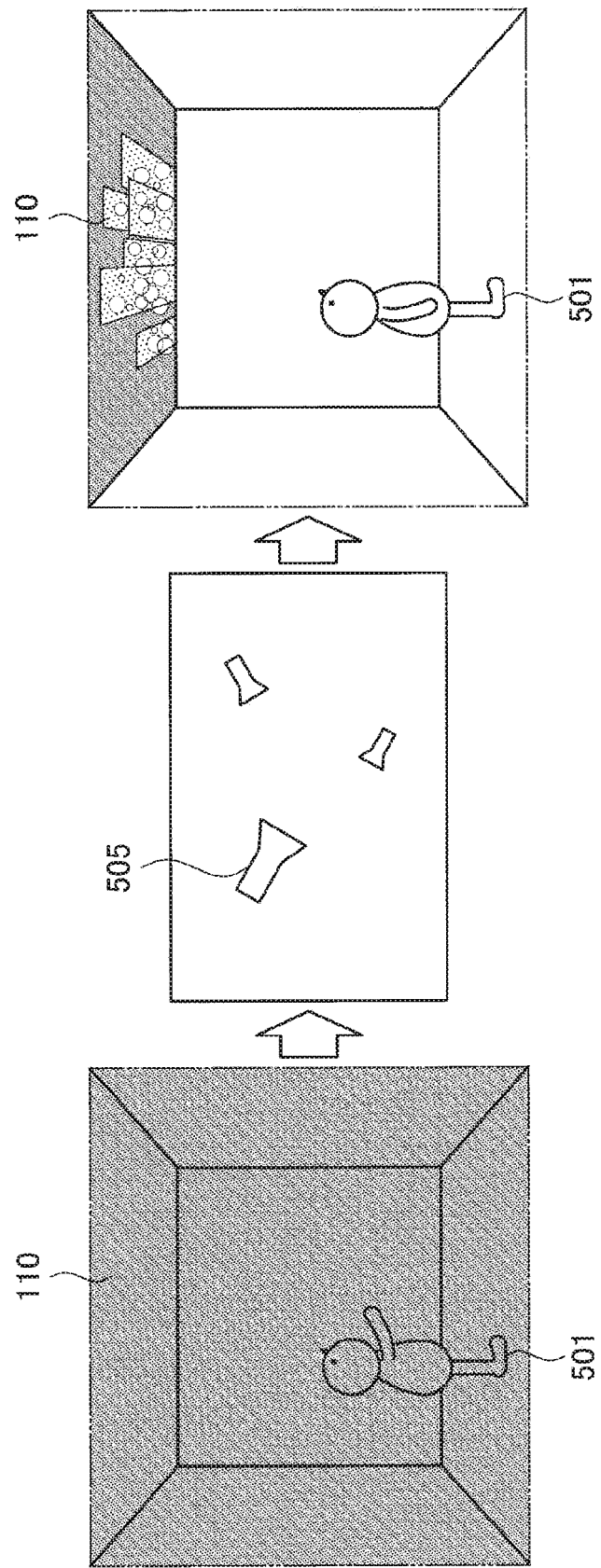
FIG. 33 is a diagram for describing a method of arranging virtual illuminating instruments in accordance with a gesture.

Further, the method of arranging the virtual illuminating instrument is not limited to the method using the GUI, and the virtual illuminating instrument may be arranged by other methods such as, for example, a gesture or a voice. FIG. 33 is a diagram for describing the method of arranging the virtual illuminating instruments by gesture as an example of another method. In this method, as illustrated in a left diagram in FIG. 33, the user 501 may adjust a type of virtual illuminating instrument, the number of virtual illuminating instruments, a position of the illuminating instrument, and a direction of the virtual illuminating instrument by performing a predetermined action (an action of shaking an arm in the illustrated example) (a middle diagram in FIG. 33). Then, the control device of the terminal 310 drives the illuminating device 110 so that the illumination light by the determined virtual illuminating instrument is reproduced (a right diagram in FIG. 33). Further, in FIG. 33, in order to indicate that the arrangement of the virtual illuminating instrument is changed by gesture, for convenience of description, the screen related to the GUI similar to FIG. 31 is illustrated, but the screen may not be displayed on the display device of the terminal 310 in a case where the virtual illuminating instrument is arranged by gesture.

Further, the virtual illuminating instrument may be arranged by a combination of a gesture and a voice. For example, the following method is assumed. A virtual spotlight appears at substantially the center of the illuminating device 110 in response to a voice command such as "add spotlight." In this state, when a gesture of waving the hand is performed, the position of the virtual spotlight in the illuminated surface of the illuminating device 110 is moved. Thereafter, the position of the virtual spotlight is determined by a voice audio command such as "OK."

4-2-3. Functional Configuration of Illumination System

Figure 34:
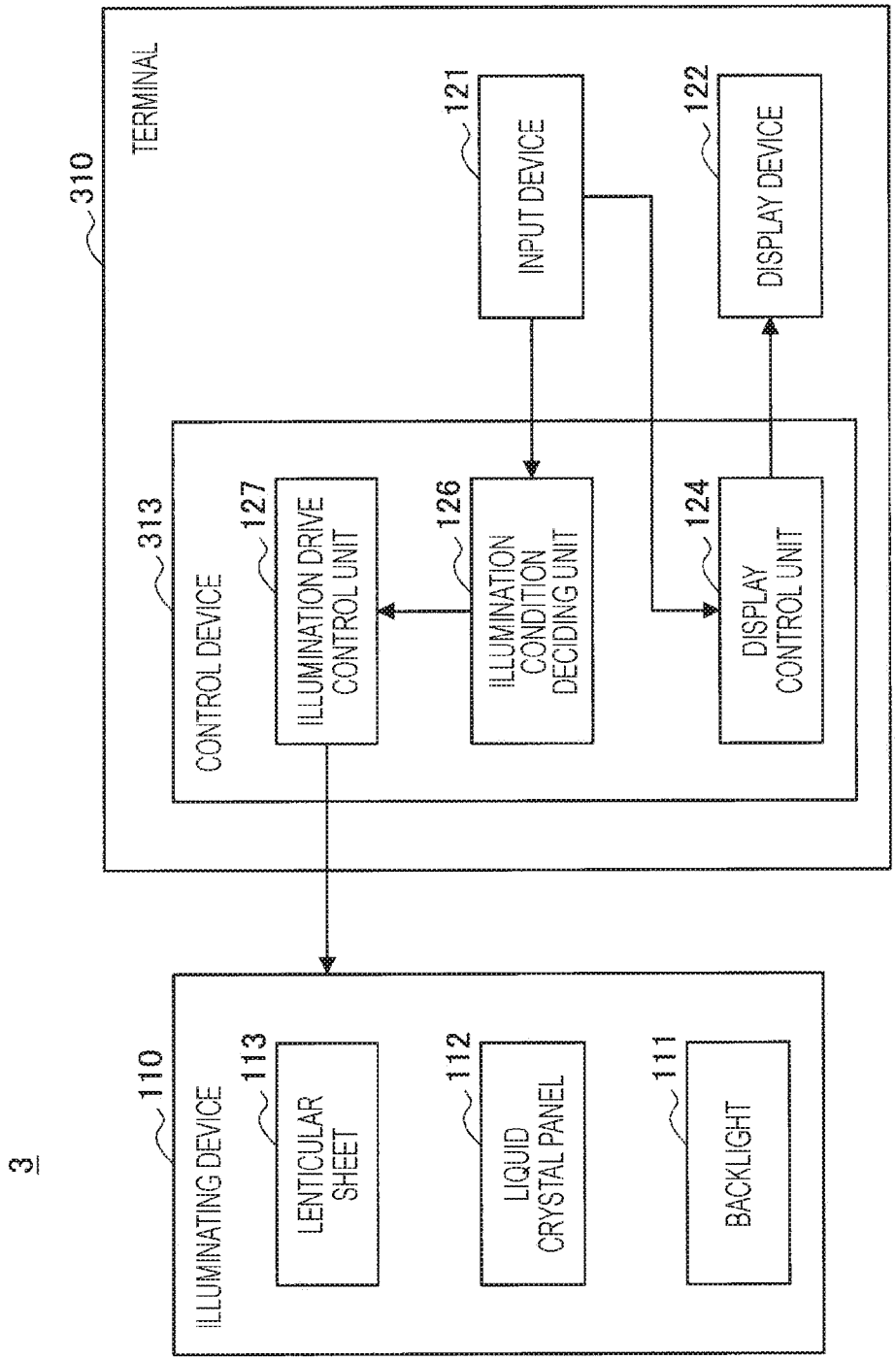
FIG. 34 is a block diagram illustrating an example of a functional configuration of an illumination system operated in a manual mode according to the third embodiment.

A functional configuration of the illumination system 3 that realizes the operation described above will be described. FIG. 34 is a block diagram illustrating an example of a functional configuration of the illumination system 3 operated in the manual mode according to the third embodiment.

Referring to FIG. 34, as described above, the illumination system 3 operated in the manual mode according to the third embodiment includes the illuminating device 110 and the terminal 310. Further, the terminal 310 includes an input device 121, a display device 122, and a control device 313. Here, configurations and functions of the illuminating device 110 and the input device 121 and the display device 122 of the terminal 310 are similar to those in the illumination system 1 operated in the manual mode according to the first embodiment described above, and thus detailed description thereof is omitted here.

Referring to FIG. 34, the control device 313 of the terminal 310 includes a display control unit 124, an illumination condition deciding unit 126, and an illumination drive control unit 127 as its functions. The control device 313 has a device configuration similar to that of the control device 123 according to the first embodiment, and these functions can be realized as the processor of the control device 313 executes arithmetic processing in accordance with a predetermined program.

Functions of the display control unit 124, the illumination condition deciding unit 126, and the illumination drive control unit 127 are substantially similar to the functions of the control device 123 in the illumination system 1 operated in manual mode illustrated in FIG. 7 according to the first embodiment. Specifically, the display control unit 124 controls the operation of the display device 122 such that the display screen related to the GUI when the virtual illuminating instrument is arranged is displayed on the display device 122. At this time, the display control unit 124 controls display such as movement of a GUI component (such as an icon) on the display screen together in response to a manipulation of the user input via the input device 121. Further, the illumination condition deciding unit 126 decides the illumination conditions so that the illumination light by the arrangement of the virtual illuminating instrument is realized on the basis of the information about the arrangement of the virtual illuminating instrument input by the user via the input device 121. Further, the illumination drive control unit 127 drives the illuminating device 110 in accordance with the illumination conditions decided by the illumination condition deciding unit 126.

As described above, the functional configuration of the illumination system 3 corresponds to one in which the functions of the RGB camera 130 and the functions related to the RGB camera 130 are removed from the illumination system 1. In other words, the functional configuration of the illumination system 3 corresponds to one in which the function of the mirror 220 is removed from the functional configuration of the illumination system 2 operated in the manual mode according to the second embodiment illustrated in FIG. 23.

Further, the processing procedure of the control method of the illumination system 3 executed by the control device 313 described above is similar to the processing procedure of the control method of the illumination system 2 executed by the control device 213 in the second embodiment described above with reference to FIG. 24, and thus detailed description thereof is omitted here.

4-3. Automatic Mode

Next, a configuration and functions of the illumination system in the automatic mode will be described.

4-3-1. Configuration of Illumination System

Figure 35:
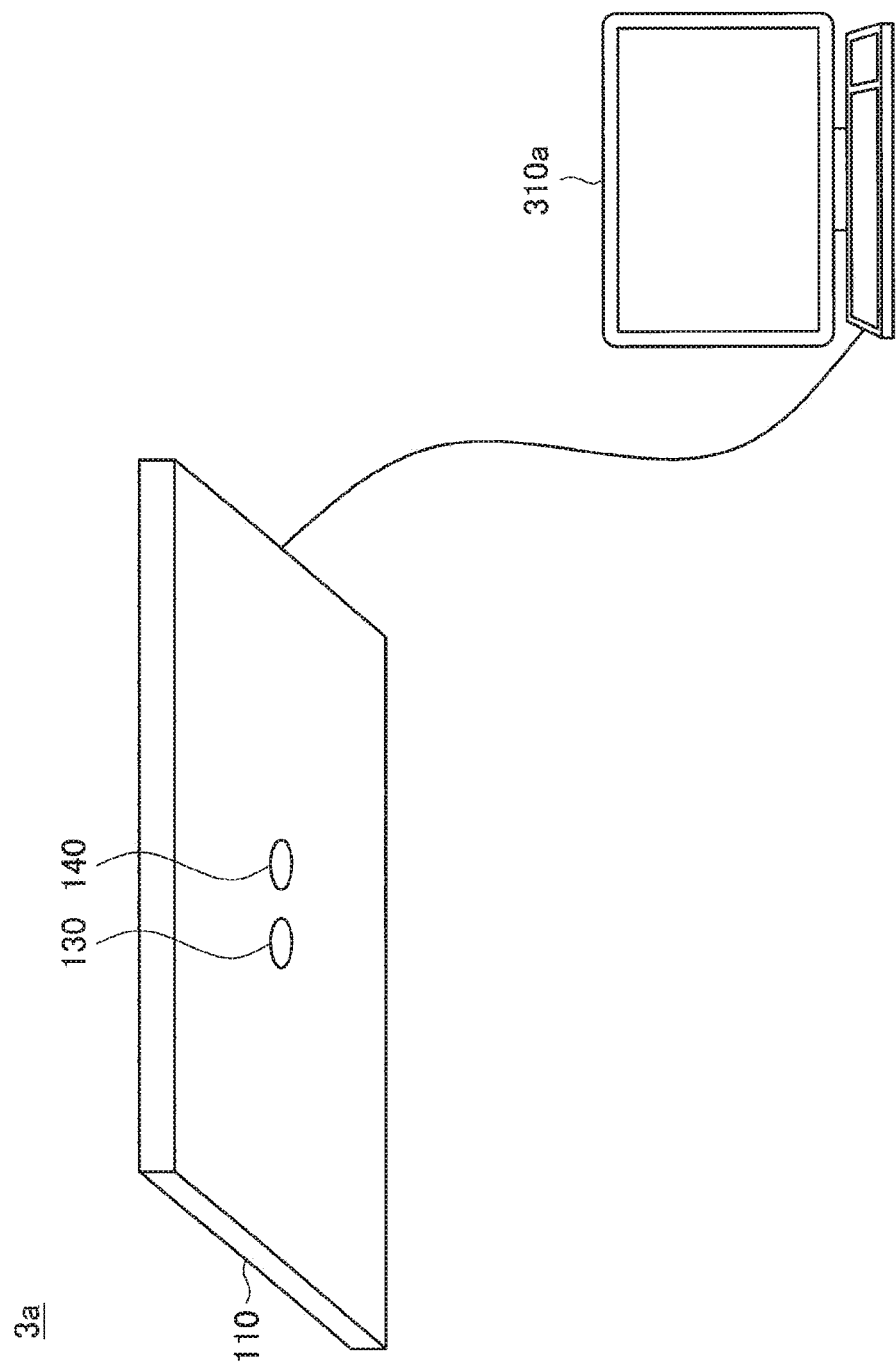
FIG. 35 is a diagram illustrating a schematic configuration of an illumination system operated in an automatic mode according to the third embodiment.

FIG. 35 is a diagram illustrating a schematic configuration of the illumination system operated in an automatic mode according to the third embodiment. Referring to FIG. 35, an illumination system 3a operated in the automatic mode according to the third embodiment includes an illuminating device 110, an RGB camera 130, a depth camera 140, and a terminal 310a. As described above, the illumination system 3a corresponds to one in which, in the illumination system 3 operated in the manual mode according to the third embodiment described above with reference to FIG. 30, the RGB camera 130 and the depth camera 140 are further installed, and the terminal 310 is replaced with the terminal 310a. Further, a configuration and functions of the terminal 310a will be described later with reference to FIG. 36.

The configuration and functions of the RGB camera 130 and the depth camera 140 are similar to those of the RGB camera 130 and the depth camera 140 in the first embodiment. Specifically, the RGB camera 130 is installed at a position at which the emission range of the illumination light by the illuminating device 110 can be photographed, and photographs an object (including a person and a thing) in an indoor space which is irradiated with the illumination light by the illuminating device 110 and acquires the image data (RGB data). Further, the depth camera 140 is installed at a position at which the emission range of the illumination light by the illuminating device 110 can be photographed, and photographs an object (including a person and a thing) in an indoor space which is irradiated with the illumination light by the illuminating device 110 and acquires the depth data. The RGB data of the object in the indoor space acquired by the RGB camera 130 and the depth data of the object in the indoor space acquired by the depth camera 140 are used when automatically deciding the illumination conditions.

4-3-2. Functional Configuration of Illumination System

Figure 36:
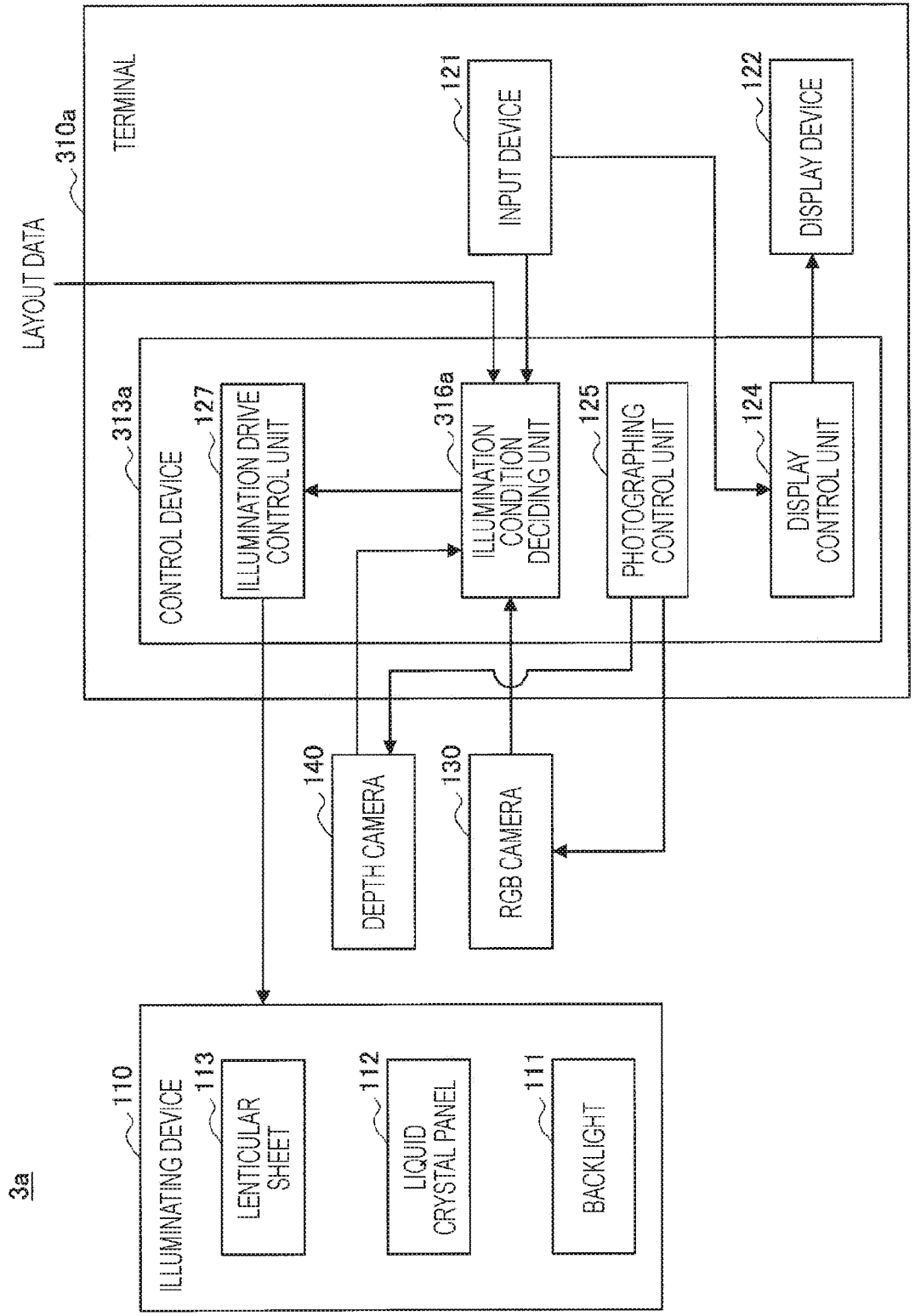
FIG. 36 is a block diagram illustrating an example of a functional configuration of an illumination system operated in an automatic mode according to the third embodiment.

FIG. 36 is a block diagram illustrating an example of a functional configuration of the illumination system 3a operated in the automatic mode according to the third embodiment.

Referring to FIG. 36, the illumination system 3a operated in an automatic mode according to the third embodiment includes an illuminating device 110, a terminal 310a, an RGB camera 130, and a depth camera 140. Further, the terminal 310a includes an input device 121, a display device 122, and a control device 313a. Here, configurations and functions of the illuminating device 110 and the input device 121 and the display device 122 of the terminal 310a are similar to those in the illumination system 3 operated in the manual mode illustrated in FIG. 34, and thus detailed description thereof is omitted here. As described above, the illumination system 3a corresponds to one in which, in the illumination system 3, the RGB camera 130 and the depth camera 140 are added, and the control device 313 of the terminal 310 is replaced with the control device 313a. Further, a device configuration of the control device 313a is similar to the device configuration of the control device 313, and the control device 313a corresponds to one whose function is changed from the control device 313.

Referring to FIG. 36, the control device 313a includes a display control unit 124, a photographing control unit 125, an illumination condition deciding unit 316a, and an illumination drive control unit 127 as its functions. These functions can be realized as the processor of the control device 313a executes arithmetic processing in accordance with a predetermined program. Here, functions of the display control unit 124, the photographing control unit 125, and the illumination drive control unit 127 are substantially similar to those in the illumination systems 1a and 1b operated in the automatic mode according to the first embodiment described with reference to FIGS. 9 and 19. However, in the third embodiment, similarly to the second embodiment, the display control unit 124 does not perform control for displaying the through image. Further, in the third embodiment, similarly to the second embodiment, the photographing control unit 125 does not perform control of still image capturing according to the instruction input of the user.

In the automatic mode, layout data of chamber is input to the control device 313a. Here, the layout data of the chamber is data for a 3D model of the chamber in which the illuminating device 110 is installed. The 3D model also includes information for a shape of the chamber itself (that is, shapes of a wall and a floor of the chamber) and a shape of furniture arranged in the chamber. The layout data of the chamber can be acquired using a technique such as, for example, simultaneous localization and mapping (SLAM).

The illumination condition deciding unit 316a of the control device 313a automatically decides the illumination conditions on the basis of the layout data of the relevant chamber. A condition for automatically deciding the illumination conditions may be set appropriately by the user. For example, in a case where a condition for reducing power consumption as much as possible is set, the illumination condition deciding unit 316a decides the illumination conditions so that an indoor space is evenly illuminated with the arrangement of as few virtual illuminating instruments as possible in consideration of the 3D shape in the chamber. Further, for example, in a case where a condition indicating that only a specific place in an indoor space is particularly illuminated is set, the illumination condition deciding unit 316a decides the illumination conditions so that the specific place is illuminated brighter than other places in consideration of the 3D shape in the chamber. Any other criteria may be set as the condition for automatically deciding the illumination conditions.

Further, the RGB data and the depth data of the object in the chamber acquired as the RGB camera 130 and the depth camera 140 are driven under the control of the photographing control unit 125 may be input to the control device 313a, and the illumination condition deciding unit 316a may automatically decides the illumination conditions on the basis of the RGB data and depth data of the object in the chamber in addition to or instead of the layout data of the chamber. Further, in a case where the RGB data and the depth data are used as described above, the layout data of the chamber may be dynamically generated and acquired on the basis of the RGB data and the depth data without being acquired in advance.

Specifically, the illumination condition deciding unit 316a may have a function of determining a type, a motion, or the like of the object in the chamber by performing an image analysis process using the RGB data and the depth data of the object in the chamber. The illumination condition deciding unit 316a can automatically decide the illumination conditions using an image analysis result. In this case, a condition for automatically deciding the illumination conditions may also be set appropriately by the user. Further, various types of known methods may be used as the method of the image analysis process, and thus detailed description thereof is omitted here.

For example, the illumination condition deciding unit 316a presumes a situation of the chamber on the basis of the image analysis result. Specifically, the illumination condition deciding unit 316a can presume a location at which a person is located in the chamber, a behavior of a person in the chamber (eating, working, sleeping, or the like), and a behavior being performed in the chamber (for example, a large number of people are having a home party), for example, as the situation of the chamber on the basis of the image analysis result. Then, the illumination condition deciding unit 316a decides the illumination conditions in accordance with a presumption result. In this case, the illumination condition deciding unit 316a decides the illumination conditions so that, for example, the following illumination effects are obtained in accordance with the presumption result.

In a case where a location at which a person is located in the chamber is presumed, a location at which a person is located is brightened, and a location at which a person is not located is darkened.—In a case where it is presumed that a person is eating, only an area around a sleeping is darkened, and other places is brightened.—In a case where it is presumed that a person is eating, an area around a plate on which cooking is placed is brightened so that the cooking looks delicious.—In a case where a document or the like is placed on a desk, and it is presumed that a person is working, the surface of the desk on which the document or the like is placed is particularly brightened.—In a case where it is presumed that a large number of people are having a home party, colorful illumination effects are realized.

The illumination drive control unit 127 drives the illuminating device 110 in accordance with the illumination conditions decided by the illumination condition deciding unit 316a, so that an appropriate illumination corresponding to the situation of the chamber is automatically realized. Further, similarly to the first embodiment, the illumination conditions may be adjusted in accordance with an instruction input by the user via the input device 121 and/or an instruction input by a gesture or the like after the illumination conditions are automatically decided by the illumination condition deciding unit 316a.

As an example, an operation of the illumination system 3a in a case where the illumination condition deciding unit 316a decides the illumination conditions on the basis of the layout data of the chamber and the RGB data and depth data of the object in the chamber will be described again with reference to FIGS. 37 to 40. FIGS. 37 to 40 are diagrams for describing the operation of the illumination system 3a when deciding the illumination conditions on the basis of the layout data of the chamber and the RGB data and the depth data of the object in the chamber described above.

Figure 37:
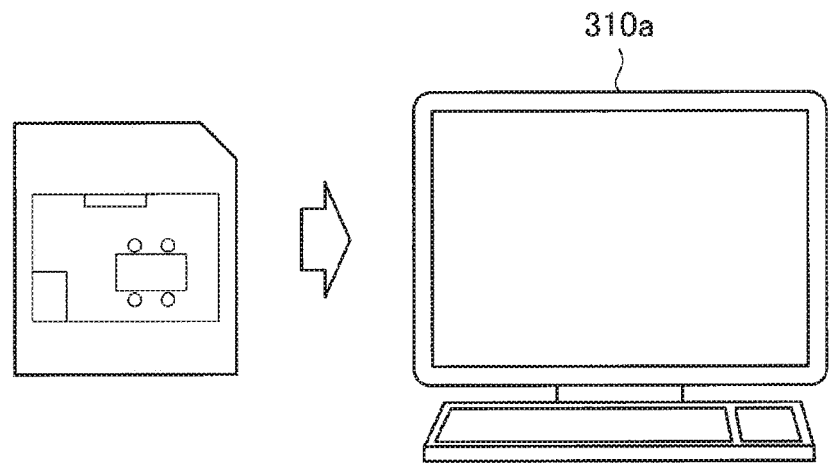
FIG. 37 is a diagram for describing an operation of an illumination system when an illumination condition is decided on the basis of layout data of a chamber and RGB data and depth data of an object in the chamber.
Figure 38:
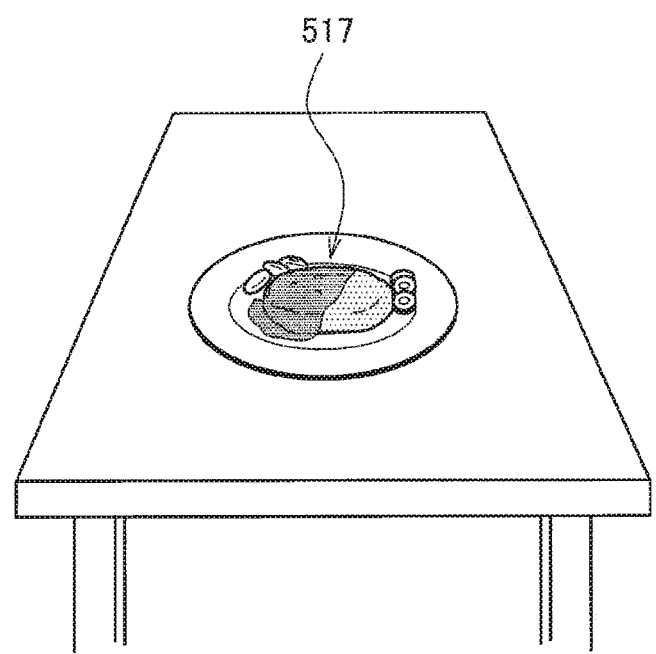
FIG. 38 is a diagram for describing an operation of an illumination system when an illumination condition is decided on the basis of layout data of a chamber and RGB data and depth data of an object in the chamber.

In the illumination system 3a, the layout data of the chamber is input to the control device 313a of the terminal 310a (FIG. 37). Further, the RGB data and the depth data of the object in the chamber are separately input to the control device 313a, and the illumination condition deciding unit 316a of the control device 313a presumes the situation in the chamber on the basis of the image analysis result based on the layout data of the chamber and the RGB data and the depth data (FIG. 38). In the example illustrated in FIG. 38, the illumination condition deciding unit 316a analyzes that cooking 517 is placed on a desk and presumes that the user in the chamber is eating.

Figure 39:
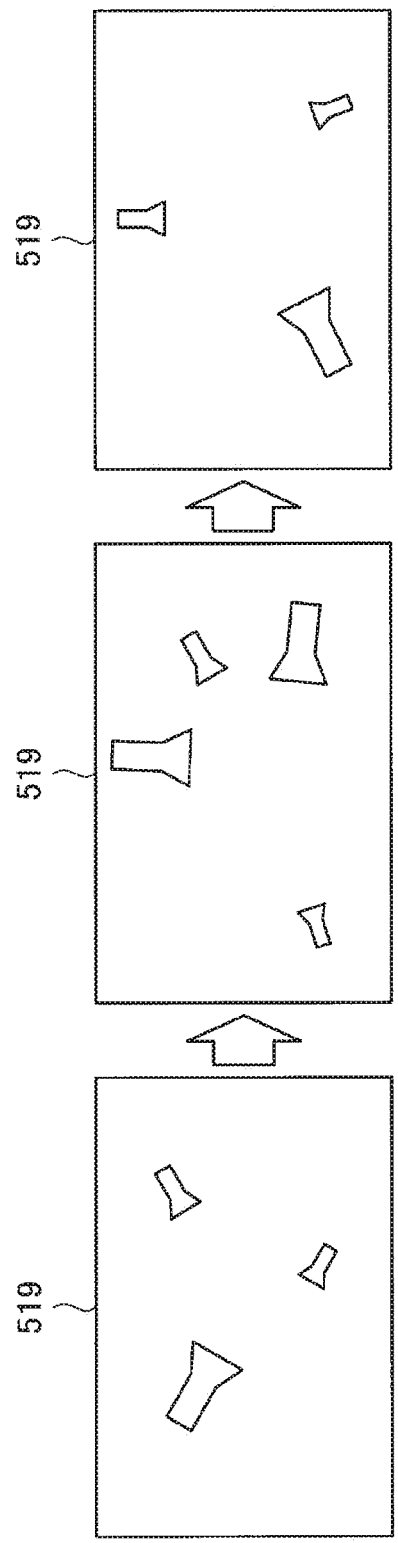
FIG. 39 is a diagram for describing an operation of an illumination system when an illumination condition is decided on the basis of layout data of a chamber and RGB data and depth data of an object in the chamber.

The illumination condition deciding unit 316a decides illumination conditions 519 on the basis of a presumption result so that, for example, an illumination effect that makes the cooking 517 on the desk look delicious on the basis of the presumption result (FIG. 39) (in FIG. 39, for convenience, an arrangement of the virtual illuminating instrument related to the illumination conditions 519 is illustrated as the illumination conditions 519). Then, the illumination drive control unit 127 drives the illuminating device 110 in accordance with the illumination conditions decided by the illumination condition deciding unit 316a (FIG. 40). Accordingly, the illumination effect can be realized such that the user 501 can have an appetite for the cooking 517.

4-3-3. Processing Procedure of Control Method of Illumination System

Figure 41:
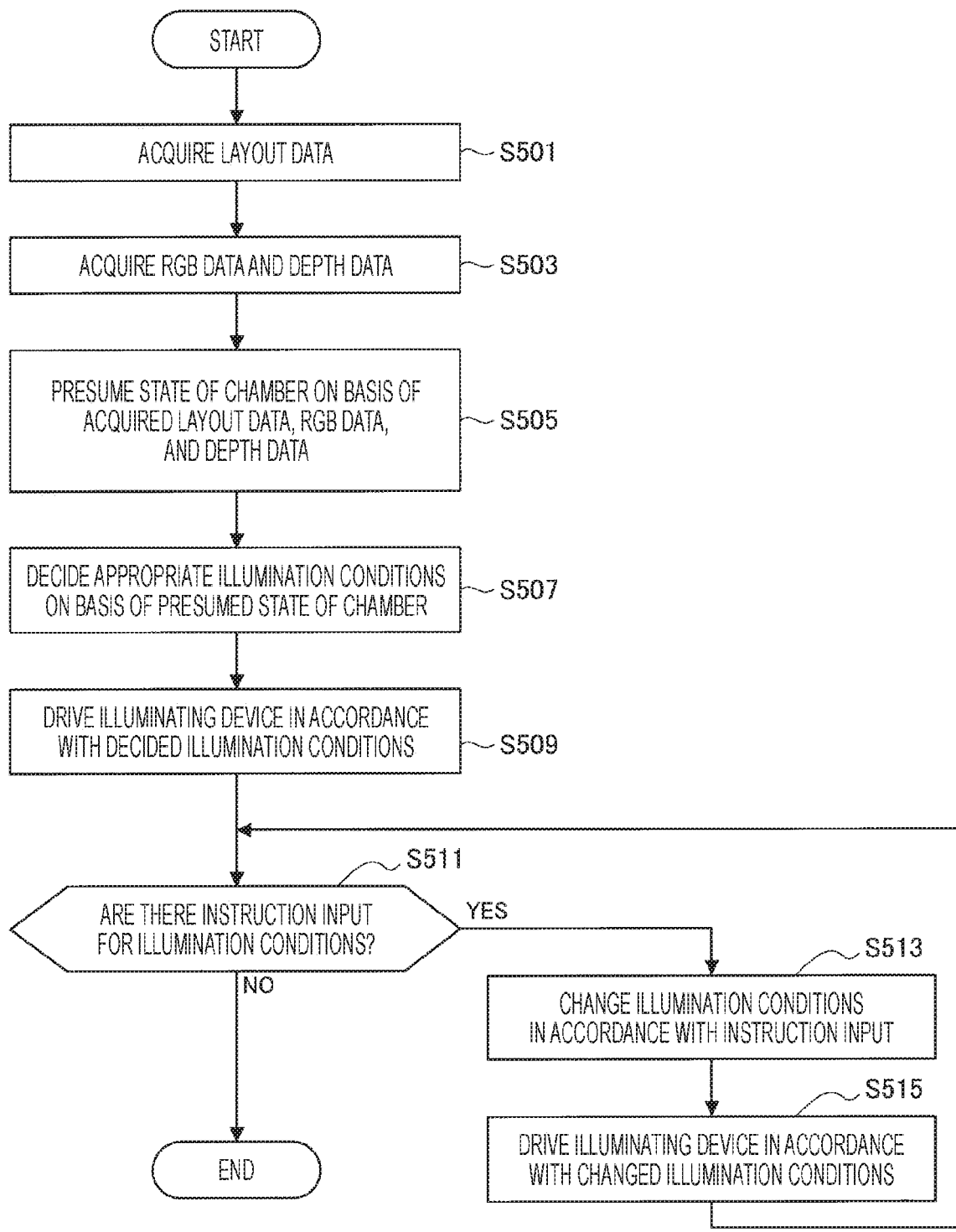
FIG. 41 is a flowchart illustrating an example of a processing procedure of a control method in an automatic mode of an illumination system according to the third embodiment.

A processing procedure of a control method of the illumination system 3a executed by the control device 313a described above will be described. FIG. 41 is a flowchart illustrating an example of a processing procedure of a control method in the automatic mode of the illumination system 3a according to the third embodiment. Further, each process illustrated in FIG. 41 corresponds to each process executed by the control device 313a illustrated in FIG. 36. Each process illustrated in FIG. 41 is executed as the processor constituting the control device 313a operates in accordance with a predetermined program. The details of each process illustrated in FIG. 41 have already been described above when describing the functions of the control device 313a, and therefore, in description of each process illustrated in FIG. 41 below, an overview of each process will be described, and detailed description thereof will be omitted.

Referring to FIG. 41, in the control method in the automatic mode of the illumination system 3a according to the third embodiment, first, the layout data of the chamber is acquired (step S501). The process of step S501 corresponds to the process in which the layout data of the chamber is acquired by the illumination condition deciding unit 316a illustrated in FIG. 36. As described above, the layout data may be acquired in advance using a technique such as SLAM or may be acquired dynamically on the basis of the RGB data and the depth data of the object in the chamber. Further, in a case where the layout data is acquired on the basis of the RGB data and the depth data, the process of step S501 may be performed after a process of step S503 to be described later.

Then, photographing is performed by the RGB camera 130 and the depth camera 140, and the RGB data and the depth data of the object in the chamber are acquired (step S503). The process of step S503 corresponds to the process of acquiring the RGB data and the depth data of the object in the chamber which are transmitted from the RGB camera 130 and the depth camera 140 by illumination condition deciding unit 316a illustrated in FIG. 36.

Then, the situation in the chamber is presumed through the image analysis process on the basis of the layout data of the chamber and the RGB data and the depth data of the object in the chamber (step S505). The process of step S505 corresponds to the process executed by the illumination condition deciding unit 316a illustrated in FIG. 36.

Then, an appropriate illumination conditions are decided on the basis of the presumed situation in the chamber (step S507). The process of step S507 corresponds to the process executed by the illumination condition deciding unit 316a illustrated in FIG. 36.

Then, the illuminating device 110 is driven in accordance with the decided illumination conditions (step S509). The process of step S509 corresponds to the process performed by the illumination drive control unit 127 illustrated in FIG. 36.

Then, it is determined whether or not there is an instruction input (an instruction input from the user via the input device 121) for the illumination conditions (step S511). The process of step S511 corresponds to the process performed by the illumination condition deciding unit 316a illustrated in FIG. 36.

In a case where there is an instruction input for the illumination conditions in step S511, the process proceeds to step S513. In step S513, the illumination conditions are changed in accordance with the instruction input. Then, the illuminating device 110 is driven in accordance with the changed illumination conditions (step S515). Thereafter, the process returns to step S511, and the process of step S511 and subsequent steps is performed again. The process of step S513 corresponds to the process performed by the illumination condition deciding unit 316a illustrated in FIG. 36.

Further, the process of step S515 corresponds to the process executed by the illumination drive control unit 127 illustrated in FIG. 36.

On the other hand, in a case where there is no instruction input for the illumination conditions in step S511, a series of processes ends.

4-3-4. Another Operation Example of Illumination System

In the configuration example described above, in the illumination system 3a, the illumination conditions are decided on the basis of the layout data of the chamber, or the layout data of the chamber and the RGB data and the depth data of the object in the chamber. However, the third embodiment is not limited to this example, and in the third embodiment, the illumination conditions may be decided on the basis of content being watched by a user in the chamber in the illumination system 3a.

Figure 42:
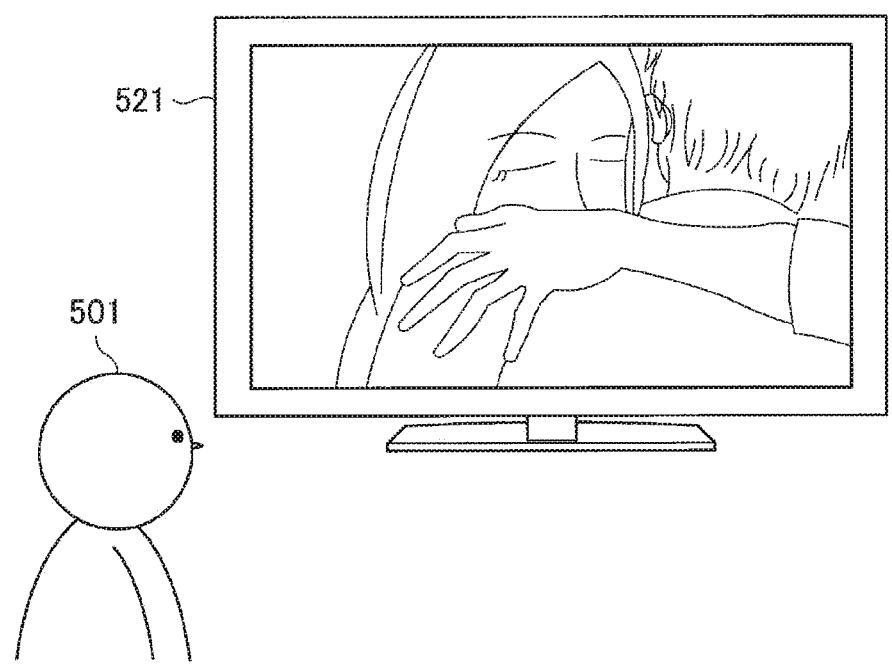
FIG. 42 is a diagram for describing an operation of an illumination system in a case where an illumination condition is decided on the basis of content being watched by a user.

FIGS. 42 and 43 are diagrams for describing an operation of the illumination system 3a in a case where the illumination conditions are decided on the basis of content being watched by the user. In this configuration example, for example, as illustrated in FIG. 42, it is assumed that the user 501 is viewing content via a television 521 installed in the chamber. In the illustrated example, the television 521 is used, but a device that enables the user 501 to view content may be other display devices such as a projector. Further, content may be video content such as a television program or a movie or may be a video game.

In this state, as illustrated in FIG. 43, the illumination condition deciding unit 316a of the control device 313a decides the illumination conditions so that an illumination effect suitable for the content can be obtained on the basis of the content which the user 501 is watching and listening to. The illumination drive control unit 127 drives the illuminating device 110 in accordance with the decided illumination conditions, so that the illumination effect suitable for the content is obtained. Accordingly, the user 501 can enjoy the content while having a more sense of immersion.

Further, in a case where the illumination conditions are decided on the basis of the content as described above, the RGB data and the depth data of the object in the chamber may not be used for deciding the illumination condition, and thus in the illumination system 3a, the RGB camera 130 and the depth camera 140 may not be installed.

Figure 44:
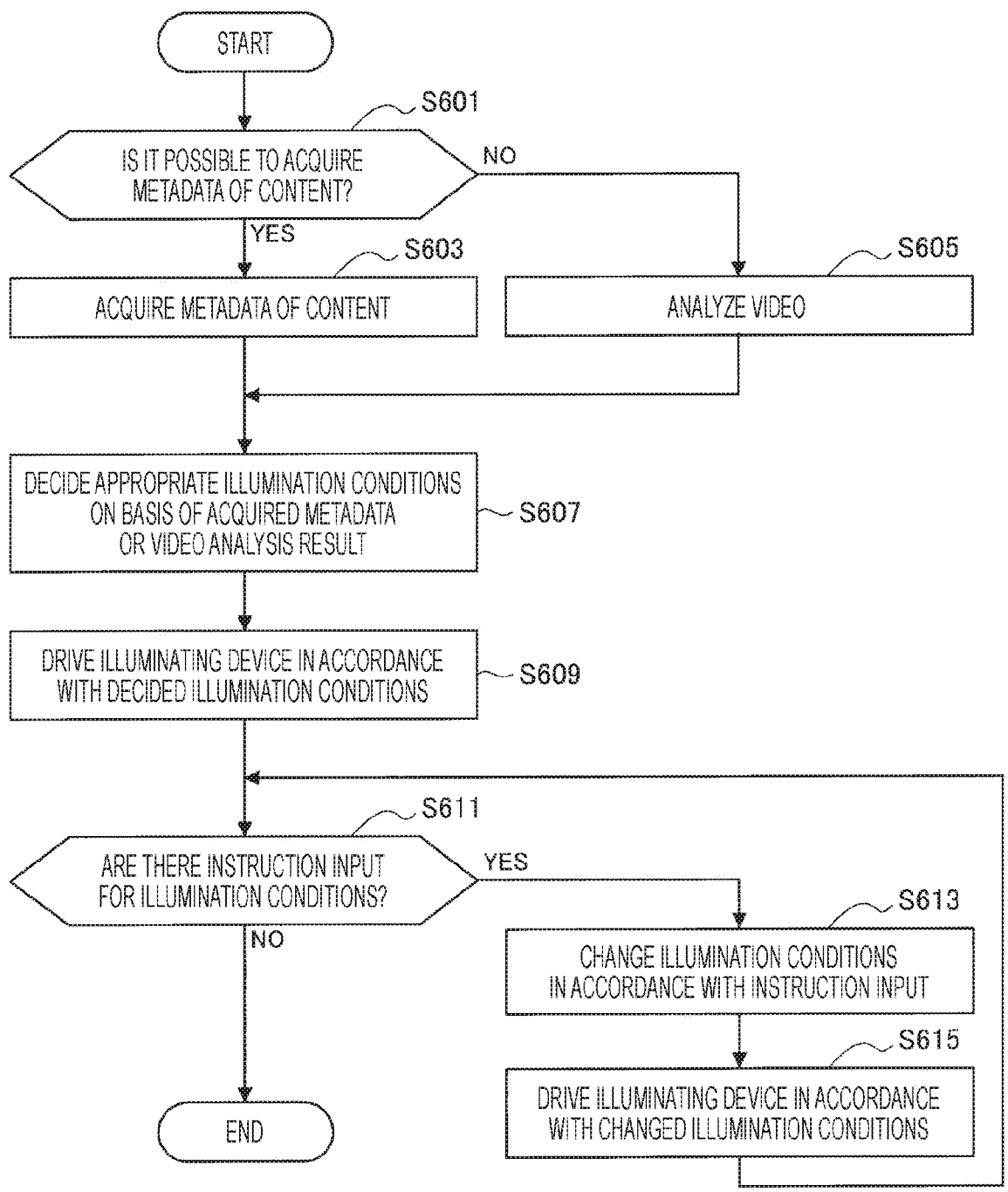
FIG. 44 is a flowchart illustrating an example of a processing procedure of a control method of an illumination system executed by a control device in a case where an illumination condition is decided on the basis of content being watched by a user.

Referring to FIG. 44, a processing procedure of a control method of the illumination system 3a executed by the control device 313a in a case where the illumination conditions are decided on the basis of content being watched by the user will be described in detail. FIG. 44 is a flowchart illustrating an example of a processing procedure of a control method of the illumination system 3a executed by the control device 313a in a case where the illumination conditions are decided on the basis of content being watched by the user. Further, each process illustrated in FIG. 44 corresponds to each process executed by the control device 313a illustrated in FIG. 36. Each process illustrated in FIG. 44 is executed as the processor constituting the control device 313a operates in accordance with a predetermined program. The details of each process illustrated in FIG. 44 has already been described when describing the functions of the control device 313a, and therefore, in description of each process illustrated in FIG. 44, an overview of each process will be described, and detailed description thereof will be omitted.

Referring to FIG. 44, in the control method of the illumination system 3a in a case where the illumination conditions are decided on the basis of content being watched by the user, first, it is determined whether or not metadata of the content being watched by the user can be acquired (Step S601). Here, the metadata of the content may be metadata generated by a content production company, a content distribution company, or the like, and the metadata of the content includes information for an overview of the content (for example, a genre of a movie in a case where it a movie, or the like), information for time-based scenes in content, or the like. It may be determined whether or not the metadata of the content can be acquired on the basis of whether or not there is the metadata and whether or not the metadata is distributed by a vendor who generates the metadata or the like, for example. The process of step S601 corresponds to the process executed by the illumination condition deciding unit 316a illustrated in FIG. 36.

In a case where it is determined in step S601 that the metadata of the content can be acquired, the metadata of the content is acquired (step S603). The process of step S603 corresponds to the process executed by the illumination condition deciding unit 316a illustrated in FIG. 36.

On the other hand, in a case where it is determined in step S601 that the metadata of content is unable to be acquired, the process proceeds to step S605. In step S605, a video of the content being watched by the user is analyzed. In the analysis process, content of a current scene, that is, an overview of the content or the like is inferred on the basis of the video. The process of step S605 corresponds to the process executed by the illumination condition deciding unit 316a illustrated in FIG. 36. Further, since various types of known methods may be used as a specific method of the video analysis process, detailed description thereof is omitted here.

In a case where the process illustrated in step S603 or step S605 is completed, the process proceeds to step S607. In step S607, appropriate illumination conditions corresponding to the content are decided on the basis of the acquired metadata or the video analysis result. For example, in a case where the content is a horror movie, the illumination conditions are decided so that a relatively dark illumination effect can be obtained. Further, for example, in a case where the content is a romantic movie, the illumination conditions for giving a romantic illumination effect are decided. The process of step S607 corresponds to the process executed by the illumination condition deciding unit 316a illustrated in FIG. 36.

Then, the illuminating device 110 is driven in accordance with the decided illumination conditions (step S609). The process of step S609 corresponds to the process performed by the illumination drive control unit 127 illustrated in FIG. 36.

Then, it is determined whether there is an instruction input (an instruction input from the user via the input device 121) for the illumination conditions (step S611). The process of step S611 corresponds to the process executed by the illumination condition deciding unit 316a illustrated in FIG. 36.

In a case where there is an instruction input for the illumination conditions in step S611, the process proceeds to step S613. In step S613, the illumination conditions are changed in accordance with the instruction input. Then, the illuminating device 110 is driven in accordance with the changed illumination conditions (step S615). Thereafter, the process returns to step S611, and the processing after step S611 is executed again. The process of step S613 corresponds to the process executed by the illumination condition deciding unit 316a illustrated in FIG. 36. Further, the process of step S615 corresponds to the process executed by the illumination drive control unit 127 illustrated in FIG. 36.

On the other hand, in a case where there is no instruction input for the illumination conditions in step S611, a series of processes ends.

4-4. Conclusion of Third Embodiment

The third embodiment of the present disclosure has been described above. As described above, in the third embodiment, the illumination systems 3 and 3a using the illuminating device 110 as the illuminating device of the chamber are constructed. In the illuminating device 110, it is possible to reproduce various light sources and realize various illumination effects with one device, and thus it is possible to the illumination light corresponding to the situation in the chamber without performing a major work of exchanging the illuminating device or the like. Therefore, the convenience of the user can be improved.

Further, in the third embodiment, either the manual mode or the automatic mode can be appropriately selected as the method of deciding the illumination conditions. In the manual mode, it is possible to control the driving of the illuminating device 110 with a higher degree of freedom since the user can freely decide the illumination conditions. Further, in the automatic mode, the illumination conditions are automatically decided on the basis of predetermined information (specifically, the layout data of the chamber or information for content being watched by the user in the chamber). For example, the situation in the chamber is inferred on the basis of the layout data of the chamber and the RGB data and the depth data of the object in the chamber, and the illumination conditions for realizing the illumination light suitable for the situation in the chamber are automatically decided. Alternatively, depending on a currently displayed scene of content, the illumination conditions for realizing the illumination light suitable for the scene are automatically decided. Therefore, it is possible to drive the illuminating device 110 so that a desired illumination light can be realized without performing complicated manipulations by the user. As described above, the convenience of the user when the illuminating device 110 is used as the illumination of the chamber can be further improved by appropriately selecting the manual mode and the automatic mode.

5. Fourth Embodiment

5-1. Overview of Fourth Embodiment

A fourth embodiment of the present disclosure will be described. In the fourth embodiment, the illuminating device 110 is used as a notification device for notifying the user of information.

In the fourth embodiment, for example, it cooperates with an information processing device (a smartphone, a PC, or the like) owned by the user, and the illuminating device 110 is driven so that predetermined illumination light is emitted when the information processing device receives predetermined information. As described above, according to the illuminating device 110, since it is possible to control the illumination light in detail in one device, various types of illumination effects are realized in accordance with a type of received information, and thus the user can understand that the information is received more intuitively by a sense of vision.

5-2. Configuration of Illumination System

Figure 45:
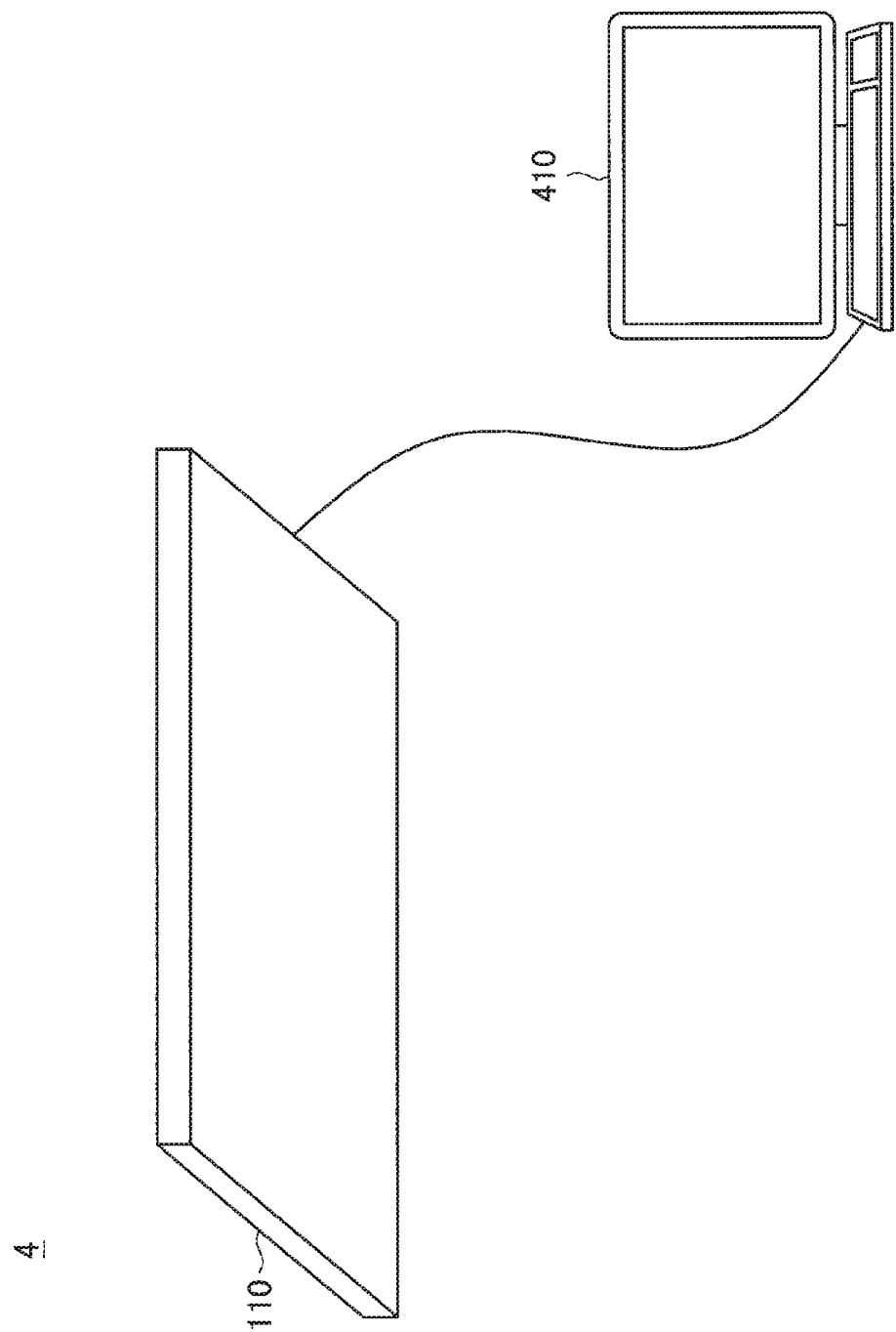
FIG. 45 is a diagram illustrating a schematic configuration of an illumination system according to a fourth embodiment.

FIG. 45 is a diagram illustrating a schematic configuration of an illumination system according to the fourth embodiment. Referring to FIG. 45, an illumination system 4 according to the third embodiment includes an illuminating device 110 and a terminal 410. In the illustrated example, the illuminating device 110 is installed on a ceiling of a chamber of the user so that an emission direction is a downward direction, similarly to the third embodiment. However, the fourth embodiment is not limited to such an example, and the installation position of the illuminating device 110 may be arbitrary as long as the illumination light can be visually recognized by the user so that it can function as a notification device. Further, a configuration and functions of the illuminating device 110 are similar to those of the illuminating device 110 in the first embodiment, and thus detailed description thereof is omitted here.

The terminal 410 is an information processing device that manages an operation of the illumination system 4 in an integrated manner. Although simplified and illustrated in FIG. 45, the terminal 410 includes at least an input device, a display device and a control device. Here, a configuration of the terminal 410 is similar to that of the terminal 120 according to the first embodiment described above with reference to FIGS. 4 and 7 except that the function of the control device is different. Accordingly, here, detailed description of the terminal 410 for the same matters as the terminal 120 will be omitted. Further, functions of the control device of the terminal 410 will be described later with reference to FIG. 47.

Figure 46:
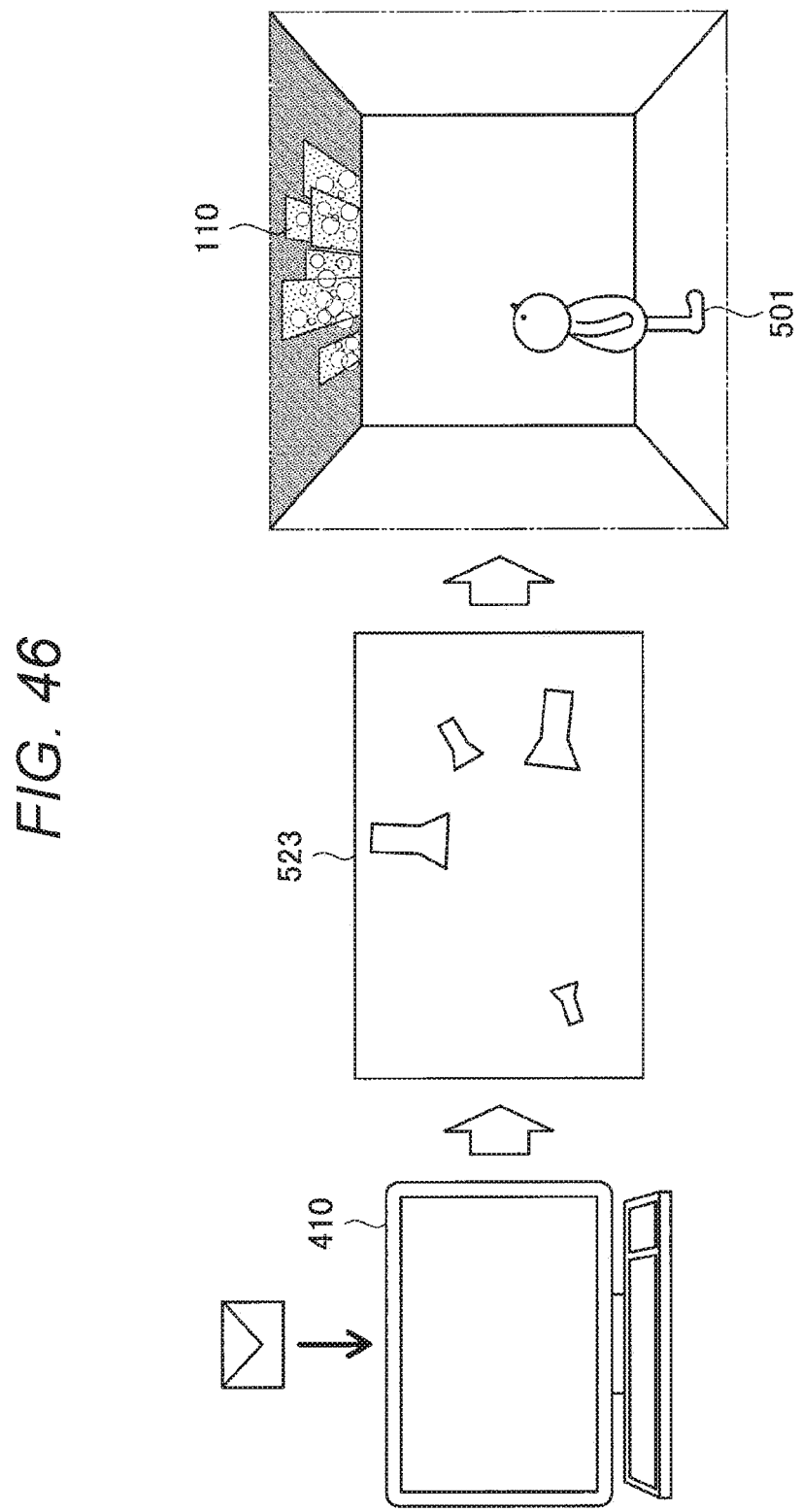
FIG. 46 is a diagram for describing an overview of an operation of an illumination system at the time of information notification.

5-3. Overview of Operation of Illumination System at Time of Information Notification An overview of an operation of the illumination system 4 at the time of information notification will be described with reference to FIG. 46. FIG. 46 is a diagram for describing an overview of an operation of the illumination system 4 at the time of information notification.

In the illumination system 4, the user can set a combination of information to be notified of (notification target information) and an illumination effect for notifying of the notification target information in the control device of the terminal 410 in advance. The notification target information may be, for example, various kinds of information such as an e-mail reception, an incoming call, a weather, and a stock price. Further, as the illumination effect, for example, various illumination effects for emitting an illumination light of a predetermined color, blinking an illumination light, shaking an illumination light, and the like may be set. For example, a setting screen for setting the combination can be displayed on the display device of terminal 410. The user can perform such a setting manipulation via the setting screen.

It is assumed that, for example, an e-mail is received in the terminal 410 in a state in which the combination is set (a left diagram in FIG. 46). In this case, the control device of the terminal 410 automatically decides illumination conditions 523 for realizing the illumination effect when an e-mail is received in accordance with the combination registered in advance as the illumination conditions of the illuminating device 110 (a middle diagram in FIG. 46) (in FIG. 46, for convenience, the arrangement of the virtual illuminating instrument related to the illumination conditions 523 is illustrated as the illumination conditions 523). Then, the control device of the terminal 410 drives the illuminating device 110 in accordance with the decided illumination conditions (a right diagram in FIG. 46). The user 501 can understand that an e-mail is received through the illumination light of the illuminating device 110.

5-4. Functional Configuration of Illumination System

Figure 47:
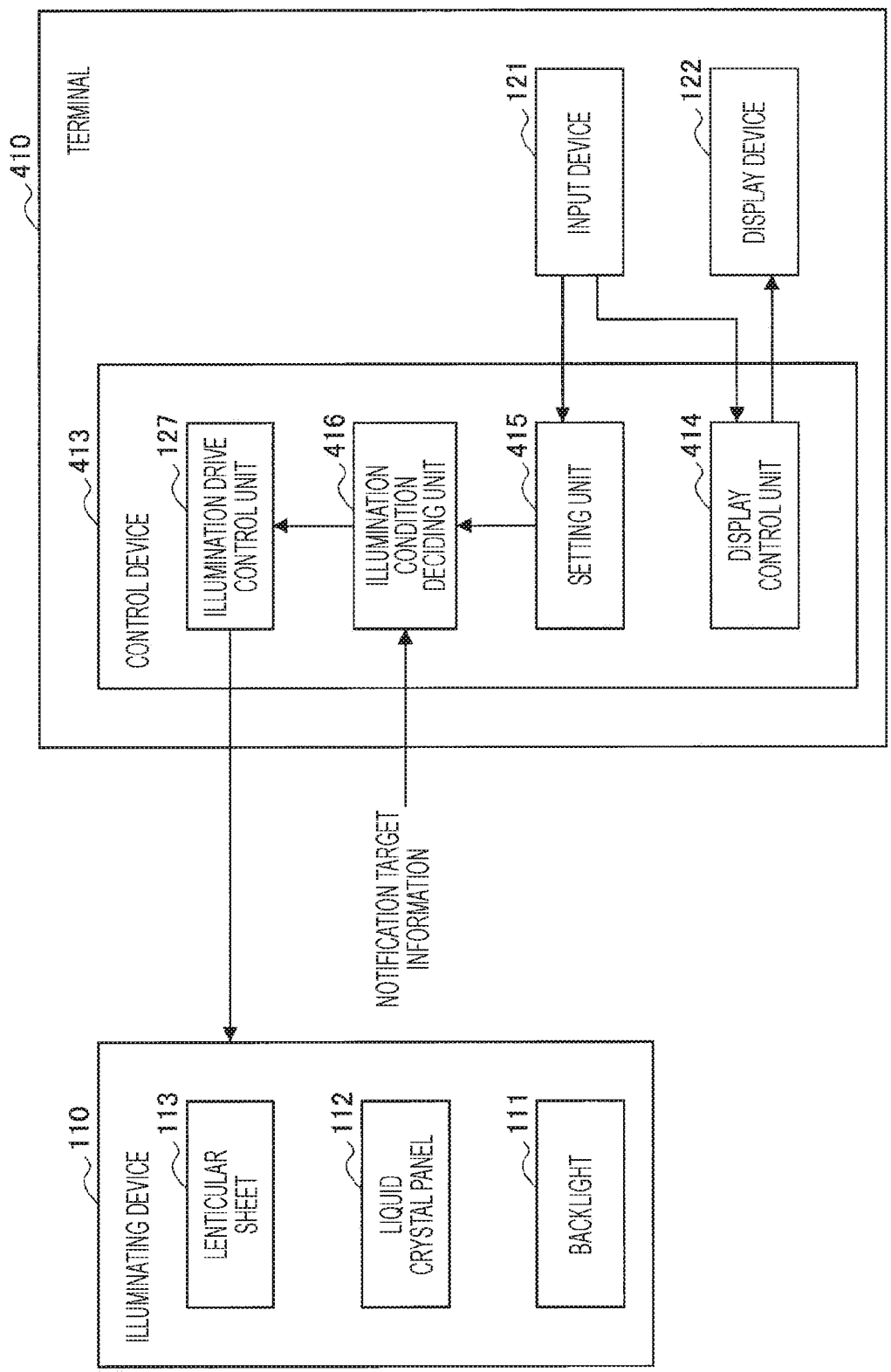
FIG. 47 is a block diagram illustrating an example of a functional configuration of an illumination system according to the fourth embodiment.

A functional configuration of the illumination system 4 that realizes the operation described above will be described. FIG. 47 is a block diagram illustrating an example of a functional configuration of the illumination system 4 according to the fourth embodiment.

As described above, the illumination system 4 according to the fourth embodiment includes an illuminating device 110 and a terminal 410. Further, the terminal 410 includes an input device 121, a display device 122, and a control device 213. Here, configurations and functions of the illuminating device 110 and the input device 121 and the display device 122 of the terminal 410 are similar to those in the illumination system 1 operated in the manual mode according to the first embodiment described above, and thus detailed description thereof is omitted here.

Referring to FIG. 47, the control device 413 of the terminal 410 includes a display control unit 414, a setting unit 415, an illumination condition deciding unit 416, and an illumination drive control unit 127 as its functions. The control device 413 has a device configuration similar to that of the control device 123 according to the first embodiment, and these functions can be realized as the processor of the control device 413 executes arithmetic processing in accordance with a predetermined program. Further, the function of the illumination drive control unit 127 is substantially similar to the function of the control device 123 in the illumination system 1 operated in the manual mode according to the first embodiment illustrated in FIG. 7.

The display control unit 414 controls the operation of the display device 122 and causes the display device 122 to display various types of information. Specifically, the display control unit 414 causes the display device 122 to display a setting screen for setting the combination of the notification target information and the illumination effect. At this time, a GUI for setting the combination of the notification target information and the illumination effect may be provided, and in this case, the display control unit 414 controls display such as movement of a GUI component (such as an icon) on the setting screen together in response to a manipulation of the user input via the input device 121. The user can input the combination of the notification target information and the illumination effect via the input device 121 with reference to the setting screen of the display device 122.

The setting unit 415 sets the combination of the notification target information and the illumination effect on the basis of an instruction input from the user via the input device 121. The setting unit 415 provides the illumination condition deciding unit 416 with information for the set combination of the notification target information and the illumination effect.

Further, for example, the following settings can be assumed as the combination of the notification target information and the illumination effect to be set.

(Notification Target Information)
Reception of e-mail
(Illumination Effect)
Illumination light is shaken.
(Notification Target Information)
Increase in outside temperature
(Illumination Effect)
Red illumination light is emitted.
(Notification Target Information)
Decrease in outside temperature
(Illumination Effect)
Blue illumination light is emitted.
(Notification Target Information)
The weather is fine
(Illumination Effect)
Chamber is illuminated with one big light source.
(Notification Target Information)
The weather is rainy
(Illumination Effect)
The chamber is illuminated dimly across the entire emission surface of the illuminating device 110.

In the illumination system 4, in a case where the notification target information is received in the terminal 410, the notification target information is provided to the illumination condition deciding unit 416. The illumination condition deciding unit 416 automatically decides the illumination conditions of the illuminating device 110 so that the illumination effect corresponding to the acquired notification target information is realized on the basis of the combination of the notification target information and the illumination effect set by the setting unit 415. The illumination drive control unit 127 drives the illuminating device 110 in accordance with the illumination conditions decided by the illumination condition deciding unit 416.

5-5. Processing Procedure of Control Method of Illumination System

Figure 48:
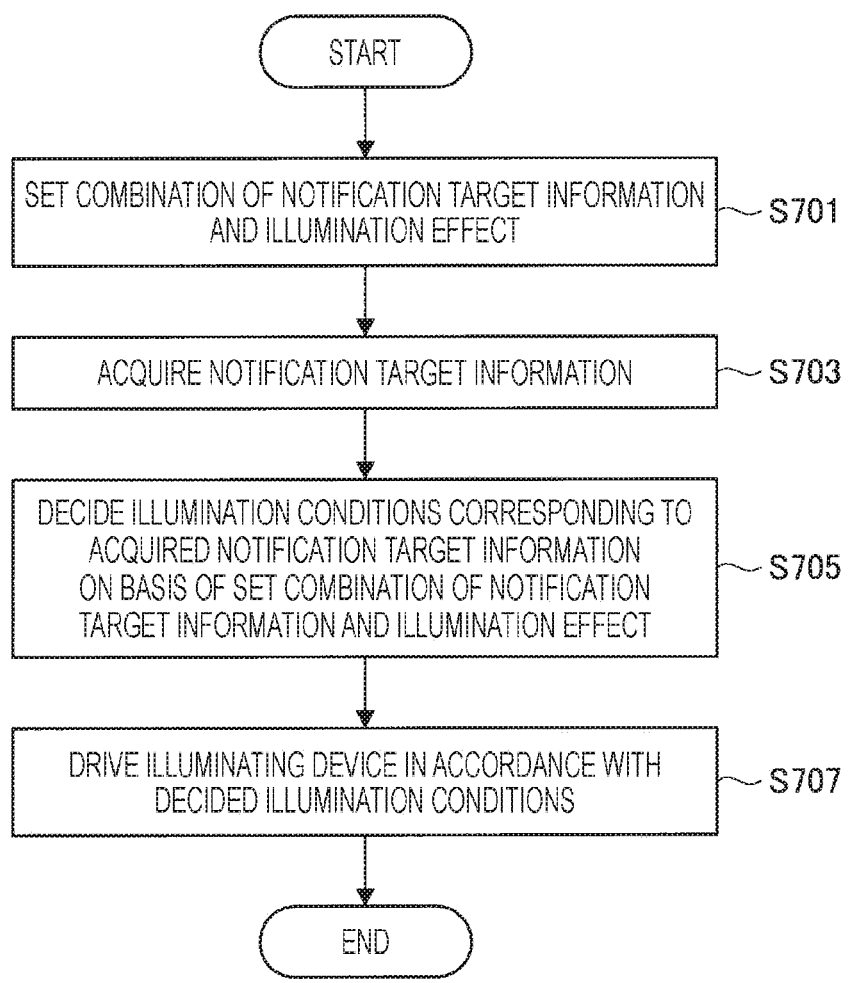
FIG. 48 is a flowchart illustrating an example of a processing procedure of a control method of an illumination system according to the fourth embodiment.

A processing procedure of a control method of the illumination system 4 executed by the control device 413 described above will be described. FIG. 48 is a flow chart illustrating an example of a processing procedure of a control method of the illumination system 4 according to the fourth embodiment. Further, each process illustrated in FIG. 48 corresponds to each process executed by the control device 413 illustrated in FIG. 47. Each process illustrated in FIG. 48 is executed as the processor constituting the control device 413 operates in accordance with a predetermined program. The details of each process illustrated in FIG. 48 have already been described above when describing the functions of the control device 413, and therefore, in description of each process illustrated in FIG. 48, an overview of each process will be described, and detailed description thereof will be omitted.

Referring to FIG. 48, in the control method of the illumination system 4 according to the fourth embodiment, first, the combination of the notification target information and the illumination effect is set in accordance with an instruction input from the user via the input device 121 (step S701). The process of step S701 corresponds to the process executed by the setting unit 415 illustrated in FIG. 47.

Then, the notification target information is acquired (step S703). The process of step S703 corresponds to the process in which the notification target information is acquired by the illumination condition deciding unit 416 illustrated in FIG. 47.

Then, the illumination conditions for realizing the illumination effect corresponding to the acquired notification target information are decided on the basis of the combination of the notification target information set and the illumination effect (step S705). The process of step S705 corresponds to the process executed by the illumination condition deciding unit 416 illustrated in FIG. 47.

Then, the illuminating device 110 is driven in accordance with the decided illumination conditions (step S707). The process of step S707 corresponds to the process performed by the illumination drive control unit 127 illustrated in FIG. 47.

5-6. Conclusion of Fourth Embodiment

The fourth embodiment of the present disclosure has been described above. As described above, in the fourth embodiment, the illumination system 4 using the illuminating device 110 as the information notification device is constructed. In the illumination system 4, when predetermined information (that is, the notification target information) is delivered, the illuminating device 110 is driven to notify of the notification target information. At this time, in the illuminating device 110, it is possible to reproduce various light sources and realize various illumination effects with one device, and thus it is possible to appropriately switch the illumination effect in accordance with the type or the content of notification target information. Accordingly, it is possible to notify the user of the delivery of the notification target information and the content of the notification target information visually and intuitively. As described above, according to the illumination system 4, the user can understand the overview or the like of the notification target information without accessing the terminal 410 and directly accessing the notification target information. Therefore, the convenience of the user can be improved.

6. Supplement

The exemplary embodiments of the present disclosure have been described in detail with reference to the appended drawings, but the technical scope of the present disclosure is not limited to such an example. It would be understood by those skilled in the art of the present disclosure that various modifications or alterations can be made within the scope of the technical spirit described in claims set forth below, and these also fall within the technical scope of the present disclosure.

For example, the configurations of the illumination systems 1, 1a, 1b, 2, 2a, 2b, 3, 3a, and 4 are merely examples, and the specific device configurations of the illumination systems 1, 1a, 1b, 2, 2a, 2b, 3, 3a, and 4 may be arbitrarily changed as long as it has functions similar to the function described above.

For example, although the illumination systems 1b, 2b, and 3a include the depth camera 140, the configurations of the illumination systems 1b, 2b, and 3a are not limited to such examples. Even in a case where a device capable of acquiring distance information to a target object is installed instead of the depth camera 140, it is possible to constitute similar illumination systems 1b, 2b and 3a. As the device, for example, various types of known devices such as a distance measuring sensor may be applied.

Further, for example, although the illumination systems 1, 1a, 1b, 2a, 2b, and 3a include the RGB camera 130, the configurations of the illumination systems 1, 1a, 1b, 2a, 2b, and 3a are not limited to such examples. It is desirable for the illumination systems 1, 1a, 1b, 2a, 2b, and 3a to include a camera capable of performing color photographing, that is, capable of acquiring color image data of a target, and such a camera may be any camera other than the RGB camera 130. In other words, the format of the color information in the color image data need not necessarily be an RGB format. Various types of known formats such as a YCbCr format and a YUV format may be used as the format of the color information. Further, the illumination systems 1, 1a, 1b, 2a, 2b, and 3a can include various types of cameras capable of acquiring the color image data corresponding to the employed format of the color information. For example, the illumination systems 1, 1a, 1b, 2a, 2b, and 3a can include a camera capable of acquiring color image data to which color information is added in a YCbCr format, a camera capable of acquiring color image data to which color information is added in a YUV format, or the like instead of the RGB camera 130.

Further, for example, the control devices 123, 123a, 123b, 213, 213a, 213b, 313, 313a, and 413 may not be installed in the terminals 120, 120a, 120b, 210, 210a, 210b, 310, 310a, and 410 and may be installed as a separate device. Further, the control devices 123, 123a, 123b, 213, 213a, 213b, 313, 313a, and 413 need not necessarily be one device and may be implemented by a cooperation of a plurality of devices. In this case, the functions of the control devices 123, 123a, 123b, 213, 213a, 213b, 313, 313a, and 413 are distributed to a plurality of devices including a processor capable of performing arithmetic processing for realizing these functions, and the functions of the control devices 123, 123a, 123b, 213, 213a, 213b, 313, 313a, and 413 can be realized as a whole as a plurality of devices execute arithmetic processing while exchanging various types of information in accordance with a predetermined program.

Further, it is possible to generate a computer program for realizing the functions of the control device 123, 123a, 123b, 213, 213a, 213b, 313, 313a, and 413 described above and install it in an information processing device such as a PC. Further, a computer readable recording medium in which such a computer program is stored can be provided. Examples of the recording medium include a magnetic disk, an optical disk, a magneto-optical disk, a flash memory, and the like. Further, the computer program may be distributed, for example, via a network without using a recording medium.

Further, the configurations in the first to fourth embodiments described above may be combined with one another in a possible range. For example, since the illumination systems 2a and 2b according to the second embodiment further include the mirror 220 in addition to the illumination systems 1a and 1b according to the first embodiment, the illumination systems 2a and 2b can be regarded as doubling as the functions of the illumination systems 1a and 1b. Therefore, these illumination systems 2a and 2b may be used as illumination systems for photographing as in the first embodiment. Further, for example, both the illumination system 3 according to the third embodiment and the illumination system 4 according to the fourth embodiment include the illuminating device 110 installed on the ceiling and the terminals 310 and 410 and have substantially similar device configurations. Therefore, an illumination system having the functions of the illumination system 3 and the functions of the illumination system 4 having such a device configuration may be provided.

Further, the effects described in this specification are merely illustrative or exemplary and not limiting. In other words, the technology according to the present disclosure may have other effects apparent to those skilled in the art from the description of this specification in addition to or instead of the effects described above.

Further, the following configurations also belong to the technical scope of the present disclosure.

(1)

A control device, including:

an illumination condition deciding unit that decides illumination conditions which are conditions for controlling emission lights from respective light emission points for an illuminating device which includes a plurality of the light emission points arranged in a planar shape and emits an illumination light as the emission lights of the respective light emission points are controlled, in which the illumination condition deciding unit automatically decides the illumination conditions on the basis of predetermined information.

(2)

The control device according to (1), further including, an illumination drive control unit that controls the illumination light emitted from the illuminating device by controlling the emission lights from the respective light emission points of the illuminating device in accordance with the illumination conditions.

(3)

The control device according to (1) or (2), in which the illuminating device is used as an illuminating device at the time of photographing, and the predetermined information is previous photographing data including at least the illumination conditions when photographing is performed in the past using the illuminating device and color image data which is image data including color information of a subject or arbitrary photograph data acquired in the past.

(4)

The control device according to (3), in which the illumination condition deciding unit decides the previous illumination conditions included in the previous photographing data as current illumination conditions.

(5)

The control device according to (4), in which the illumination condition deciding unit compares the currently acquired color image data of the subject with the previous color image data of the subject included in the previous photographing data, and decides the current illumination conditions so that the previous color image data of the subject is reproduced.

(6)

The control device according to (5), in which the previous photographing data further includes depth data of the subject at the time of photographing in the past, and the illumination condition deciding unit decides the current illumination conditions so that the previous color image data of the subject is reproduced further using currently acquired depth data of the subject and previous depth data of the subject included in the previous photographing data.

(7)

The control device according to (3), in which the illumination condition deciding unit compares the currently acquired color image data of the subject with the color image data of the subject in the previous photograph data, and decides the current illumination conditions so that the previous color image data of the subject is reproduced.

(8)

The control device according to (7), in which the illumination condition deciding unit decides the current illumination conditions so that the previous color image data of the subject is reproduced further using currently acquired depth data of the subject.

(9)

The control device according to (1) or (2), in which the illuminating device is used as an illuminating device when a user checks himself/herself with a mirror, and the predetermined information is previous photographing data including at least color image data which is image data including the illumination conditions and color information of the user when the illuminating device is used as an illumination of the mirror in the past or arbitrary photograph data acquired in the past.

(10)

The control device according to (9), in which the illumination condition deciding unit decides the past illumination conditions included in the previous photographing data as current illumination conditions.

(11)

The control device according to (10), in which the illumination condition deciding unit compares the currently acquired color image data of the user with the previous color image data of the user included in the previous photographing data, and decides the current illumination conditions so that the previous color image data of the user is reproduced.

(12)

The control device according to (11), in which the previous photographing data further includes depth data of the user when the illuminating device is used as an illumination of the mirror in the past, the illumination condition deciding unit decides the current illumination conditions so that the previous color image data of the user is reproduced further using currently acquired depth data of the user and previous depth data of the user included in the previous photographing data.

(13)

The control device according to (9), in which the illumination condition deciding unit compares the currently acquired color image data of the user with the color image data of a subject in the previous photograph data, and decides the current illumination conditions so that the previous color image data of the subject is reproduced.

(14)

The control device according to (13), in which the illumination condition deciding unit decides the current illumination conditions so that the previous color image data of the subject is reproduced further using currently acquired depth data of the user.

(15)

The control device according to (1) or (2), in which the illuminating device is used as an illuminating device of a chamber, and the predetermined information is information for layout data of the chamber or content being watched by a user in the chamber.

(16)

The control device according to (15), in which the illumination condition deciding unit presumes a situation in the chamber on the basis of the layout data of the chamber and depth data and color image data which is image data including color information of an object in the chamber, and decides the illumination conditions so that a desired illumination effect is obtained on the basis of a presumption result.

(17)

The control device according to (1) or (2), in which the illuminating device is used as a notification device for notifying a user of notification target information which is information to be notified of to the user, and
the predetermined information is the notification target information.

(18)
The control device according to anyone of (1) to (17), in which the illuminating device has a configuration in which a backlight, a liquid crystal panel, and a lenticular sheet are stacked.

(19)
A control method, including:
deciding, by a processor, illumination conditions which are conditions for controlling emission lights from respective light emission points for an illuminating device which includes a plurality of the light emission points arranged in a planar shape and emits an illumination light as the emission lights of the respective light emission points are controlled,
in which the illumination conditions are automatically decided on the basis of predetermined information when the illumination conditions are decided.

(20)
An illumination system, including:
an illuminating device which includes a plurality of light emission points arranged in a planar shape and emits an illumination light as emission lights of the respective light emission points are controlled; and
a control device that decides illumination conditions which are conditions for controlling emission lights from the respective light emission points of the illuminating device,
in which the control device automatically decides the illumination conditions on the basis of predetermined information.

REFERENCE SIGNS LIST 1, 1a, 1b, 2, 2a, 2b, 3, 3a, 4 Illumination system
110 Illuminating device
111 Backlight
112 Liquid crystal panel
112a Pixel
113 Lenticular sheet
113a Lens
120, 120a, 120b, 210, 210a, 210b, 310, 310a, 410 Terminal
121 Input device
122 Display device
123, 123a, 123b, 213, 213a, 213b, 313, 313a, and 413 Control device
124, 414 Display control unit
125 Photographing control unit
126, 126a, 126b, 316a, 416 Illumination condition deciding unit
127 Illumination drive control unit
130 RGB camera
140 Depth camera
220 Mirror
415 Setting unit

The invention claimed is:

1. A control device, comprising:
circuitry configured to:
receive photograph data from an external device, wherein specific illumination conditions for the received photograph data is unknown to the control device;
acquire first color image data of the received photograph data;
acquire second color image data of a first subject;
compare the acquired first color image data of the received photograph data and the acquired second color image data of the first subject;
determine the specific illumination conditions for the received photograph data based on the comparison of the acquired first color image data and the acquired second color image data;
determine a plurality of current illumination conditions that indicates a plurality of characteristics of an emission light from a respective light emission point of a plurality of light emission points of an illuminating device, wherein
the plurality of current illumination conditions is associated with the first subject, and
the plurality of current illumination conditions is determined based on specific information that includes the determined specific illumination conditions for the received photograph data; and
control the emission light from the respective light emission point of the plurality of light emission points of the illuminating device based on the determined plurality of current illumination conditions, wherein the emission light is controlled to change an emission state of the first subject.

2. The control device according to claim 1, wherein the circuitry is further configured to determine the specific illumination conditions of the received photograph data as the plurality of current illumination conditions.

3. The control device according to claim 2, wherein the circuitry is further configured to:
acquire third color image data of the first subject;
compare the third color image data of the first subject with the first color image data of the received photograph data; and
determine the plurality of current illumination conditions based on the comparison of the third color image data and the first color image data.

4. The control device according to claim 3, wherein the specific information further includes depth data of the received photograph data, and
wherein the circuitry is further configured to:
acquire current depth data of the first subject; and
adjust the plurality of current illumination conditions based on the current depth data of the first subject and the depth data of the received photograph data.

5. The control device according to claim 1, wherein the circuitry is further configured to:
acquire third color image data of the first subject;
compare the third color image data of the first subject with the first color image data of the received photograph data; and
determine the plurality of current illumination conditions based on the comparison of the third color image data and the first color image data.

6. The control device according to claim 5, wherein the circuitry is further configured to:
acquire current depth data of the first subject; and
adjust the plurality of current illumination conditions based on the current depth data of the first subject.

7. The control device according to claim 1, wherein the illuminating device is used as an illuminating device when a user checks himself/herself with a mirror, and
wherein a predetermined information is previous photographing data including at least a previous color image data which is image data including illumination conditions and color information of the user when the illuminating device is used as an illumination of the mirror in a past or arbitrary photograph data acquired in the past.

8. The control device according to claim 7, wherein an illumination condition deciding unit is configured to determine the past illumination conditions included in the previous photographing data as current illumination conditions.

9. The control device according to claim 8, wherein the illumination condition deciding unit is further configured to: compare the currently acquired color image data of the user with the previous color image data of the user included in the previous photographing data; and determine the current illumination conditions so that the previous color image data of the user is reproduced.

10. The control device according to claim 9, wherein the previous photographing data further includes depth data of the user when the illuminating device is used as an illumination of the mirror in the past,
   wherein the illumination condition deciding unit is further configured to determine the current illumination conditions so that the previous color image data of the user is reproduced further using currently acquired depth data of the user and previous depth data of the user included in the previous photographing data.

11. The control device according to claim 7, wherein an illumination condition deciding unit is further configured to: compare the currently acquired color image data of the user with the previous color image data of a subject in the previous photograph data; and determine the current illumination conditions so that the previous color image data of the subject is reproduced.

12. The control device according to claim 11, wherein the illumination condition deciding unit is further configured to determine the current illumination conditions so that the previous color image data of the subject is reproduced further using currently acquired depth data of the user.

13. The control device according to claim 1, wherein the illuminating device is used as an illuminating device of a chamber, and
   wherein information is information for layout data of the chamber or content being watched by a user in the chamber corresponds to a predetermined information.

14. The control device according to claim 13, wherein an illumination condition deciding unit is configured to: presume a situation in the chamber on a basis of the layout data of the chamber and depth data and color image data which is image data including color information of an object in the chamber; and determine the illumination conditions so that a desired illumination effect is obtained based on a presumption result.

15. The control device according to claim 1, wherein the illuminating device is used as a notification device for notifying a user of notification target information which is information to be notified of to the user, and
   wherien the notification target information corresponds to a predetermined information.

16. The control device according to claim 1, wherein the illuminating device comprises a backlight, a liquid crystal panel, and a lenticular sheet.

17. The control device according to claim 1, wherein the circuitry is further configured to determine the plurality of current illumination conditions based on the specific illumination conditions of each respective pixel of a plurality of pixels of the received photograph data.

18. The control device according to claim 1, wherein the received photograph data is associated with a second subject different from the first subject.

19. A control method, comprising:
in a control device:
receiving photograph data from an external device, wherein specific illumination conditions for the received photograph data is unknown to the control device;
acquiring first color image data of the received photograph data;
acquiring second color image data of a first subject;
comparing the acquired first color image data of the received photograph data and the acquired second color image data of the first subject;
determining the specific illumination conditions for the received photograph data based on the comparison of the acquired first color image data and the acquired second color image data;
determining a plurality of current illumination conditions that indicates a plurality of characteristics of an emission light from a respective light emission point of a plurality of light emission points of an illuminating device, wherein
   the plurality of current illumination conditions is associated with the first subject, and
   wherein the plurality of current illumination conditions is determined based on specific information that includes the specific illumination conditions determined for the received photograph data; and
controlling the emission light from the respective light emission point of the plurality of light emission points of the illuminating device based on the determined plurality of current illumination conditions, wherein the emission light is controlled to change an emission state of the first subject.

20. An illumination system, comprising:
an illuminating device which includes a plurality of light emission points arranged in a planar shape,
   wherein the illuminating device is configured to emit an illumination light as an emission light from a respective light emission point of the plurality of light emission points; and
a control device configured to:
   receive photograph data from an external device, wherein specific illumination conditions for the received photograph data is unknown to the illumination system;
   acquire first color image data of the received photograph data;
   acquire second color image data of a first subject;
   compare the acquired first color image data of the received photograph data and the acquired second color image data of the first subject;
   determine the specific illumination conditions for the received photograph data based on the comparison of the acquired first color image data and the acquired second color image data;
   determine a plurality of current illumination conditions that indicates a plurality of characteristics of the emission light from the respective light emission point of the plurality of light emission points of the illuminating device, wherein
      the plurality of current illumination conditions is associated with the first subject, and
      wherein the plurality of current illumination conditions is determined based on specific information that includes the determined specific illumination conditions for the received photograph data; and control the emission light from the respective light emission point of the plurality of light emission points of the illuminating device based on the determined plurality of current illumination conditions, wherein the emission light is controlled to change an emission state of the first subject.

* * * * *